US010986259B2

(12) United States Patent
Binder

(10) Patent No.: US 10,986,259 B2
(45) Date of Patent: *Apr. 20, 2021

(54) ELECTRIC SHAVER WITH IMAGING CAPABILITY

(71) Applicant: May Patents Ltd., Hod Hasharon (IL)

(72) Inventor: Yehuda Binder, Ramat Gan (IL)

(73) Assignee: May Patents Ltd., Hod-Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,860

(22) Filed: Nov. 11, 2020

(65) Prior Publication Data

US 2021/0067672 A1 Mar. 4, 2021

Related U.S. Application Data

(60) Continuation of application No. 15/097,562, filed on Apr. 13, 2016, now Pat. No. 10,863,071, which is a
(Continued)

(51) Int. Cl.
*H04N 5/225* (2006.01)
*H04N 5/278* (2006.01)
(Continued)

(52) U.S. Cl.
CPC .......... *H04N 5/2258* (2013.01); *A45D 26/00* (2013.01); *B26B 19/00* (2013.01); *B26B 19/382* (2013.01);
(Continued)

(58) Field of Classification Search
None
See application file for complete search history.

(56) References Cited

U.S. PATENT DOCUMENTS

| 1,753,750 A | 4/1930 | McArdle et al. |
| 1,986,955 A | 1/1935 | Bedell |
(Continued)

FOREIGN PATENT DOCUMENTS

| CN | 1941795 | 4/2007 |
| CN | 1946335 | 4/2007 |
(Continued)

OTHER PUBLICATIONS

IEEE Std. 802.3af—2003, "Part 3: Carrier sense Multiple Access with Collision Detection (CSMA/CD) Access Method and Physical Layer Specifications, Amendment: Data Terminal Equipment (DTE) Power via Media Dependent Interface (MDI)", 2003 (133 pages).
(Continued)

*Primary Examiner* — Dave Czekaj
*Assistant Examiner* — Samuel D Fereja

(57) ABSTRACT

System and method for improving the shaving experience by providing improved visibility of the skin shaving area. A digital camera is integrated with the electric shaver for close image capturing of shaving area, and displaying it on a display unit. The display unit can be integral part of the electric shaver casing, or housed in a separated device which receives the image via a communication channel. The communication channel can be wireless (using radio, audio or light) or wired, such as dedicated cabling or using powerline communication. A light source is used to better illuminate the shaving area. Video compression and digital image processing techniques are used for providing for improved shaving results. The wired communication medium can simultaneously be used also for carrying power from the electric shaver assembly to the display unit, or from the display unit to the electric shaver.

30 Claims, 30 Drawing Sheets

Related U.S. Application Data division of application No. 13/893,976, filed on May 14, 2013, now Pat. No. 10,695,922, which is a continuation of application No. 12/361,070, filed on Jan. 28, 2009, now abandoned.

(60) Provisional application No. 61/141,599, filed on Dec. 30, 2008.

(51) Int. Cl.
| | |
|---|---|
| *B26B 19/00* | (2006.01) |
| *H04N 13/194* | (2018.01) |
| *A45D 26/00* | (2006.01) |
| *B26B 19/38* | (2006.01) |
| *B26B 19/46* | (2006.01) |
| *B26B 19/48* | (2006.01) |
| *H04N 5/232* | (2006.01) |
| *H04N 5/262* | (2006.01) |
| *H04N 13/239* | (2018.01) |
| *H04N 21/414* | (2011.01) |
| *H04N 7/18* | (2006.01) |
| *H04N 5/30* | (2006.01) |
| *B26B 21/40* | (2006.01) |
| *H04N 5/369* | (2011.01) |
| *H04N 5/378* | (2011.01) |
| *H04B 3/54* | (2006.01) |
| *H04L 5/14* | (2006.01) |
| *H04L 12/10* | (2006.01) |
| *H04N 7/015* | (2006.01) |
| *H04N 5/33* | (2006.01) |
| *H04W 84/12* | (2009.01) |
| *G03B 37/00* | (2021.01) |
| *H04N 5/341* | (2011.01) |

(52) U.S. Cl.
CPC ........ *B26B 19/3806* (2013.01); *B26B 19/388* (2013.01); *B26B 19/3853* (2013.01); *B26B 19/3873* (2013.01); *B26B 19/46* (2013.01); *B26B 19/48* (2013.01); *B26B 21/405* (2013.01); *H04B 3/548* (2013.01); *H04L 5/14* (2013.01); *H04L 12/10* (2013.01); *H04N 5/2251* (2013.01); *H04N 5/2252* (2013.01); *H04N 5/2254* (2013.01); *H04N 5/2257* (2013.01); *H04N 5/23206* (2013.01); *H04N 5/23241* (2013.01); *H04N 5/23293* (2013.01); *H04N 5/23296* (2013.01); *H04N 5/232939* (2018.08); *H04N 5/262* (2013.01); *H04N 5/30* (2013.01); *H04N 5/332* (2013.01); *H04N 5/3698* (2013.01); *H04N 5/378* (2013.01); *H04N 7/015* (2013.01); *H04N 7/185* (2013.01); *H04N 13/194* (2018.05); *H04N 13/239* (2018.05); *H04N 21/41407* (2013.01); *H04W 84/12* (2013.01); *G03B 37/00* (2013.01); *H04N 5/23238* (2013.01); *H04N 5/3415* (2013.01)

(56) References Cited

U.S. PATENT DOCUMENTS

| | | |
|---|---|---|
| 1,988,199 A | 1/1935 | Greco et al. |
| 2,103,418 A | 12/1937 | Hagebeuker |
| 2,726,447 A | 12/1955 | Maloy |
| 2,809,425 A | 10/1957 | Tettis |
| 2,877,477 A | 3/1959 | Levin |
| 2,911,715 A | 11/1959 | Seifert |
| 2,941,293 A | 6/1960 | Mazzoni |
| 2,947,013 A | 8/1960 | Silverman |
| 2,974,412 A | 3/1961 | Clark |
| 3,027,507 A | 3/1962 | Hubner |
| 3,257,599 A | 6/1966 | Somers et al. |
| 3,287,805 A | 11/1966 | Du Charme |
| 3,359,635 A | 12/1967 | Jepson |
| D210,349 S | 3/1968 | Boldt |
| 3,458,794 A | 7/1969 | Bohnstedt |
| 3,783,508 A | 1/1974 | Brown et al. |
| 3,900,252 A | 8/1975 | Di Salvo |
| 4,019,252 A | 4/1977 | Port et al. |
| 4,075,458 A | 2/1978 | Moyer |
| 4,341,230 A | 7/1982 | Siahou |
| 4,383,565 A | 5/1983 | Denmat |
| 4,398,800 A | 8/1983 | Hayes |
| 4,479,516 A | 10/1984 | Hunter |
| 4,568,971 A | 2/1986 | Alzmann et al. |
| 4,578,766 A | 3/1986 | Caddy |
| 4,589,013 A | 5/1986 | Vlahos et al. |
| 4,603,448 A | 8/1986 | Middleton et al. |
| 4,698,869 A | 10/1987 | Mierau et al. |
| 4,703,247 A | 10/1987 | Morioka |
| 4,716,614 A | 1/1988 | Jones et al. |
| 4,719,698 A | 1/1988 | Ninomiya et al. |
| 4,729,169 A | 3/1988 | Asawa |
| 4,744,124 A | 5/1988 | Wang et al. |
| 4,764,961 A | 8/1988 | Hung |
| 4,766,630 A | 8/1988 | Hegemann |
| 4,788,734 A | 12/1988 | Bauer |
| 4,818,820 A | 4/1989 | La Rock |
| 4,845,796 A | 7/1989 | Mosley |
| 4,845,852 A | 7/1989 | Sukow |
| 4,866,807 A | 9/1989 | Kreit et al. |
| D304,779 S | 11/1989 | Raphael et al. |
| D304,780 S | 11/1989 | Morris, Jr. |
| D304,781 S | 11/1989 | Hanson |
| 4,944,016 A | 7/1990 | Christian |
| 4,944,704 A | 7/1990 | Grace |
| 5,006,779 A | 4/1991 | Fenne et al. |
| 5,027,506 A | 7/1991 | Bosch |
| 5,031,920 A | 7/1991 | Poirier |
| 5,032,918 A | 7/1991 | Ota et al. |
| 5,034,804 A | 7/1991 | Sasaki et al. |
| 5,044,037 A | 9/1991 | Brown |
| 5,062,010 A | 10/1991 | Saito |
| D321,986 S | 12/1991 | Snyder et al. |
| 5,113,102 A | 5/1992 | Gilmore |
| 5,115,533 A | 5/1992 | Hukuba |
| 5,121,201 A | 6/1992 | Seki |
| 5,138,459 A | 8/1992 | Roberts et al. |
| 5,165,131 A | 11/1992 | Staar |
| 5,165,170 A | 11/1992 | Sagol et al. |
| 5,182,857 A | 2/1993 | Simon |
| 5,193,000 A | 3/1993 | Lipton |
| 5,250,888 A | 5/1993 | Yu |
| 5,235,749 A | 8/1993 | Hildebrand et al. |
| 5,245,386 A | 9/1993 | Asano et al. |
| D340,455 S | 10/1993 | Christian |
| 5,259,086 A | 11/1993 | Fong |
| 5,274,735 A | 12/1993 | Okada |
| 5,314,336 A | 5/1994 | Diamond et al. |
| 5,327,648 A | 7/1994 | Ullmann |
| 5,335,798 A | 8/1994 | Bonwell et al. |
| 5,337,435 A | 8/1994 | Krasner et al. |
| 5,339,479 A | 8/1994 | Lyman |
| 5,340,309 A | 8/1994 | Robertson |
| 5,341,534 A | 8/1994 | Serbinski et al. |
| 5,343,243 A | 8/1994 | Maeda |
| 5,343,621 A | 9/1994 | Hildebrand et al. |
| 5,358,407 A | 10/1994 | Lainer |
| D353,490 S | 12/1994 | Hartwein |
| D354,168 S | 1/1995 | Hartwein |
| 5,402,170 A | 3/1995 | Parulski et al. |
| 5,438,726 A | 8/1995 | Leite |
| D363,605 S | 10/1995 | Kou et al. |
| 5,469,271 A | 11/1995 | Hoshino et al. |
| 5,475,441 A | 12/1995 | Parulski et al. |
| 5,483,745 A | 1/1996 | Izumi |
| 5,487,661 A | 1/1996 | Peithman |
| 5,493,747 A | 2/1996 | Inakagata et al. |

(56) References Cited

U.S. PATENT DOCUMENTS

| | | |
|---|---|---|
| 5,504,961 A | 4/1996 | Yang |
| D371,242 S | 7/1996 | Shimatsu et al. |
| 5,533,266 A | 7/1996 | Kelman |
| 5,537,175 A | 7/1996 | Kamaya et al. |
| D373,023 S | 8/1996 | Otero et al. |
| 5,544,382 A | 8/1996 | Giuliani et al. |
| D375,841 S | 11/1996 | Serbinski |
| 5,572,762 A | 11/1996 | Scheiner |
| 5,579,581 A | 12/1996 | Melton |
| 5,604,633 A | 2/1997 | Christianson |
| 5,606,799 A | 4/1997 | Melton |
| 5,625,572 A | 4/1997 | Yonekura et al. |
| 5,628,641 A | 5/1997 | Hahn |
| 5,666,159 A | 9/1997 | Parulski et al. |
| 5,669,921 A | 9/1997 | Berman et al. |
| 5,673,451 A | 10/1997 | Moore et al. |
| 5,675,859 A | 10/1997 | Barre |
| 5,678,312 A | 10/1997 | Watanabe |
| 5,697,117 A | 12/1997 | Craft |
| D388,958 S | 1/1998 | Hartwein |
| 5,704,087 A | 1/1998 | Strub |
| 5,749,000 A | 5/1998 | Narisawa |
| 5,784,742 A | 7/1998 | Giuliani et al. |
| 5,786,749 A | 7/1998 | Johnson et al. |
| D397,252 S | 8/1998 | Allende |
| 5,798,791 A | 8/1998 | Katayama et al. |
| 5,810,601 A | 9/1998 | Williams |
| 5,810,858 A | 9/1998 | Berman et al. |
| 5,835,083 A | 11/1998 | Nielsen et al. |
| 5,835,616 A | 11/1998 | Lobo et al. |
| 5,841,360 A | 11/1998 | Binder |
| 5,850,789 A | 12/1998 | Rudolf et al. |
| D403,511 S | 1/1999 | Serbinski |
| 5,864,288 A | 1/1999 | Hogan |
| 5,881,377 A | 3/1999 | Giel et al. |
| 5,894,320 A | 4/1999 | Vancelette |
| 5,894,453 A | 4/1999 | Pond |
| 5,894,670 A | 4/1999 | Iso et al. |
| 5,898,999 A | 5/1999 | Chaouachi et al. |
| 5,901,397 A | 5/1999 | Hafele et al. |
| 5,913,317 A | 6/1999 | Tiram |
| 5,920,988 A | 7/1999 | Momose |
| 5,924,159 A | 7/1999 | Haitin |
| 5,953,452 A | 9/1999 | Boone et al. |
| 5,960,507 A | 10/1999 | Dutra et al. |
| 5,964,034 A | 10/1999 | Sueyoshi et al. |
| 5,970,616 A | 10/1999 | Wahl et al. |
| 5,974,616 A | 11/1999 | Dreyfus |
| 5,978,651 A | 11/1999 | Eto et al. |
| 5,983,501 A | 11/1999 | Izumi |
| 5,994,855 A | 11/1999 | Lundell et al. |
| 6,002,427 A | 12/1999 | Kipust |
| 6,029,303 A | 2/2000 | Dewan |
| D426,708 S | 6/2000 | Francis |
| 6,081,957 A | 7/2000 | Webb |
| 6,115,477 A | 9/2000 | Filo et al. |
| 6,124,976 A | 9/2000 | Miyazaki |
| 6,134,606 A | 10/2000 | Anderson et al. |
| 6,149,645 A | 11/2000 | Tobinick |
| 6,154,912 A | 12/2000 | Li |
| 6,163,816 A | 12/2000 | Anderson et al. |
| 6,167,469 A | 12/2000 | Safai et al. |
| D436,254 S | 1/2001 | Kling et al. |
| 6,181,983 B1 | 1/2001 | Schlemmer et al. |
| 6,199,239 B1 | 3/2001 | Dickerson |
| 6,202,242 B1 | 3/2001 | Salmon et al. |
| 6,202,245 B1 | 3/2001 | Khodadadi |
| D440,766 S | 4/2001 | Hartwein et al. |
| 6,226,870 B1 | 5/2001 | Barish |
| 6,229,963 B1 | 5/2001 | Miyamoto et al. |
| 6,237,178 B1 | 5/2001 | Krammer et al. |
| 6,262,769 B1 | 7/2001 | Anderson et al. |
| 6,263,234 B1 | 7/2001 | Engelhardt |
| 6,267,771 B1 | 7/2001 | Tankovich et al. |
| 6,282,655 B1 | 8/2001 | Given |
| 6,288,742 B1 | 9/2001 | Ansari et al. |
| 6,300,976 B1 | 10/2001 | Fukuoka |
| 6,308,084 B1 | 10/2001 | Lonka |
| 6,312,317 B1 | 11/2001 | Oguma |
| 6,325,066 B1 | 12/2001 | Hughes et al. |
| 6,348,928 B1 | 2/2002 | Jeong |
| D453,996 S | 3/2002 | Kling et al. |
| 6,359,649 B1 | 3/2002 | Suzuki |
| D455,556 S | 4/2002 | Kling |
| 6,389,633 B1 | 5/2002 | Rosen |
| 6,396,391 B1 | 5/2002 | Binder |
| D458,028 S | 6/2002 | McCurrach |
| 6,397,424 B1 | 6/2002 | Leung |
| 6,401,209 B1 | 6/2002 | Klein |
| 6,421,866 B1 | 7/2002 | McDougall |
| 6,473,608 B1 | 10/2002 | Lehr et al. |
| 6,473,609 B1 | 10/2002 | Schwartz et al. |
| 6,476,984 B1 | 11/2002 | Ringdahl |
| 6,480,510 B1 | 11/2002 | Binder |
| D467,432 S | 12/2002 | Callendrille, Jr. |
| 6,497,043 B1 | 12/2002 | Jacobsen |
| 6,515,704 B1 | 2/2003 | Sato |
| 6,535,243 B1 | 3/2003 | Tullis |
| 6,536,068 B1 | 3/2003 | Yang |
| 6,549,616 B1 | 4/2003 | Binder |
| 6,552,743 B1 | 4/2003 | Rissman |
| 6,554,619 B2 | 4/2003 | Williams |
| D474,895 S | 5/2003 | Breit |
| 6,560,319 B1 | 5/2003 | Binder |
| D475,529 S | 6/2003 | Wright et al. |
| 6,581,233 B1 | 6/2003 | Cheng |
| D476,485 S | 7/2003 | Mulder et al. |
| D478,423 S | 8/2003 | Mulder et al. |
| 6,606,755 B1 | 8/2003 | Robinson et al. |
| 6,611,780 B2 | 8/2003 | Lundell et al. |
| 6,619,969 B2 | 9/2003 | Scheider et al. |
| D480,563 S | 10/2003 | Hensel |
| 6,633,747 B1 | 10/2003 | Reiss |
| 6,634,104 B2 | 10/2003 | Jacobsen |
| 6,643,104 B2 | 11/2003 | Shimazawa |
| 6,648,641 B1 | 11/2003 | Viltro et al. |
| 6,652,512 B2 | 11/2003 | Ota |
| D484,312 S | 12/2003 | Li |
| 6,658,687 B1 | 12/2003 | McDonald |
| 6,690,677 B1 | 2/2004 | Binder |
| D489,183 S | 5/2004 | Akahori et al. |
| D489,534 S | 5/2004 | Hensel |
| 6,731,213 B1 | 5/2004 | Smith |
| 6,731,952 B2 | 5/2004 | Schaeffer et al. |
| D492,118 S | 6/2004 | McCurrach et al. |
| D493,960 S | 8/2004 | Jimenez et al. |
| 6,779,216 B2 | 8/2004 | Davies et al. |
| D496,653 S | 9/2004 | Townsend et al. |
| 6,786,732 B2 | 9/2004 | Savill et al. |
| 6,788,332 B1 | 9/2004 | Cook |
| 6,792,640 B2 | 9/2004 | Lev |
| 6,795,993 B2 | 9/2004 | Lin |
| 6,798,406 B1 | 9/2004 | Jones et al. |
| 6,799,346 B2 | 10/2004 | Jeng et al. |
| 6,802,016 B2 | 10/2004 | Liu |
| 6,826,350 B1 | 11/2004 | Kashino et al. |
| D500,207 S | 12/2004 | Jimenez et al. |
| D500,208 S | 12/2004 | Vu |
| D500,209 S | 12/2004 | Kellogg |
| 6,836,918 B1 | 1/2005 | Wong |
| 6,842,459 B1 | 1/2005 | Binder |
| 6,845,537 B2 | 1/2005 | Wong |
| D502,601 S | 3/2005 | Lamason et al. |
| 6,864,911 B1 | 3/2005 | Zhang et al. |
| 6,871,402 B2 | 3/2005 | Bader et al. |
| D503,537 S | 4/2005 | Lamason et al. |
| D503,852 S | 4/2005 | Hensel |
| 6,882,217 B1 | 4/2005 | Mueller |
| 6,883,199 B1 | 4/2005 | Lundell et al. |
| 6,897,891 B2 | 5/2005 | Itsukaichi |
| 6,906,747 B2 | 6/2005 | Okada |
| 6,908,307 B2 | 6/2005 | Schick |
| 6,915,008 B2 | 7/2005 | Barman et al. |
| 6,920,660 B2 | 7/2005 | Lam |

(56) References Cited

U.S. PATENT DOCUMENTS

| | | |
|---|---|---|
| 6,923,409 B2 | 8/2005 | Strunk |
| 6,924,950 B2 | 8/2005 | Gventer et al. |
| 6,927,340 B1 | 8/2005 | Binder |
| 6,937,056 B2 | 8/2005 | Binder |
| 6,937,272 B1 | 8/2005 | Dance |
| 6,940,545 B1 | 9/2005 | Ray et al. |
| D510,930 S | 10/2005 | Deguchi |
| 6,952,855 B2 | 10/2005 | Lev et al. |
| 6,954,961 B2 | 10/2005 | Ferber et al. |
| 6,956,826 B1 | 10/2005 | Binder |
| D511,519 S | 11/2005 | Bone et al. |
| 6,960,170 B2 | 11/2005 | Kuo |
| 6,961,303 B1 | 11/2005 | Binder |
| 6,964,567 B2 | 11/2005 | Kerschbaumer |
| 6,965,728 B1 | 11/2005 | Miyata |
| 6,968,623 B2 | 11/2005 | Braun et al. |
| 6,978,087 B2 | 12/2005 | Seki et al. |
| D515,815 S | 2/2006 | Jimenez et al. |
| D515,816 S | 2/2006 | Jimenez et al. |
| 7,001,270 B2 | 2/2006 | Taub |
| 7,003,839 B2 | 2/2006 | Hafliger et al. |
| 7,013,522 B2 | 3/2006 | Kumagai |
| 7,016,705 B2 | 3/2006 | Bahl et al. |
| 7,035,456 B2 | 4/2006 | Lestideau |
| 7,049,790 B2 | 5/2006 | Pfenniger et al. |
| 7,054,668 B2 | 5/2006 | Endo et al. |
| 7,055,531 B2 | 6/2006 | Rehkemper |
| 7,084,838 B2 | 8/2006 | Yoon |
| 7,086,111 B2 | 8/2006 | Hilscher et al. |
| 7,091,471 B2 | 8/2006 | Wenstrand et al. |
| 7,099,510 B2 | 8/2006 | Jones et al. |
| D529,044 S | 9/2006 | Andre et al. |
| 7,100,283 B1 | 9/2006 | Grdodian et al. |
| 7,106,721 B1 | 9/2006 | Binder |
| 7,108,690 B1 | 9/2006 | Lefki et al. |
| 7,110,570 B1 | 9/2006 | Berenz et al. |
| 7,110,575 B2 | 9/2006 | Chen et al. |
| D531,190 S | 10/2006 | Lee et al. |
| 7,120,960 B2 | 10/2006 | Hilscher et al. |
| 7,126,626 B2 | 10/2006 | Sawahara et al. |
| 7,133,691 B2 | 11/2006 | Kang |
| D533,349 S | 12/2006 | Jimenez et al. |
| D533,720 S | 12/2006 | Vu |
| 7,146,028 B2 | 12/2006 | Lestideau |
| D534,726 S | 1/2007 | Vu |
| D534,728 S | 1/2007 | Vu |
| D534,921 S | 1/2007 | Andre et al. |
| D535,308 S | 1/2007 | Andre et al. |
| 7,171,114 B2 | 1/2007 | Milton |
| D538,267 S | 3/2007 | Christianson et al. |
| D538,297 S | 3/2007 | Ching |
| 7,187,407 B2 | 3/2007 | Kanehiro et al. |
| 7,190,389 B1 | 3/2007 | Abe et al. |
| D539,813 S | 4/2007 | Chen |
| D539,817 S | 4/2007 | Reverberi |
| 7,200,249 B2 | 4/2007 | Okubo et al. |
| 7,203,338 B2 | 4/2007 | Ramaswamy et al. |
| 7,209,161 B2 | 4/2007 | Thal et al. |
| 7,214,941 B2 | 5/2007 | Hamelin et al. |
| 7,217,266 B2 | 5/2007 | Anderson et al. |
| 7,274,822 B2 | 9/2007 | Zhang et al. |
| 7,281,461 B2 | 10/2007 | McCambridge et al. |
| 7,292,267 B2 | 11/2007 | Prentice et al. |
| 7,317,793 B2 | 1/2008 | Binder |
| 7,327,385 B2 | 2/2008 | Yamaguchi |
| 7,343,506 B1 | 3/2008 | Fenwick |
| 7,372,504 B2 | 5/2008 | Fujimura |
| 7,418,757 B2 | 9/2008 | Gatzerneyer |
| 7,426,785 B2 | 9/2008 | Ho |
| 7,432,952 B2 | 10/2008 | Fukuoka |
| 7,436,842 B2 | 10/2008 | Binder |
| 7,461,456 B2 | 12/2008 | Tsushio et al. |
| 7,467,946 B2 | 12/2008 | Rizoiu et al. |
| 7,489,863 B2 | 2/2009 | Lee |
| 7,500,755 B2 | 3/2009 | Ishizaki et al. |
| 7,519,219 B2 | 4/2009 | Okamura |
| 7,521,943 B2 | 4/2009 | Binder |
| 7,522,615 B2 | 4/2009 | Binder |
| 7,542,554 B2 | 6/2009 | Binder |
| 7,551,354 B2 | 6/2009 | Horsten et al. |
| 7,593,573 B2 | 9/2009 | Hahn |
| 7,596,866 B2 | 10/2009 | Saker et al. |
| 7,619,683 B2 | 11/2009 | Davis |
| 7,634,103 B2 | 12/2009 | Rubinstenn et al. |
| 7,650,519 B1 | 1/2010 | Hobbs |
| 7,724,284 B2 | 5/2010 | Mentzer |
| 7,726,890 B2 | 6/2010 | Misawa |
| 7,728,904 B2 | 6/2010 | Quan et al. |
| 7,729,538 B2 | 6/2010 | Shilman et al. |
| 7,730,406 B2 | 6/2010 | Chen |
| 7,730,534 B2 | 6/2010 | Renkis |
| 7,748,069 B2 | 7/2010 | Dawley |
| 7,764,380 B2 | 7/2010 | Van Hal et al. |
| 7,845,079 B2 | 12/2010 | McGuire |
| 7,856,209 B1 | 12/2010 | Rawat |
| 7,892,627 B2 | 2/2011 | Doughty |
| 7,976,388 B2 | 7/2011 | Park et al. |
| 7,992,307 B2 | 8/2011 | Smal |
| 8,061,041 B2 | 11/2011 | Jessemey et al. |
| 8,065,802 B2 | 11/2011 | Oglesby et al. |
| 8,075,315 B2 | 12/2011 | Gatzemeyer et al. |
| 8,170,621 B1 | 1/2012 | Lockwood |
| 8,134,612 B2 | 3/2012 | Okada et al. |
| 8,137,109 B2 | 3/2012 | Gatzemeyer et al. |
| 8,159,352 B2 | 4/2012 | Jimenez et al. |
| 8,164,655 B2 | 4/2012 | Lablans |
| 8,176,591 B2 | 5/2012 | Iwahori et al. |
| 8,182,425 B2 | 5/2012 | Stamatas et al. |
| 8,204,553 B2 | 6/2012 | Sutardja |
| 8,225,229 B2 | 7/2012 | Thorn et al. |
| 8,243,785 B2 | 8/2012 | Weitbruch et al. |
| 8,275,413 B1 | 9/2012 | Fraden et al. |
| 8,355,755 B2 | 1/2013 | Kim et al. |
| 8,360,771 B2 | 1/2013 | Stookey et al. |
| 8,439,265 B2 | 5/2013 | Ferren et al. |
| 8,450,679 B2 | 5/2013 | Yun |
| 8,474,144 B2 | 7/2013 | Royle |
| 8,514,261 B2 | 8/2013 | Kawasaki et al. |
| 8,544,132 B2 | 10/2013 | Gatzemeyer |
| 8,614,673 B2 | 12/2013 | Binder |
| 8,614,674 B2 | 12/2013 | Binder |
| 2001/0004428 A1 | 6/2001 | Horng |
| 2002/0024611 A1 | 2/2002 | Watanabe et al. |
| 2002/0180592 A1 | 5/2002 | Gromov |
| 2002/0067084 A1 | 6/2002 | Jung et al. |
| 2002/0092104 A1 | 7/2002 | Ferber et al. |
| 2002/0119428 A1 | 8/2002 | Vitale |
| 2002/0171566 A1 | 11/2002 | Huang |
| 2002/0174498 A1 | 11/2002 | Li |
| 2002/0183959 A1 | 12/2002 | Savill et al. |
| 2003/0017874 A1 | 1/2003 | Jianfei et al. |
| 2003/0036365 A1 | 2/2003 | Kuroda |
| 2003/0065552 A1 | 4/2003 | Rubinstenn |
| 2003/0117501 A1 | 6/2003 | Shirakawa |
| 2003/0204956 A1 | 6/2003 | Chan |
| 2003/0160874 A1 | 8/2003 | Kuroiwa |
| 2003/0197597 A1 | 10/2003 | Bahl et al. |
| 2003/0203747 A1 | 10/2003 | Nagamine |
| 2003/0214609 A1 | 11/2003 | Cha |
| 2003/0221269 A1 | 12/2003 | Zhuan |
| 2003/0232303 A1 | 12/2003 | Black |
| 2003/0235326 A1 | 12/2003 | Morikawa |
| 2004/0000017 A1 | 1/2004 | Kumagai |
| 2004/0021792 A1 | 2/2004 | Yasui |
| 2004/0036791 A1 | 2/2004 | Voss et al. |
| 2004/0074026 A1 | 4/2004 | Blaustein et al. |
| 2004/0123409 A1 | 7/2004 | Dickie |
| 2004/0134000 A1 | 7/2004 | Hilfinger et al. |
| 2004/0145675 A1 | 7/2004 | Kitada |
| 2004/0163191 A1 | 8/2004 | Cuffaro et al. |
| 2004/0201687 A1 | 10/2004 | Perotti et al. |
| 2004/0233153 A1 | 11/2004 | Robinson |
| 2004/0248594 A1 | 12/2004 | Wren |
| 2004/0255409 A1 | 12/2004 | Hilscher et al. |

(56) References Cited

U.S. PATENT DOCUMENTS

| | | |
|---|---|---|
| 2004/0259592 A1 | 12/2004 | Taneya et al. |
| 2004/0261270 A1 | 12/2004 | Daryanani |
| 2005/0000537 A1 | 1/2005 | Junkins |
| 2005/0008229 A1 | 1/2005 | Sloan et al. |
| 2005/0010954 A1 | 1/2005 | Binder |
| 2005/0011022 A1 | 1/2005 | Kwong |
| 2005/0022322 A1 | 2/2005 | Jimenez et al. |
| 2005/0036036 A1 | 2/2005 | Stevenson et al. |
| 2005/0041123 A1 | 2/2005 | Ansari et al. |
| 2005/0066461 A1 | 3/2005 | Chang |
| 2005/0129069 A1 | 6/2005 | Binder |
| 2005/0132585 A1 | 6/2005 | Weber et al. |
| 2005/0144744 A1 | 7/2005 | Thiess et al. |
| 2005/0150067 A1 | 7/2005 | Cobabe et al. |
| 2005/0152231 A1 | 7/2005 | Yeh |
| 2005/0172433 A1 | 8/2005 | Oliver, Jr. et al. |
| 2005/0176463 A1 | 8/2005 | Hollemans |
| 2005/0177139 A1 | 8/2005 | Yamazaki |
| 2005/0180561 A1 | 8/2005 | Binder |
| 2005/0181846 A1 | 8/2005 | Taneya et al. |
| 2005/0204490 A1 | 9/2005 | Kemp et al. |
| 2005/0225656 A1 | 10/2005 | Ihama |
| 2005/0229398 A1 | 10/2005 | Leventhal |
| 2005/0244057 A1 | 11/2005 | Ikeda et al. |
| 2005/0249245 A1 | 11/2005 | Binder |
| 2005/0276452 A1 | 12/2005 | Boland |
| 2005/0278882 A1 | 12/2005 | Drzewiecki et al. |
| 2005/0283929 A1 | 12/2005 | Jimenez et al. |
| 2006/0019700 A1 | 1/2006 | Seo |
| 2006/0033831 A1 | 2/2006 | Ejima et al. |
| 2006/0037158 A1 | 2/2006 | Foley et al. |
| 2006/0040246 A1 | 2/2006 | Ding et al. |
| 2006/0048315 A1 | 3/2006 | Chan et al. |
| 2006/0056837 A1 | 3/2006 | Vapaakoski |
| 2006/0057513 A1 | 3/2006 | Ito et al. |
| 2006/0077888 A1 | 4/2006 | Karam |
| 2006/0104456 A1 | 5/2006 | Filo et al. |
| 2006/0104488 A1 | 5/2006 | Bazakos et al. |
| 2006/0123053 A1 | 6/2006 | Scannell, Jr. |
| 2006/0123570 A1 | 6/2006 | Pace et al. |
| 2006/0130253 A1 | 6/2006 | Rycroft |
| 2006/0140508 A1 | 6/2006 | Ohgishi et al. |
| 2006/0150350 A1 | 7/2006 | Pfenniger et al. |
| 2006/0162165 A1 | 7/2006 | Villalobos |
| 2006/0179591 A1 | 8/2006 | Spooner |
| 2006/0186739 A1 | 8/2006 | Grolnic |
| 2006/0283478 A1 | 12/2006 | Avila et al. |
| 2007/0030116 A1 | 2/2007 | Feher |
| 2007/0039109 A1 | 2/2007 | Nanda |
| 2007/0041077 A1 | 2/2007 | Seo et al. |
| 2007/0041340 A1 | 2/2007 | Binder |
| 2007/0069134 A1 | 3/2007 | Cassel |
| 2007/0074359 A1 | 4/2007 | O'Lynn |
| 2007/0094822 A1 | 5/2007 | Gatzemeyer |
| 2007/0109411 A1 | 5/2007 | Jung et al. |
| 2007/0124418 A1 | 5/2007 | Binder |
| 2007/0147827 A1 | 6/2007 | Sheynman et al. |
| 2007/0152628 A1 | 7/2007 | Lee |
| 2007/0173202 A1 | 7/2007 | Binder |
| 2007/0190509 A1 | 8/2007 | Kim |
| 2007/0192976 A1 | 8/2007 | Gatzemeyer et al. |
| 2007/0195167 A1 | 8/2007 | Ishiyama |
| 2007/0200955 A1 | 8/2007 | Harada et al. |
| 2007/0202807 A1 | 8/2007 | Kim |
| 2007/0227011 A1 | 10/2007 | Caric |
| 2007/0242858 A1 | 10/2007 | Aradhye et al. |
| 2007/0251097 A1 | 11/2007 | Terry |
| 2007/0252997 A1 | 11/2007 | Van Hal et al. |
| 2007/0260784 A1 | 11/2007 | Takamatsu et al. |
| 2007/0261185 A1 | 11/2007 | Guney et al. |
| 2007/0263226 A1 | 11/2007 | Kurtz et al. |
| 2007/0265495 A1 | 11/2007 | Vayser |
| 2007/0270221 A1 | 11/2007 | Park et al. |
| 2007/0279482 A1* | 12/2007 | Oswald .................. H04N 7/142 348/14.02 |
| 2008/0005433 A1 | 1/2008 | Diab |
| 2008/0024596 A1 | 1/2008 | Li et al. |
| 2008/0100695 A1 | 1/2008 | Ebrom et al. |
| 2008/0028553 A1 | 2/2008 | Batthauer |
| 2008/0028616 A1 | 2/2008 | Kwak |
| 2008/0084482 A1 | 4/2008 | Hansson |
| 2008/0089554 A1 | 4/2008 | Tabankin |
| 2008/0102953 A1 | 5/2008 | Schultz |
| 2008/0109973 A1 | 5/2008 | Farrell |
| 2008/0119829 A1 | 5/2008 | Okawa |
| 2008/0146887 A1 | 6/2008 | Rao et al. |
| 2008/0147054 A1 | 6/2008 | Altshuler |
| 2008/0170805 A1 | 7/2008 | Sun et al. |
| 2008/0170806 A1 | 7/2008 | Kim |
| 2008/0175448 A1 | 7/2008 | Fujiwara et al. |
| 2008/0176077 A1 | 7/2008 | Doughty |
| 2008/0177287 A1 | 7/2008 | Rassman |
| 2008/0109310 A1 | 8/2008 | Ebrom et al. |
| 2008/0198801 A1 | 8/2008 | Kesselman |
| 2008/0206498 A1 | 8/2008 | Allen |
| 2008/0215038 A1 | 9/2008 | Bakker |
| 2008/0246917 A1 | 10/2008 | Phinney et al. |
| 2008/0262304 A1 | 10/2008 | Nisani |
| 2009/0027498 A1 | 1/2009 | Owen et al. |
| 2009/0046145 A1 | 2/2009 | Simon |
| 2009/0047995 A1 | 2/2009 | Futter et al. |
| 2009/0051769 A1 | 2/2009 | Kuo et al. |
| 2009/0066784 A1 | 3/2009 | Stone et al. |
| 2009/0067723 A1 | 3/2009 | Yamazaki et al. |
| 2009/0295976 A1 | 3/2009 | Choi |
| 2009/0092955 A1 | 4/2009 | Hwang |
| 2009/0102940 A1 | 4/2009 | Uchida |
| 2009/0119729 A1 | 5/2009 | Periman et al. |
| 2009/0141941 A1 | 6/2009 | Wagg |
| 2009/0146861 A1 | 6/2009 | Liou |
| 2009/0147081 A1 | 6/2009 | Hanson |
| 2009/0147102 A1 | 6/2009 | Kakinuma et al. |
| 2009/0189972 A1 | 7/2009 | Harris |
| 2009/0215015 A1 | 8/2009 | Chu |
| 2009/0241278 A1 | 10/2009 | Lemchen |
| 2009/0291422 A1 | 11/2009 | Puurunen et al. |
| 2009/0303320 A1 | 12/2009 | Davis |
| 2009/0306498 A1 | 12/2009 | Bodduluri |
| 2009/0317770 A1 | 12/2009 | Gatzemeyer et al. |
| 2010/0001192 A1 | 1/2010 | Lange et al. |
| 2010/0026717 A1 | 2/2010 | Sato |
| 2010/0053212 A1 | 3/2010 | Kang et al. |
| 2010/0063491 A1 | 3/2010 | Verhagen et al. |
| 2010/0026873 A1 | 4/2010 | Lee |
| 2010/0083508 A1 | 4/2010 | Cheng |
| 2010/0130129 A1 | 5/2010 | Chang |
| 2010/0169055 A1 | 7/2010 | Kobeck et al. |
| 2010/0170052 A1 | 7/2010 | Ortins et al. |
| 2010/0194860 A1 | 8/2010 | Mentz et al. |
| 2010/0283586 A1 | 11/2010 | Ikeda et al. |
| 2010/0295782 A1 | 11/2010 | Binder |
| 2010/0319145 A1 | 12/2010 | Neyer et al. |
| 2010/0321321 A1 | 12/2010 | Shenfield et al. |
| 2010/0323337 A1 | 12/2010 | Ikkink et al. |
| 2011/0010876 A1 | 1/2011 | Iwahori et al. |
| 2011/0018985 A1 | 1/2011 | Zhu |
| 2011/0050848 A1 | 3/2011 | Rohaly |
| 2011/0098083 A1 | 4/2011 | Lablans |
| 2011/0234779 A1 | 9/2011 | Weisberg |
| 2011/0247156 A1 | 10/2011 | Schmid et al. |
| 2011/0275424 A1 | 11/2011 | Schmid et al. |
| 2011/0298929 A1 | 12/2011 | Garcia et al. |
| 2011/0313825 A1 | 12/2011 | Wilhelm et al. |
| 2012/0002204 A1 | 1/2012 | Varghese et al. |
| 2012/0019641 A1 | 1/2012 | Reeder, III |
| 2012/0167392 A1 | 7/2012 | Cherian et al. |
| 2012/0253203 A1 | 10/2012 | Weston et al. |
| 2012/0271289 A1 | 10/2012 | Eckhouse et al. |
| 2013/0086758 A1 | 4/2013 | Boutoussov |
| 2013/0104401 A1 | 5/2013 | Rodriguez |
| 2016/0234465 A1 | 8/2016 | Binder |

(56) References Cited

U.S. PATENT DOCUMENTS

FOREIGN PATENT DOCUMENTS

| | | |
|---|---|---|
| CN | 200969651 | 10/2007 |
| CN | 201161398 | 12/2008 |
| DE | 102005030533 | 1/2007 |
| EP | 1117251 | 7/2001 |
| EP | 2165669 | 3/2010 |
| GB | 888373 | 1/1962 |
| IE | 2006/0420 | 2/2008 |
| IE | 20060420 | 2/2008 |
| JP | 2004297516 | 10/2004 |
| KR | 20040104777 | 12/2004 |
| KR | 20050023687 | 3/2005 |
| KR | 20050057916 | 6/2005 |
| KR | 20050101051 | 10/2005 |
| WO | 1998002085 | 1/1998 |
| WO | 199844739 | 10/1998 |
| WO | 199907156 | 2/1999 |
| WO | 200013407 | 3/2000 |
| WO | 200158129 | 8/2001 |
| WO | 2003043348 | 5/2003 |
| WO | 2005102153 | 11/2005 |
| WO | 2008090495 | 7/2008 |
| WO | 2009076162 | 6/2009 |
| WO | 2010016570 | 2/2010 |
| WO | 2010059484 | 5/2010 |
| WO | 2010143156 | 12/2010 |
| WO | 2012164441 | 6/2012 |

OTHER PUBLICATIONS

Eastman Kodak Company, KAF-50100 Image Sensor, Device Performance Specification, Revision 2.0 MTD/PS-1071, Oct. 31, 2008 (40 pages).
Eastman Kodak Company, KAI-2093 Image Sensor, Device Performance Specification, Revision 3.0 MTD/PS-0307, Mar. 19, 2007 (36 pages).
Jim Zyren, Eddie Enders, Ted Edmondson "IEEE 802.11g Offers Higher Rates and Longer Range", Intersil Ltd (15 pages).
Standard Microsystems Corporation (SMSC) "LAN91C111 10/100 Non-PCI Ethernet Single Chip MAC + PHY" Data-Sheet, Rev. 15 (Feb. 20, 2004) (127 pages).
Agere Systems, Inc. "WaveLAN WL60400 Multimode Wireless LAN Media Access Controller (MAC)", Product Brief Aug. 2003 (10 pages).
Agere Systems, Inc. "WaveLAN WL64040 Multimode Wireless LAN Baseband", Product Brief Sep. 2003 (4 pages).
Agere Systems, Inc. "WaveLAN WL54040 Dual-Band Wireless LAN Transceiver", Product Brief Sep. 2003 (4 pages).
Anders Henrysson, Joe Marshall, Mark Billinghurst, "Experiments in 3D interaction for mobile phone AR", Dec. 1-4, 2007 (9 pages).
ZTE, ZTE F152 HSDPA Dual band 3G Mobile Phone User Manual, Feb. 2007 (86 pages).
Nokia 6680 Smartphone, Date of Publication: Q1 2005, FoneArena.com (4 pages).
Sony Ericsson Z1010 User Manual (2003) (95 pages).
Sony Ericsson Z1010 Working Instruction, SP/Mechanical (3/000 21-1/FEA 209 544/77 A), date unknown (60 pages).
Sony Ericsson Z1010 User Guide, Second edition published Mar. 2004 (103 pages).
Ex parte Binder, Appeal No. 2019-003108 (PTAB 2020).
International Search Report PCT/IL2009/00798 dated Mar. 25, 2010.
Universal Powerline Bus: The UPB System Description, Version 1.1 dated Sep. 19, 2003.
"LAN83C180 10/100 Fast Ethernet PHY Transceiver" available from SMSC—Standard Microsystems Corporation of Hauppauge, NY U.S.A., Aug. 24, 2001.
Search Report issued by State Intellectual Property Office of the People's Republic of China dated Nov. 29, 2013.
Texas Instruments Incorporated, "TMS320DM357 digital Media System-on-Chip", SPRS553—Nov. 2008 (195 pages).
Texas Instruments Incorporated, "VSP2560 VSP2562 VSP2566 CCD Analog Frone-End for Digital Cameras", SBES008—Aug. 2008 (29 pages).
The CEBus Standard User's guide; by Grayson Evans, 1st Ed., May 1996 (317 pages).
Intel Corporation "54 Mbps IEEE 802.11 Wireless LAN at 2.4 GHz", Nov. 2002 (8 pages).
Laerence Rigge, Tony Grewe, "802.11 Wireless Chip Set Technology White Paper" Agere Systems, Inc., Apr. 2003 (12 pages).
Agere Systems, Inc. "WaveLAN 802.11a/b/g Chip Set", Product Brief Feb. 2003 (6 pages).
Intellon Corporation, "INT6000 HomePlug AV High-Speed Powerline Solution", Product Brief 2008 (2 pages).
Intellon Corporation, "HomePlug AV Technology Overview", Document # 26002829 Revision 2, 2008 (2 pages).
HomePlug Powerline Alliance, Inc., "HomePlug AV White Paper", Document # HPAVWP-05-818, 2005 (11 pages).
Analog Devices Inc., "ADV212 JPEG 2000 Video Codec" Data Sheet, 2006 (44 pages).

* cited by examiner

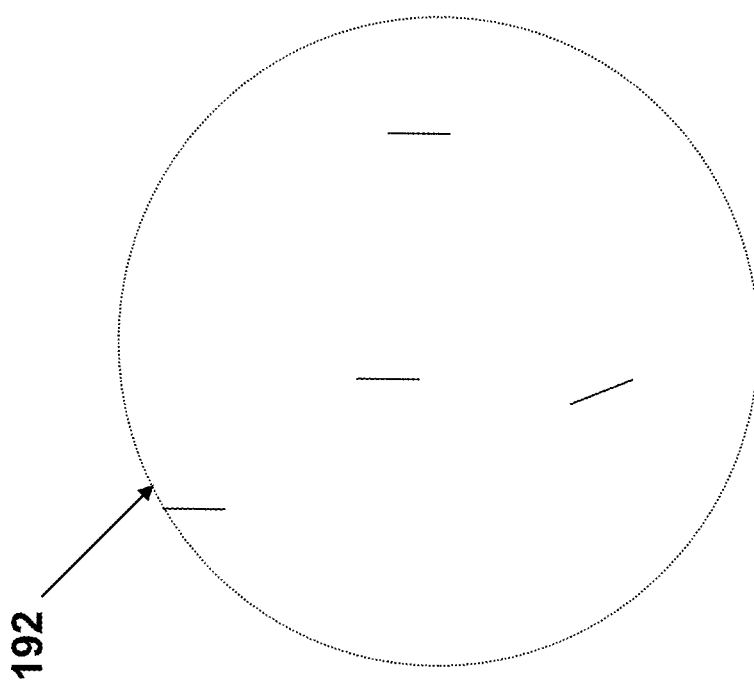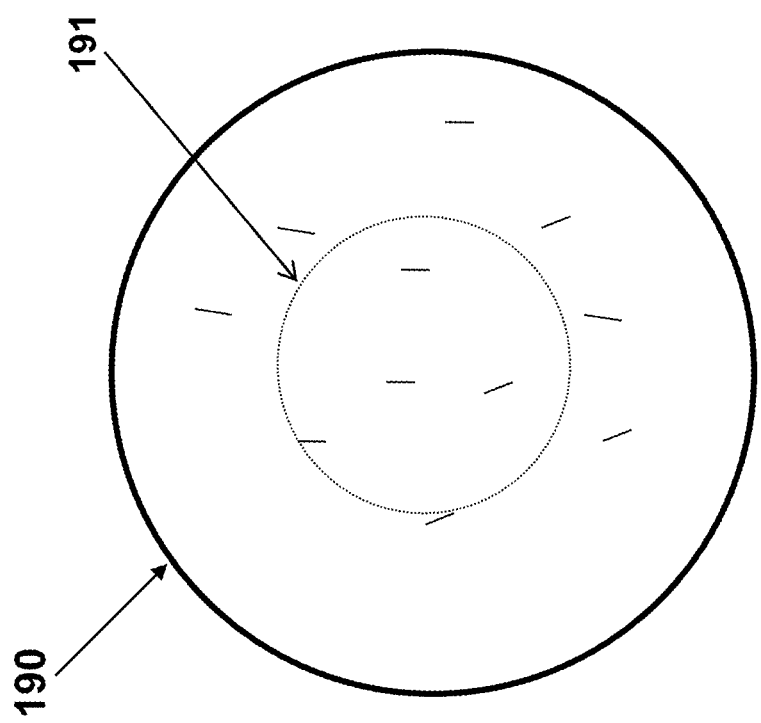
Figure 19

ELECTRIC SHAVER WITH IMAGING CAPABILITY

FIELD OF THE INVENTION

The present invention relates generally to electric shavers having electronic imaging functions.

BACKGROUND OF THE INVENTION

Razors are known as a bladed tool primarily used in the shaving off of unwanted body hair. Electric shavers are known as an alternative to razors for removal of hair and/or slicing hair down to the level of the skin. Such shavers are commonly used by men to remove their facial hair (such as beard, mustache and whiskers) and by women to remove their leg, underarm and other hair. Electric shavers, also known as 'electric razors' or 'electric dry shavers', commonly include of a set of oscillating or rotating blades, which are held behind a perforated metal foil that prevents the blades from coming into contact with the skin. In some designs a rotary type of shaver is used, wherein the blades are circular having a circular motion, while other shavers use oscillating blades. Blade movement is powered by a small DC motor, commonly powered by rechargeable batteries. Some electric shavers are plugged directly into an AC outlet to be powered therefrom.

FIG. 1 shows an example of an electric shaver 10 using a straight cutting mechanism. Front view 12 of the shaver 10 shows a foil 15 covering the blades, an on/off switch 16 and an enclosure 17. View 11 is a side view and view 19 is a rear view of the shaver 10. View 13 is a top view of the foil 15 which is usually in contact with the skin and the hair. View 14 is a bottom view showing a connector 18 for connecting to a power source, such as AC power 115 VAC/60 Hz (as in North America) or 220 VAC/50 Hz common in Europe. The shaver 10 parts are supported in an enclosure 17, which may be an integrally molded body frame. The casing enclosing the frame and supported parts can be molded of plastic or can be a sheet metal body, or any other suitable synthetic resin material. The enclosure 17, which is commonly hand-held, is shown as a rectangular, 'box-like' enclosure having four walls, which is commonly used with straight cutting systems. Cylindrical cases are also known and commonly used with rotary-type electric shavers.

FIG. 2 illustrates schematically a simplified general block diagram of an electric shaver powered by a battery or cell. The battery 24 powers a DC electric motor 26, which is mechanically coupled via mechanical coupling 27 for driving power to rotate or oscillate blades included in a cutter mechanism 28, thus cutting the hair via a foil such as foil 15 shown in FIG. 1. The coupling 27 may be a shaft or a transmission gear. An on/off switch 25 (corresponding to the switch 16 in FIG. 1) allows the user to start and stop the operation of the electrical shaver. In many designs the battery 24 used is a rechargeable battery such as a nickel-cadmium battery. In such a case, a battery charger 23 employed for charging the battery while not in use. The battery charger or power supply 23 is commonly fed by domestic AC power through AC plug 21 and cord 22, and commonly includes a step-down transformer. The charging associated components, such as the charger 23, the AC plug 21, and the cable 22, are housed in a separate enclosure, and connected via a connector (such as jack socket or receptacle 18 in FIG. 1) to the electric shaver assembly, housing the electric cell or cells 24, the motor 26 and the cutting mechanism 28). In the case of only AC-powered shavers (without battery), the battery 24 is not used and the power supply 23 directly feeds the motor 26.

Good visibility of the skin surface involved with the shaving is essential for quick, convenient, easy and effective shaving. In many cases, such as in a facial shaving, direct eye-contact during shaving cannot be made, and a mirror needs to be used. However, a mirror may not be available in all locations. Further, in the case of a foggy or dark environment, the image in the mirror cannot be seen well. Further, the hand holding the shaver and the shaver unit itself may hide and interfere with the required image of the shaving area.

An electric shaver containing a microcomputer and display means is disclosed in U.S. Pat. No. 5,274,735 to Okada entitled: "Electric Shaver". In addition, an electric shaver including a display and light receiving means is disclosed in U.S. Pat. No. 5,920,988 to Momose entitled: "Electric Shaver".

In consideration of the foregoing, it would be an advancement in the art to provide a method and system that is simple, cost-effective, faithful, reliable, has a minimum part count, minimum hardware, or uses existing and available components allowing convenient or better visualization of the skin during shaving, and in particular the shaving area. Such visualization may aid a person in determining how to adjust their shaving to produce the best shave. The shaving area refers to the skin surface area that is of interest to user for shaving, either required to be shaved, under shaving or after being shaved.

Furthermore, it would be highly advantageous to have a method and system providing a close, better and easier shaving experience by allowing a better viewing of the skin that is about to be shaved or was already shaved, preferably without the need of a mirror, under a dark environment, or under a condition where sufficient light is not provided. This will allow the user of the electric shaver to have real-time feedback on the shaving activity.

SUMMARY OF THE INVENTION

In one aspect of the present invention, a method and apparatus for using digital imaging or digital photography of the shaving area is described. Digital camera functionality is added to an portably hand-held housing of an electric shaver, allowing the shaving area image (either as still image or as video) to be captured, stored, manipulated and displayed on a display unit. The image capturing hardware is integrated with the electric shaver, and the image captured is reconstructed faithfully and displayed on a display unit for the user to view. The shaving improvement can benefit human hair removal such as facial or leg hair removal.

The image capturing hardware integrated with the electric shaver contains a photographic lens (through a lens opening) focusing the required image onto an image sensor. The image is converted into a digital format by an image sensor AFE (Analog Front End) and an image processor. The display unit uses a display interface to convert the digital image to a signal suitable to be displayed on the screen of the display.

In another aspect of the present invention, the display unit is integrated with the electric shaver. The display can be of a flip type, wherein the screen can be extended for user view only when required, and folded otherwise.

In another aspect of the present invention, the display unit is a separate device housed within a separate enclosure. The digital data representing the captured image is transmitted over a communication medium to the display unit. The display unit receives the digital data from the communication medium and displays it. In this scenario, the electric shaver includes a transmitter (or a transceiver) for transmitting the digital data to the communication medium, and the display unit includes a receiver (or a transceiver) for receiving the digital data from the communication medium. In one aspect according to the invention, the video signal is carried in an analog form over the communication medium, respectively using an analog transmitter and an analog receiver.

The communication between the electric shaver assembly and the display unit can be non-conductive over-the-air wireless, using radio, audio or light based communication, and use various WLAN, WPAN and other technologies. The wireless communication may use a spread-spectrum signal such as multi-carrier (e.g. OFDM, DMT and CDMA), or a single carrier (narrow-band) signal. Each of the wireless signals or the wireless communication links above may be WPAN, WLAN, WMAN, WAN, BWA, LMDS, MMDS, WiMAX, HIPERMAN, IEEE802.16, Bluetooth, IEEE802.15, IEEE802.11 (such as a, b and g), UWB, ZigBee and cellular such as GSM, GPRS, 2.5G, 3G, UMTS, DCS, PCS and CDMA. Similarly, each of the frequency bands above may be part of the ISM frequency bands.

Further, such communication can use a conductive medium such as cables or wires, or any other metallic medium. Standard PAN or LAN cabling and protocols may be used, such as Ethernet 10/100/1000BaseT. In one embodiment, powerline communication is used wherein the AC power wiring is used as the communication medium.

In another aspect of the present invention, a lossy or non-lossy compression of the image information is used for reducing the memory size and reducing the data rate required for the transmission over the communication medium. In this configuration, video compression functionality is added to the shaver, and a video de-compressor is added to the display unit for reconstructing the original signal.

In another aspect of the present invention, one or more light sources are added for better illumination of the photographed area or the shaving area.

In another aspect of the present invention, multiple image capturing mechanisms are used, each containing a lens and image sensor, allowing for capturing of larger shaving area. In one embodiment, each such image capturing can be mounted on a different wall or side of the electric shaver. In one embodiment, the lens is mounted in the cutter side of the shaver, which is in direct contact with the skin surface during shaving.

In another aspect of the present invention, digital image processing is used to analyze the captured image and notify the user (on the display or otherwise) of the results of such analysis. Individual hairs as well as hairy areas can be identified and marked.

In another aspect of the present invention, zooming and still image capturing features are provided, as well as other features commonly associated with still digital cameras and video cameras such as camcorders. Other controls such as brightness may also be provided.

In another aspect of the present invention, various controls are provided to the user by means of buttons and switches located as part of the electric shaver, or as part of the display unit or in both. Various visual indicators can also be employed.

In another aspect of the present invention, the camera added hardware in the shaver is powered from the same power source as the shaver itself, such as a battery (either primary or rechargeable) or from a domestic AC power. Similarly, the display unit may be powered locally from a battery or from the AC power. Further, the cable connecting between the electric shaver and the display unit (for example serving as the communication medium) can also be used to concurrently carry power either from the shaver to power the display unit or from the display unit to power the electric shaver unit.

In another aspect of the present invention, a single cable is used to connect the display unit with the electric shaver. The cable simultaneously carries both the communication signal for displaying the captured image on the display, and a power signal. The power signal can be fed from the display unit to power the electric shaver and its camera module, or alternately fed from the shaver to power the display unit. Carrying both the power and data signals over the same cable can make use of distinct separated wire sets, each set dedicated to one type of a signal. Alternatively, the same wires can carry both signals each over a different frequency band (FDM) or using phantom technique.

In another aspect of the present invention, the captured image is transmitted from the electric shaver using a standard analog or digital video interface, thus allowing the displaying of the video on standard and common video equipment.

One aspect of the present invention involves an electrically operated hair removing device for removing hair from a skin area, containing a casing, the casing further including a camera module for imaging at least part of the skin area, the camera module containing an optical lens for focusing received light mechanically oriented to guide the image of at least part of the skin area, a photosensitive image sensor array disposed approximately at an image focal point plane of the optical lens for capturing the image and producing electronic image information representing the image, and an analog to digital (A/D) converter coupled to the image sensor for generating digital data representation of the image. The image sensor may be based on Charge-Coupled Devices (CCD) or Complementary Metal-Oxide-Semiconductor (CMOS). The device may further contain an electric motor and a cutter driven by the motor, and may be power fed from a battery that is rechargeable or a primary type.

Further, the device may be operative to transmit the image digital data representation over a communication medium, and in such case may contain a port for coupling a signal to the communication medium, an image processor coupled to the analog to digital converter and for generating a digital data video signal carrying a digital data video according to a digital video format, and a transmitter coupled between the port and the image processor for transmitting the digital data video signal to the communication medium. The digital video format may be based on one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format) and DPOF (Digital Print Order Format) standards. Further, the device may be operative to compress the digital data video, and in such a case may further contain a video compressor coupled between the analog to digital (A/D) converter and the transmitter for compressing the digital data video before transmission to the communication medium. The compression may be based on intraframe or interframe compression, and can further be lossy or non-lossy compression. The communication over the communication medium may be half-duplex or full-duplex, and the device may further contain a receiver coupled to the port for receiving information from the communication medium.

In the case of using compression, the compression is based on a standard compression algorithm that is one or more out of JPEG (Joint Photographic Experts Group) and MPEG (Moving Picture Experts Group), ITU-T H.261, ITU-T H.263, ITU-T H.264 and ITU-T CCIR 601. For example, the compression can be based on ADV212 JPEG 2000 Video Codec, available from Analog Devices, Inc., from Norwood, Mass., U.S.A.

In one aspect of the invention the device casing further contains a battery, and the camera module is power fed from the battery. In an alternative solution, the device is operative to be powered from AC power, thus further contains an AC power plug for connecting to an AC power outlet for AC power feeding therefrom, and a power supply connected to the AC power plug to be power fed by the AC power, and the camera module is connected to be powered from the power supply. The power supply may include a step-down transformer and an AC/DC converter for DC powering the camera module.

In one aspect of the invention, the device further contains a display for displaying the captured image, the display may be mechanically attached to the casing and coupled to the analog to digital converter for visual displaying of the image representation. Further, the device may include a standard analog video interface, and in such a case the transmitter is an analog video driver, the analog video interface may be substantially based on one or more out of NTSC, PAL or SECAM formats, analog RGB and S-video, and the port is a coaxial or a RF connector. Alternatively, a standard digital video interface is employed, wherein the transmitter is a digital video driver and the port is a digital data connector. The digital video interface may be substantially based on one or more out of USB, SDI (Serial Digital Interface), FireWire, HDMI (High-Definition Multimedia Interface), DVI (Digital Visual Interface), UDI (Unified Display Interface), DisplayPort, Digital Component Video and DVB.

In one aspect of the invention, the communication medium is free air propagation of electromagnetic radio-frequency waves, and the port is an antenna for transmitting the wireless signal to the air, wherein the transceiver is a wireless transceiver. Such wireless communication and the wireless signal may be based on standard WPAN (Wireless Personal Area Network) or WLAN (Wireless Local area Network) technologies, and may substantially conform to at least one of the following standards: WMAN, WAN, BWA, LMDS, MMDS, WiMAX, HIPERMAN, IEEE802.16, Bluetooth, IEEE802.15, UWB (Ultra-Wide-band), ZigBee, cellular, IEEE802.11, WirelessHD, GSM, GPRS, 2.5G, 3G, UMTS, DCS, PCS and CDMA.

In one aspect of the invention, the communication medium is a wired medium, the port is a connector, and the transmitter is a wired transmitter adapted to transmit digital data to the wired medium. The communication over the wired medium may be according to a wired PAN (Personal Area Network) or a LAN (Local area Network) standard, and may further be based on serial or parallel transmission. For example, the wired medium may be a LAN cable substantially according to EIT/TIA-568 or EIA/TIA-570 containing a UTP (unshielded Twisted Pair) or STP (Shielded Twisted Pair). In such case the connector is an RJ-45 type, and the communication over the cable may substantially conform to IEEE802.3 Ethernet 10BaseT or 100BaseTX or 1000BaseT, and the transmitter may be a LAN transceiver. In an alternative aspect, the wired transmitter and the connector substantially conform to one out of IEEE1394, USB (Universal Serial Bus), EIA/TIA-232 and IEEE1284.

In one aspect of the invention, the communication medium is a cable, the port is a connector, and the transmitter is a wired transmitter adapted to transmit digital data to the wired medium. Further, the cable concurrently carries a power signal, and the device is at least in part powered from the power signal. The power signal may be a DC (Direct Current) power signal, or an AC (Alternating Current) power signal. The cable may contain multiple insulated wires, and the power signal may be carried over dedicated wires distinct from the wires carrying the communication signal. In the case wherein the cable contains multiple insulated wires, and the wires are used to simultaneously carry both power and communication signals, the power and communication signals are carried over the same wires. In such a case the power may be a DC power carrying over a phantom channel over the wires. For example, the cable may be a LAN cable substantially according to EIT/TIA-568 or EIA/TIA-570 and containing UTP or STP twisted-pairs, the connector may be RJ-45 type, the communication over the cable may substantially conform to IEEE802.3 Ethernet 10BaseT, 100BaseTX, or 1000BaseT, the transmitter may be a LAN transceiver, and the power may be carried over the cable substantially according to IEEE802.3af or IEEE802.3 at standards.

Alternatively, the power and communication signals may be carried over the same wires using Frequency Division Multiplexing (FDM), wherein the power signal is carried over a power frequency, and wherein the communication signal is carried over a communication frequency band distinct and above the power frequency. In this case, the device may further include a low pass filter coupled between the connector and the transmitter for substantially passing only the power frequency, for powering the transmitter from the power signal. Such device may also further include a high pass filter coupled between the connector and the transmitter for substantially passing only the communication frequency band, for passing the communication signal between the connector and the transmitter. In the case where power is AC power, the connector may be an AC power plug for connecting to AC power wiring, and the transmitter may be part of a powerlines modem, such as HomePlug or UPB.

In one aspect of the invention, the device further contains an additional optical lens for focusing received light mechanically oriented to guide the image of at least part of the skin area, an additional photosensitive image sensor array disposed approximately at an image focal point plane of the additional optical lens for capturing the image and producing additional electronic image information representing the image, and an additional analog to digital (A/D) converter coupled to the additional image sensor for generating an additional digital data representation of the image. The device may further include a multiplexer coupled to the analog to digital converters for generating a multiplexed signal containing the digital data representation of the images, a port for coupling a signal to the communication medium, and a transmitter coupled between the port and the image processor for transmitting the multiplexed signal to the communication medium.

In one aspect of the invention, the device further contains a digital image processor for processing the digital data representation of the image. The digital image processor may be operative to identify individual hair or a hairy area in the captured image, and the device may be further operative to generate a digital data representation of the image wherein the individual hairs or the hairy area are marked.

In one aspect of the invention, the device further includes a light source for providing an illumination. The light source may be mechanically mounted for illumination of at least part of the skin area captured by the optical lens and image sensor, and can be an LED (Light Emitting Diode).

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

It is understood that other embodiments of the present invention will become readily apparent to those skilled in the art from the following detailed description, wherein are shown and described only embodiments of the invention by way of illustration. As will be realized, the invention is capable of other and different embodiments and its several details are capable of modification in various other respects, all without departing from the scope of the present invention as defined by the claims. Accordingly, the drawings and detailed description are to be regarded as illustrative in nature and not as restrictive.

The above and other features and advantages of the present invention will become more fully apparent from the following description, drawings and appended claims, or may be learned by the practice of the invention as set forth hereinafter. It is intended that all such additional apparatus and advantages be included within this description, be within the scope of the present invention, and be protected by the accompanying claims.

BRIEF DESCRIPTION OF THE DRAWINGS

In order that the manner in which the above recited and other advantages and features of the invention are obtained, a more particular description of the invention briefly described above will be rendered by reference to specific embodiments thereof, which are illustrated in the appended figures and drawings. The invention is herein described, by way of non-limiting example only, with reference to the accompanying figures and drawings, wherein like designations denote like elements. Understanding that these drawings only provide information concerning typical embodiments of the invention and are not therefore to be considered limiting in scope:

FIG. 19 illustrates schematically views displayed on the display unit according to the invention;

DETAILED DESCRIPTION OF EMBODIMENTS

Figure 1:
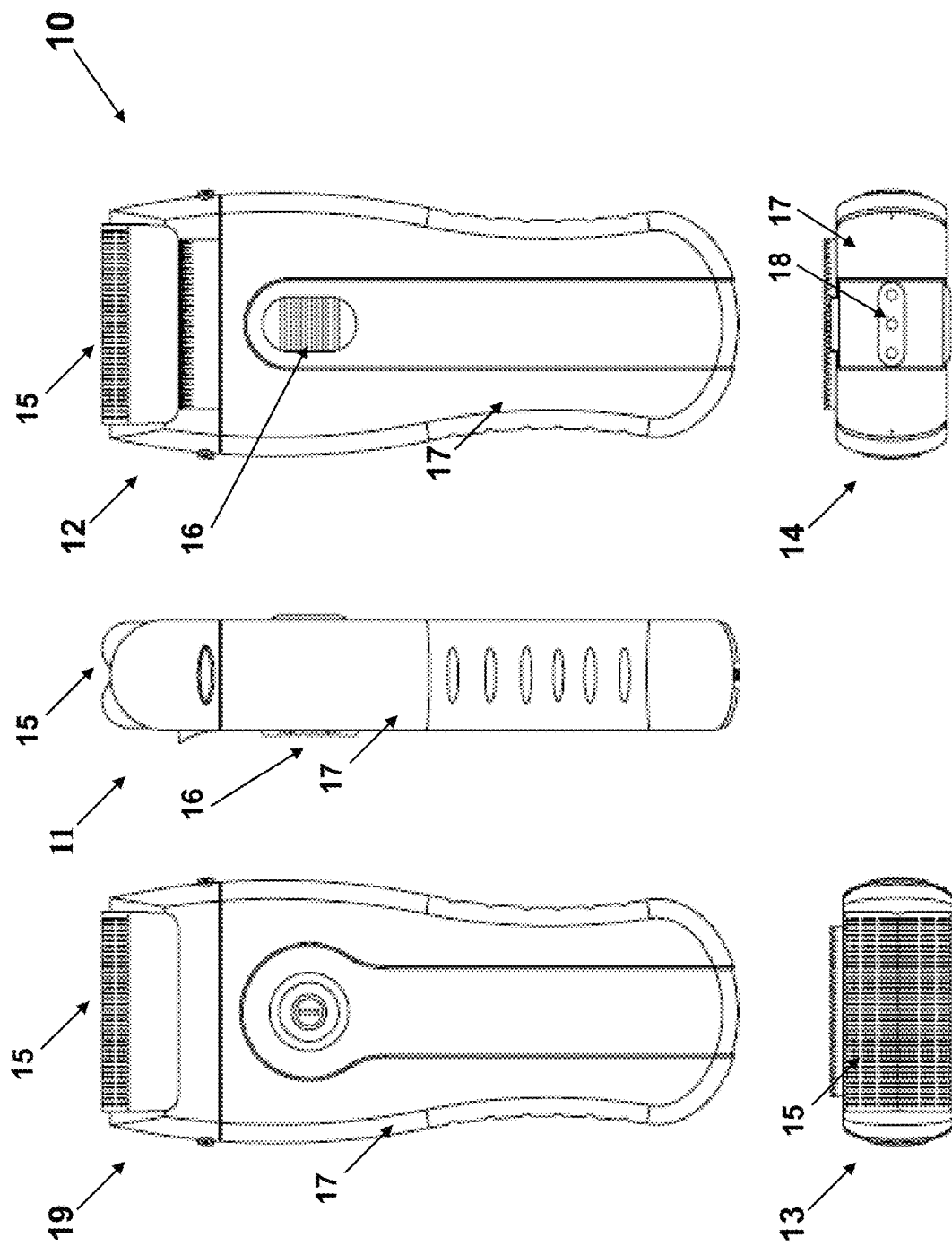
FIG. 1 illustrates schematically views of a prior-art electric shaver.

The principles and operation of a network according to the present invention may be understood with reference to the figures and the accompanying description wherein similar components appearing in different figures are denoted by identical reference numerals. The drawings and descriptions are conceptual only. In actual practice, a single component can implement one or more functions; alternatively, each function can be implemented by a plurality of components and circuits. In the figures and descriptions, identical reference numerals indicate those components that are common to different embodiments or configurations. Identical numerical references (even in the case of using different suffix, such as 5, 5a, 5b and 5c) refer to functions or actual devices that are either identical, substantially similar or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention.

Figure 2:
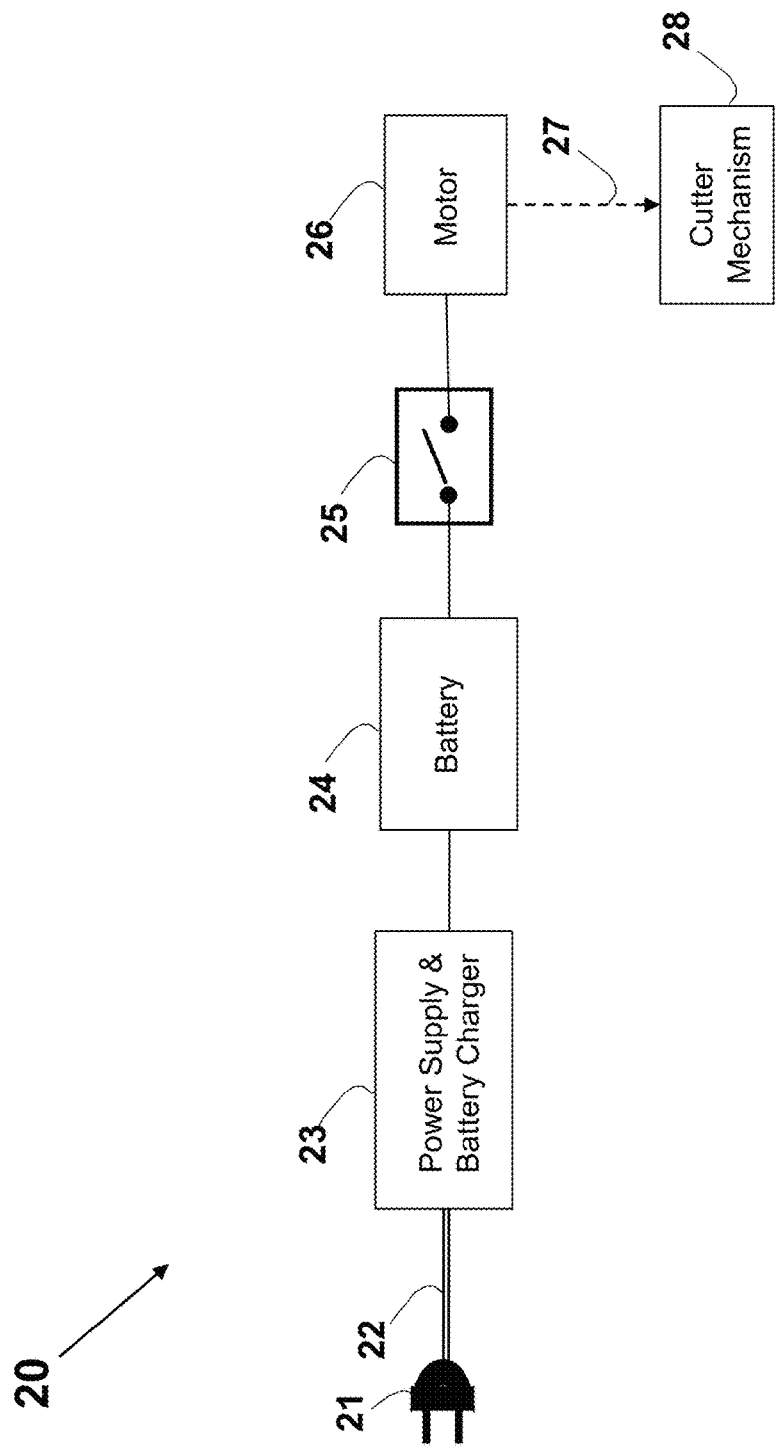
FIG. 2 illustrates schematically a simplified general functional block diagram of a prior art electric shaver.
Figure 3:
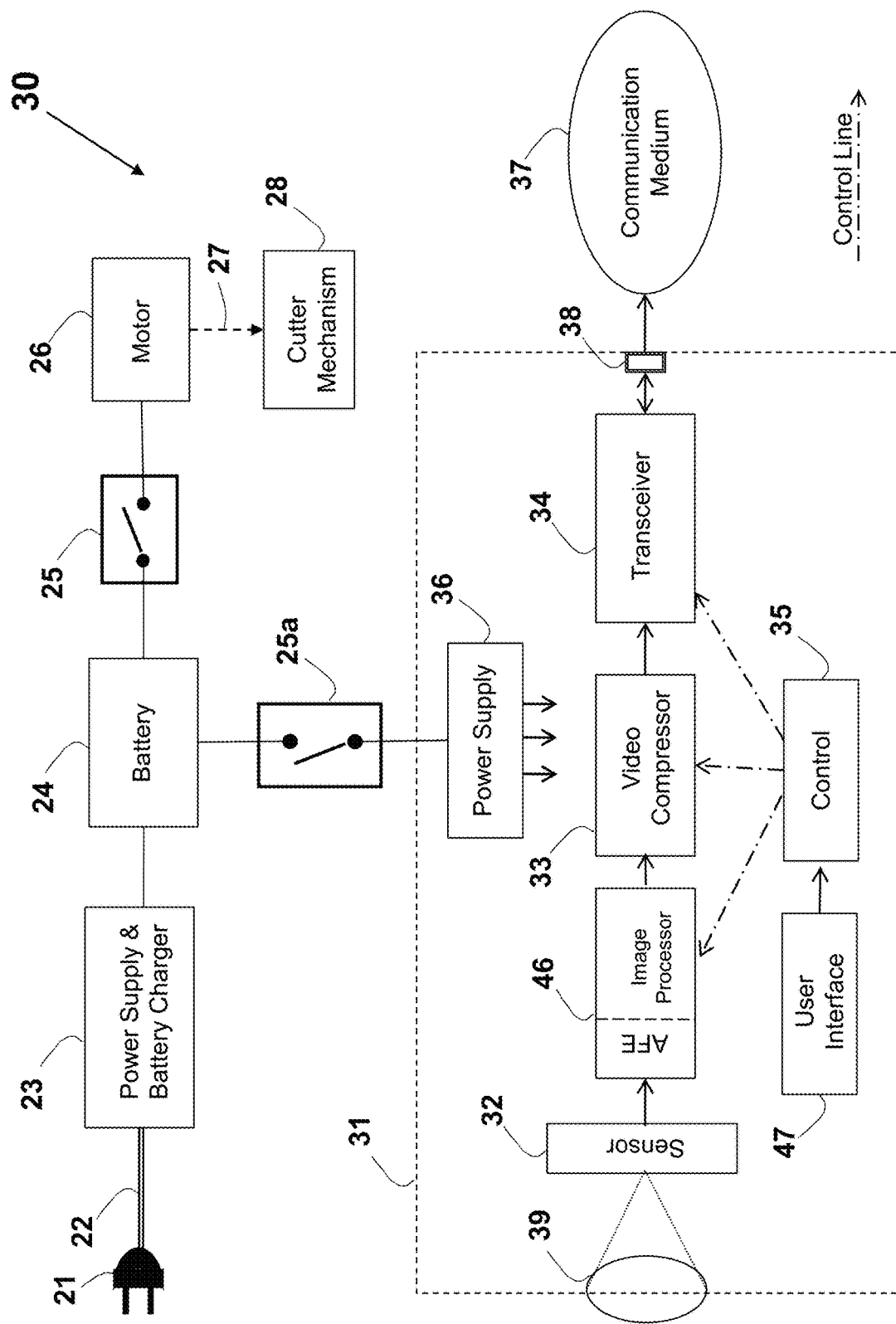
FIG. 3 illustrates schematically a simplified general functional block diagram of an electric shaver according to the invention.

FIG. 3 illustrates schematically a simplified general block diagram of an electric shaver including a digital camera module 31 according to one embodiment of the invention. The digital camera module 31 functions to receive visual information, such as the skin surface to be shaved, that was shaved, or the present shaving area, and interpret it as an electronic video signal to be remotely displayed by a display unit. The camera module can take still photographs, video streams or both. The electric shaver 30 shown in FIG. 3 includes the electrical shaver 20 described in FIG. 2, added with digital camera functionality 31. Preferably, the same enclosure (such as housing 17 shown in FIG. 1) is used to house both the electric shaver and the digital camera functions. Preferably, the electric shaver 30 will have the same 'look and feel' of a common electric shaver.

The digital camera 31 includes lens 39 (or few lenses) for focusing the received light onto a small semiconductor sensor 32. The sensor 32 commonly includes a panel with a matrix of tiny light-sensitive diodes (photocells), converting the image light to electric charges and then to electric signals, thus creating a video picture or a still image by recording the light intensity. Charge-Coupled Devices (CCD) and CMOS (Complementary Metal-Oxide-Semiconductor) are commonly used as the light-sensitive diodes. Linear or area arrays of light-sensitive elements may be used, and the light sensitive sensors may support monochrome (black & white), color or both. For example, the CCD sensor KAI-2093 Image Sensor 1920 (H)×1080 (V) Interline CCD Image Sensor or KAF-50100 Image Sensor 8176 (H)×6132 (V) Full-Frame CCD Image Sensor can be used, available from Image Sensor Solutions, Eastman Kodak Company, Rochester, N.Y.

An image processor block 46 receives the analog signal from the image sensor. The Analog Front End (AFE) in the block 46 filters, amplifies and digitizes the signal, using an analog-to-digital (A/D) converter. The AFE further provides correlated double sampling (CDS), and provides a gain control to accommodate varying illumination conditions. In the case of CCD sensor 32, a CCD AFE (Analog Front End) component may be used between the digital image processor 46 and the sensor 32. Such an AFE may be based on VSP2560 'CCD Analog Front End for Digital Cameras' from Texas Instruments Incorporated of Dallas Tex., U.S.A. The block 46 further contains a digital image processor, which receives the digital data from the ATE, and processes this digital representation of the image to handle various industry-standards, and to execute various computations and algorithms. Preferably, additional image enhancements may be performed by the block 46 such as generating greater pixel density or adjusting color balance, contrast and luminance. Further, the block 46 may perform other data management functions and processing on the raw digital image data. Commonly, the timing relationship of the vertical/horizontal reference signals and the pixel clock are also handled in this block. Digital Media System-on-Chip device TMS320DM357 from Texas Instruments Incorporated of Dallas Tex., U.S.A. is an example of a device implementing in a single chip (and associated circuitry) part or all of the image processor 46, part or all of the video compressor 33 and part or all of transceiver 34. In addition to a lens or lens system, color filters may be placed between the imaging optics and the photosensor array to achieve desired color manipulation.

The block 46 converts the raw data received from the photosensor array 32 into a color-corrected image in a standard image file format. In order to transmit the digital image to a remote display over a communication medium 37 (which may contain a wired or non-wired medium), a transmitter or transceiver 34 is disposed between the medium 37 and the image processor 46. The transceiver 34 also includes isolation magnetic components (e.g. transformer-based), balancing, surge protection, and other suitable components required for providing a proper and standard interface via a port 38. In the case of connecting to a wired medium, the port 38 will contain a connector and the port further contains protection circuitry for accommodating transients, over-voltage and lightning, and any other protection means for reducing or eliminating the damage from an unwanted signal over the wired medium. A band pass filter may also be used for passing only the required communication signals, and rejecting or stopping other signals in the described path. A transformer may be used for isolating and reducing common-mode interferences. Further a wiring driver and wiring receivers may be used in order to transmit and receive the appropriate level of signal to and from the wired medium. An equalizer may also be used in order to compensate for any frequency dependent characteristics of the wired medium. Further, the communication over the communication medium 37 can be bi-directional, such as half-duplex or full-duplex, or one-way, wherein the shaver only transmits the image to the display unit.

The port 38 couples to the communication medium 37, and may be a connector in case of wired medium such as a cable or wires, or an antenna in the case of radio-frequency over-the-air wireless transmission.

A controller 35, located within the camera module 31, may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. The controller 35 commonly includes a memory that may include a static RAM (random Access Memory), dynamic RAM, flash memory, ROM (Read Only Memory), or any other data storage medium. The memory may include data, programs, and/or instructions and any other software or firmware executable by the processor. The control logic can be implemented in hardware or in software, such as a firmware stored in the memory. The controller 35 controls and monitors the device operation, such as initialization, configuration, interface and commands. The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Power to the digital camera module 31 is fed from the battery 24 via on/off switch 25a for its described functions such as for capturing, storing, manipulating, and transmitting the image. The battery 24 power feeds the power supply 36, which provides needed voltages to all the camera module 31 components. The power supply 36 contains a DC/DC converter. In another embodiment, the power supply 36 is power fed from the AC power supply via AC plug 21 and cord 22, and thus may include an AC/DC converter, for converting the AC power (commonly 115 VAC/60 Hz or 220 VAC/50 Hz) into the required DC voltage or voltages. Such power supplies are known in the art and typically involves converting 120 or 240 volt AC supplied by a power utility company to a well-regulated lower voltage DC for electronic devices. In one embodiment, power supplies 36 and 23 are integrated into a single device or circuit, in order to share common circuits. Further, the power supplies 36 and 23 may include a boost converter, such as a buck boost converter, charge pump, inverter and regulators as known in the art, as required for conversion of one form of electrical power to another desired form and voltage. While both power supplies 23 and 36 (either separated or integrated) can be an integral part and housed within the shaver enclosure, they may be enclosed as a separate housing connected via cable to the shaver assembly. For example, a small outlet plug-in step-down transformer shape can be used (also known as wall-wart, "power brick", "plug pack", "plug-in adapter", "adapter block", "domestic mains adapter", "power adapter", or AC adapter). Further, each of the power supplies 23 and 36 may be a linear or switching type.

Various formats that can be used to represent the captured image are TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. In many cases, video data is compressed before transmission, in order to allow its transmission over a reduced bandwidth transmission system. A video compressor 33 (or video encoder) is shown in FIG. 3 disposed between the image processor 46 and the transceiver 34, allowing for compression of the digital video signal before its transmission over the communication medium 37. In some cases compression will not be required, hence obviating the need for such compressor 33. Such compression can be lossy or lossless types. Common compression algorithms are JPEG (Joint Photographic Experts Group) and MPEG (Moving Picture Experts Group). The above and other image or video compression techniques can make use of intraframe compression commonly based on registering the differences between part of single frame or a single image. Interframe compression can further be used for video streams, based on registering differences between frames. Other examples of image processing include run length encoding and delta modulation. Further, the image can be dynamically dithered to allow the displayed image to appear to have higher resolution and quality.

Figure 4:
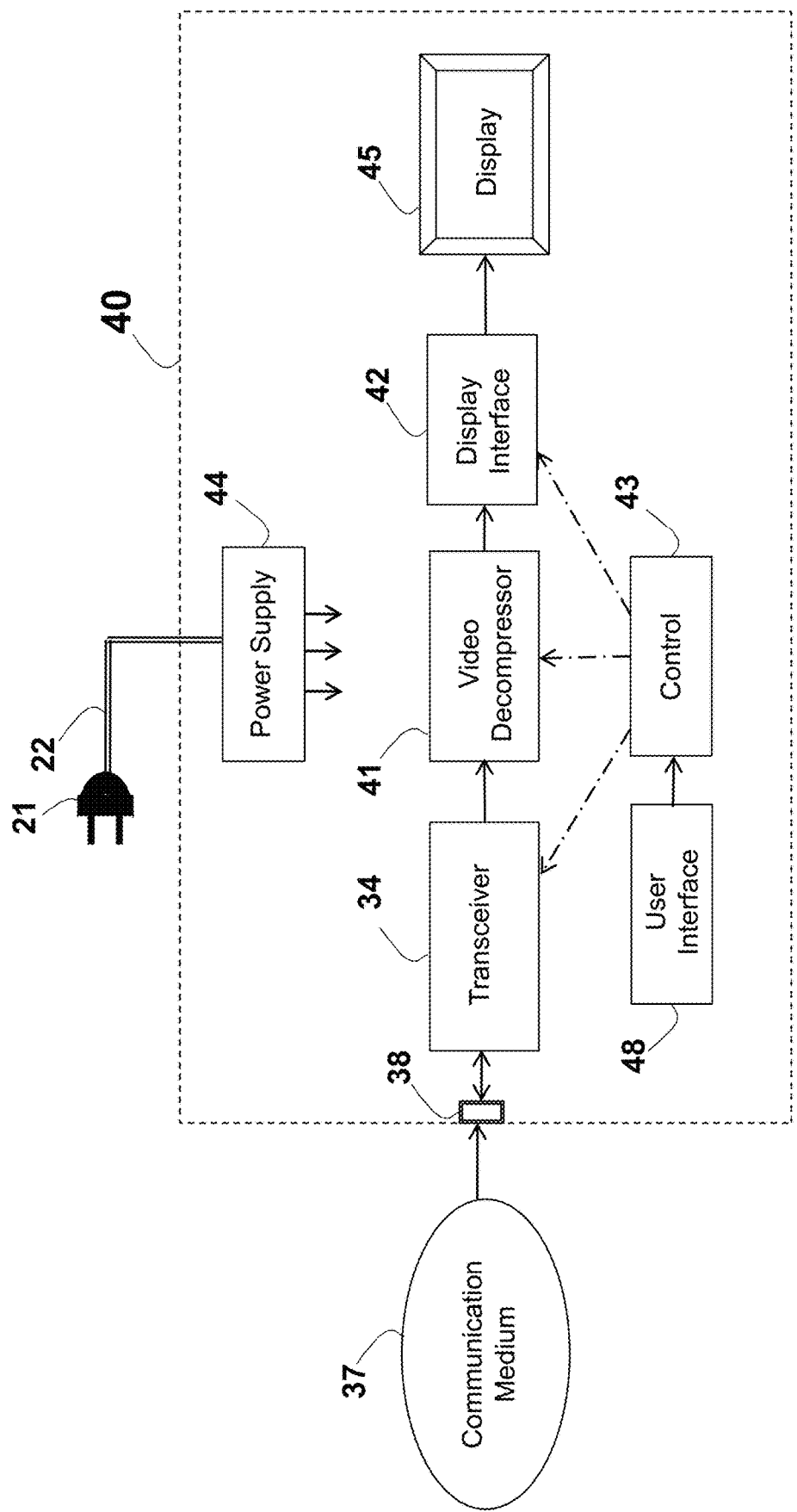
FIG. 4 illustrates schematically a simplified general functional block diagram of a display unit according to the invention.

Single lens or a lens array 39 is positioned to collect optical energy representative of a subject or a scenery, and to focus the optical energy onto the photosensor array 32. Commonly, the photosensor array 32 is a matrix of photosensitive pixels, which generates an electric signal that is representative of the optical energy that is directed at the pixel by the imaging optics. The image captured by the sensor 32 via the lens 39 is reconstructed and displayed in a display unit 40, which can be a separated device located at a place convenient to look at while shaving. FIG. 4 shows such a display unit 40. The signal transmitted by the shaver/camera combined unit 30 is received from the communication medium 37 via the port 38. A receiver or transceiver 34 is compatible with the shaver transmitter (or transceiver) and receives the digital data signal and feeds it to a video de-compressor (or video decoder) 41. The original data is reconstructed and fed to a display interface 42, for feeding to a display 45. The display unit 40 is shown as being AC power fed via AC plug 21 and cord 22, feeding in turn the power supply 44, which may be similar or the same type as power supply 23, which in turn provides all required voltages required for the active components of the display unit 40. A controller 43, which may be the same or similar to controller 35 above is used to control and monitor the device operation. The display 45 may be a digital or analog video display, and may use technologies such as LCD (Liquid Crystal Display), TFT (Thin-Film Transistor), FED (Field Emission Display), CRT (Cathode Ray Tube) or any other electronic screen technology that visually shows information such as graphics or text. In many cases, an adaptor (not shown) is required in order to connect an analog display to the digital data. For example, the adaptor may convert to composite video (PAL, NTSC) or S-Video or HDTV signal. A user interface 48, coupled to the control 43, may include various user operated switches to control the display operation. Various user controls can be available to allow the user to control and effect the display unit 40 operations, such as an on/off switch, a reset button and others. Other exemplary controls involve display associated settings such as contrast, brightness and zoom.

Figure 5:
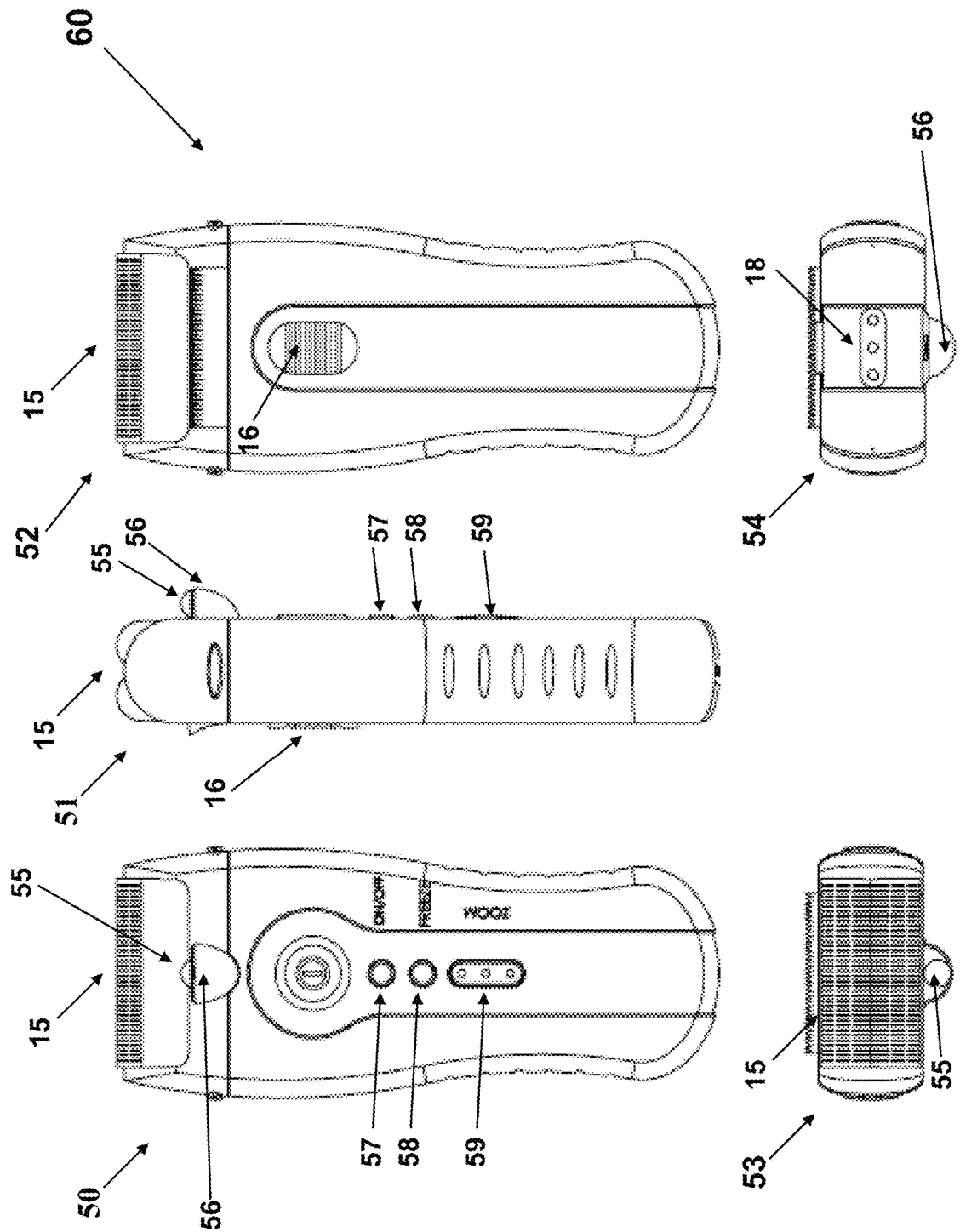
FIGS. 5 and 5a illustrate schematically views of an electric shaver according to the invention.

FIG. 5 shows various views of an example of an electric shaver 60 according to one embodiment of the invention, based on shaver 10 shown in FIG. 1. View 52 is a front view of the shaver 60, view 51 is a side view, and view 50 is a rear view of the shaver 60. View 53 is a top view of the foil 15, which is usually in contact with skin and hair, and view 54 is a bottom view showing connector 18 for connecting to a power source. Added to shaver 10, FIG. 5 shows a lens 55, which corresponds to the lens 39 shown in FIG. 3. The lens 55 is housed and mechanically secured in a lens seating (or lens housing) 56, which is part of or secured to the enclosure 17, and keeps the lens 55 protected, in place, and directed towards the face while shaving. The lens 55 focuses the image onto a sensor 32 via an aperture in the shaver external enclosure. While the lens 55 and the related support 56 are shown located on the rear of the shaver 60, it is apparent that they can be equally mounted on the front or on any one of the sides of the shaver 60. While the invention is shown in FIG. 5 with respect to straight blades mechanism, it is apparent that the invention herein can equally apply to a rotary type electric shaver. While the lens 55 and its corresponding seating 56 are shown to protrude a little from the side of the shaver casing 17 shown in FIG. 1, a recessed design wherein there is no such protruding can also be used. Preferably, the shaver with the camera module may preserve the general look and design of a conventional shaver without a camera, allowing the user to easily migrate to using the new functionality.

FIG. 5 further shows various user controls that may be required for the proper operation of the combined shaver/camera 60. An ON/OFF switch 57 corresponds to switch 25a in FIG. 3, allowing the user to start or stop the camera module 31 operations. Button 'FREEZE' 57 allows for capturing and freezing an image. Sliding button 'ZOOM' 59 allows the zoom control of the camera operations.

Figure 5A:
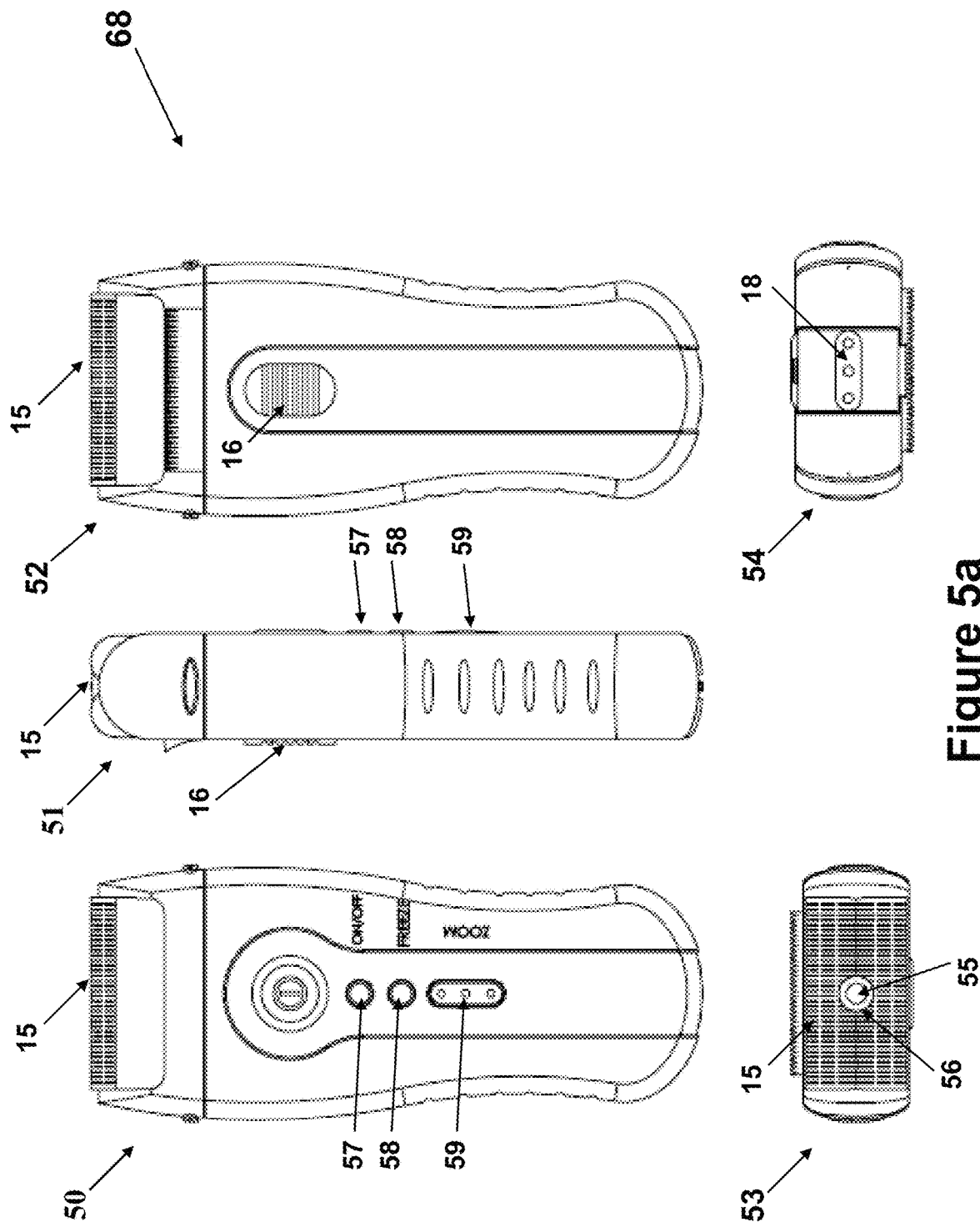

While FIG. 5 above shows an example wherein the lens 55 is mounted on one of the sides of the shaver, in one embodiment the lens 55 is mounted on the top side of the shaver, as shown in views 68 in FIG. 5a. The lens 55 mounted in base 56, is shown recessed as part of the shaving foil, thus directly viewing the part that is shaved or about to be shaved.

Figure 6:
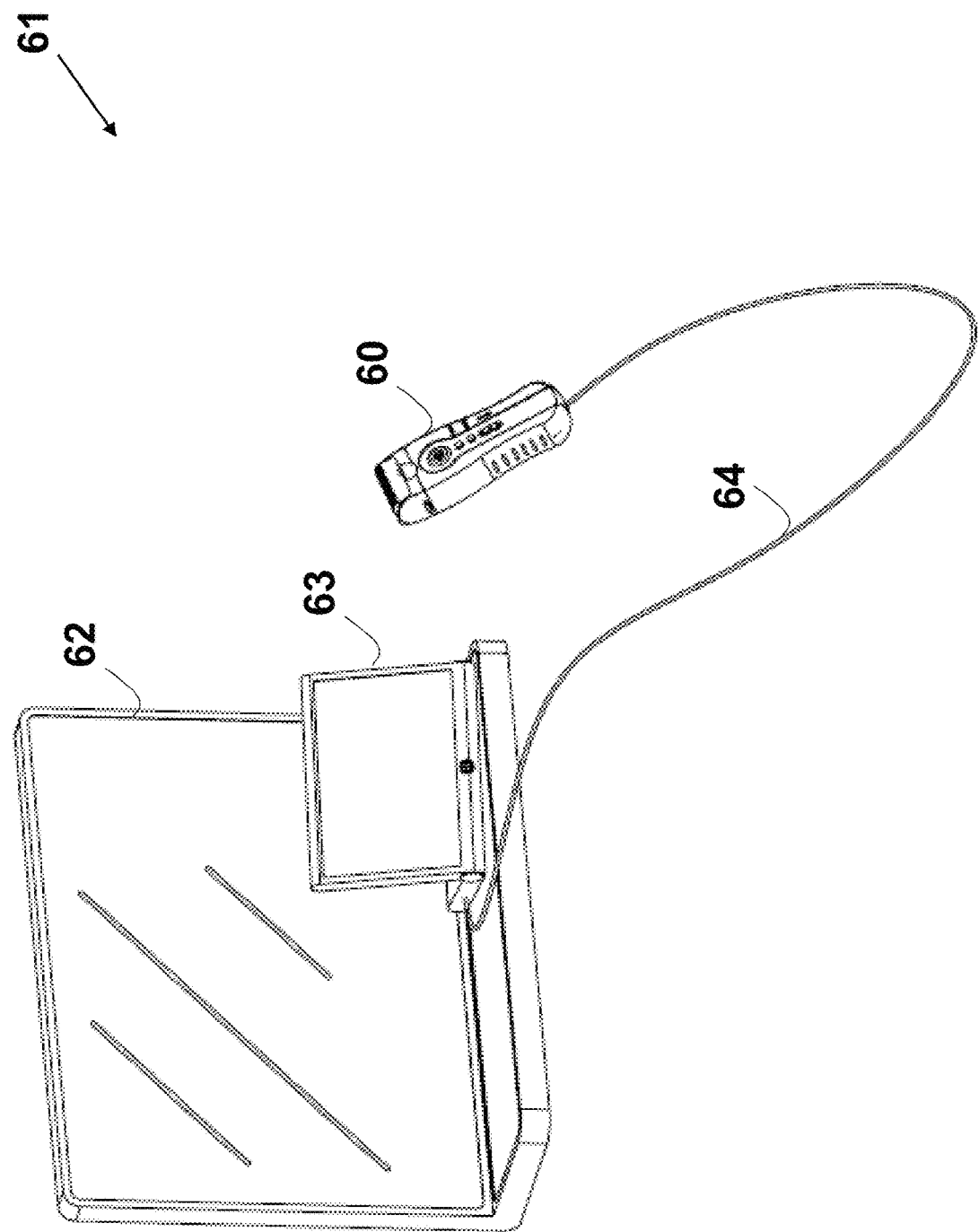
FIG. 6 illustrates schematically a system including an electric shaver and a display unit according to the invention.

A system 61 according to one embodiment of the invention includes both electric shaver 60 and display unit 63, as shown in FIG. 6. Display unit 63 corresponds to unit 40 shown in FIG. 4. Cable 64 is shown to connect shaver 60 and display unit 63, serving as the communication medium 37 (shown in FIG. 3) for transmitting the image as a video stream from the shaver 60 to the display 63. Display unit 63 is shown to be on a shelf in a bathroom, also containing a mirror 62, as is commonly available in a bathroom. The mirror 62 can supplement the view on the display 63 for better view of the skin shaving area.

Figure 7:
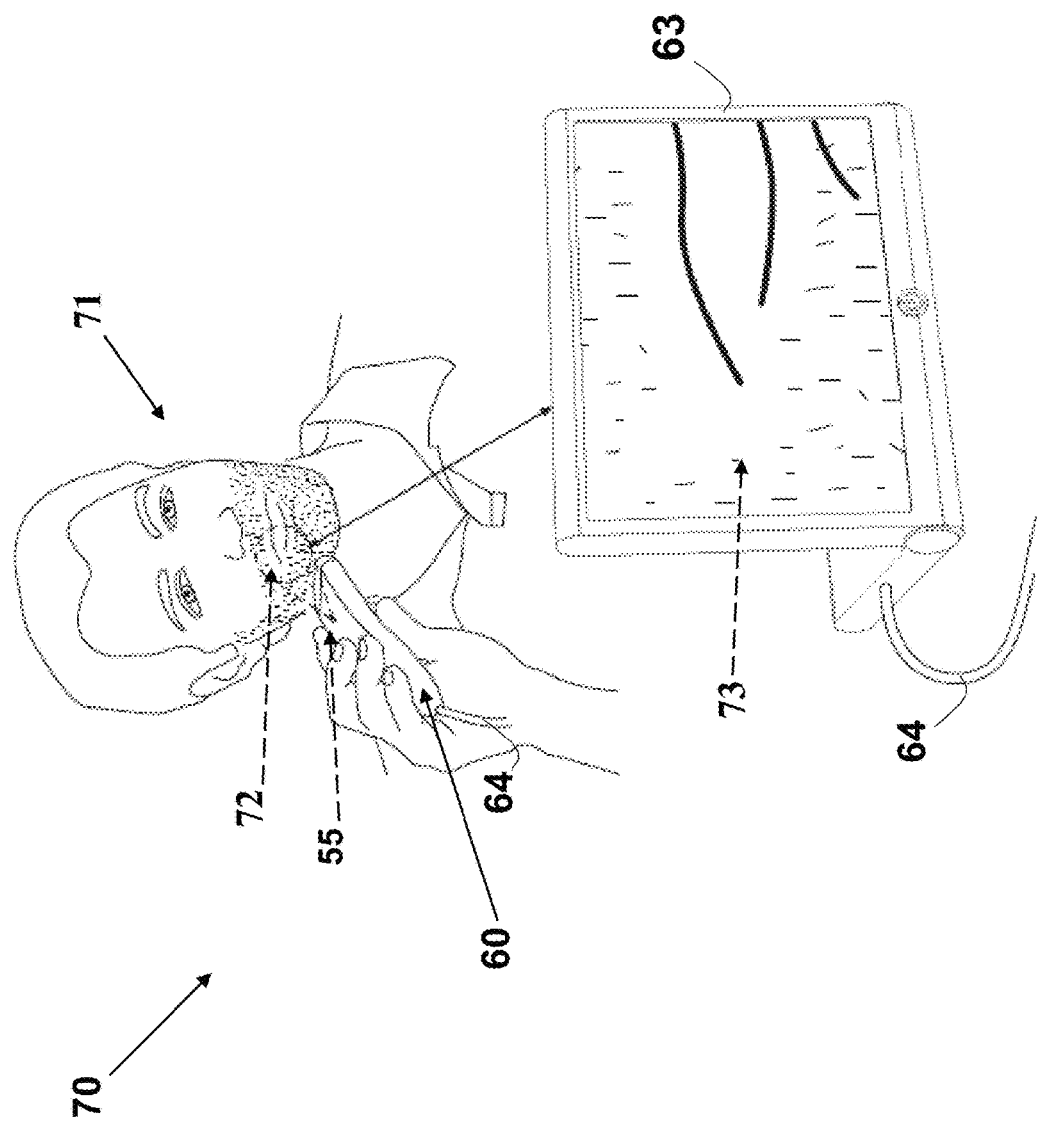
FIG. 7 illustrates schematically a human male facial shaving using an electric shaver and a display unit according to the invention.

System operation is exampled as view 70 in FIG. 7. The shaver 60 is shown used for facial shaving by a human male 71, and connected to display unit 63 via cable 64. The lens 55 in the electric shaver 60 captures the surface area shown as 72, and transmits it to be displayed as image 73 in the display unit 63. The user can look at the display 73 located in front of him, thus and easily and clearly track and see the shaving area to be shaved 72 and the shaving results.

Figure 8:
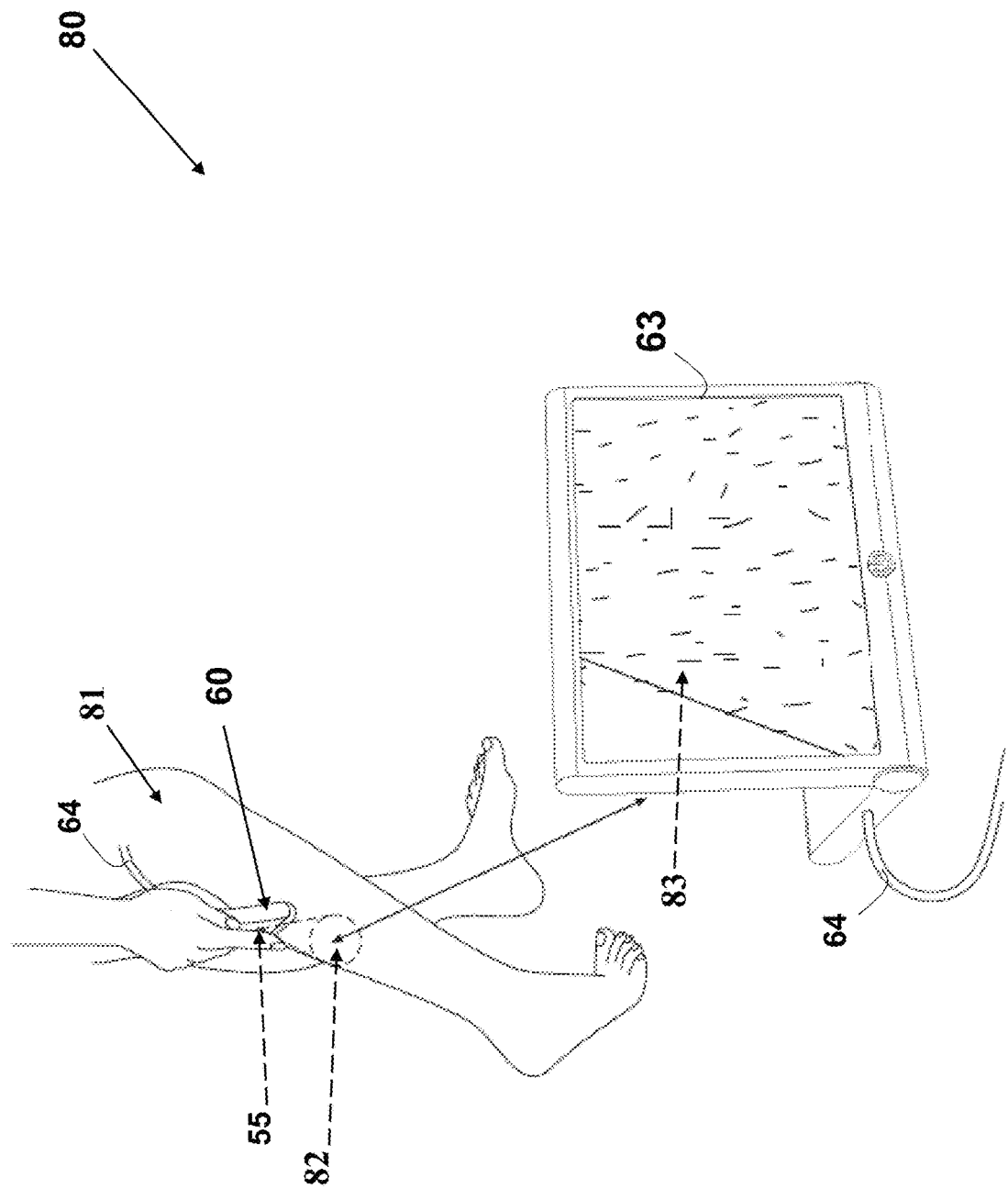
FIG. 8 illustrates schematically a human female leg shaving using an electric shaver and a display unit according to the invention.

While the invention has been exampled above with regard to human male facial shaving, it is apparent that the invention can apply to any other type of human shaving any part of the body skin. For example, hair leg shaving of a female human is exampled as system 80 in FIG. 8. The shaver 60 is shown used for facial shaving by a human female 81, and connected to display unit 63 via cable 64. The lens 55 in the electric shaver 60 captures the skin area shown as 82, and transmits it to be displayed as image 83 in the display unit 63. The user can conveniently look at the image 83 located in front of him, and easily and clearly track and see the skin area to be shaved 82 and the shaving results.

While the invention has been exampled above with regard to humans shaving hair, it is apparent that the invention equally applies to animals such as pets, wherein there is a need to shave or groom their hair. Further, the invention can be equally applied to any scenario wherein skincare is employed, requiring touching or close proximity with the skin to be treated, such as depilation or epilation. In those cases, a camera module such as module 31 shown in FIG. 3 (or module 121 shown in FIG. 12) is added in order to allow easy and convenient view of the skin area to be treated.

In one embodiment according to the invention, the electric shaver is cordless, thus untethered and fully portable. In such a configuration, the shaver is battery operated, thus powered from an internal battery during operation without the need to connect to a power source, such as AC power via a cord. Further, the image is transmitted over the air using radio frequency, thus obviating the need for a cable or any other conductor connecting the shaver and the display unit. It is apparent the radio communication of the image can be implemented also in the case of AC powered (via cable) shaver.

Figure 9:
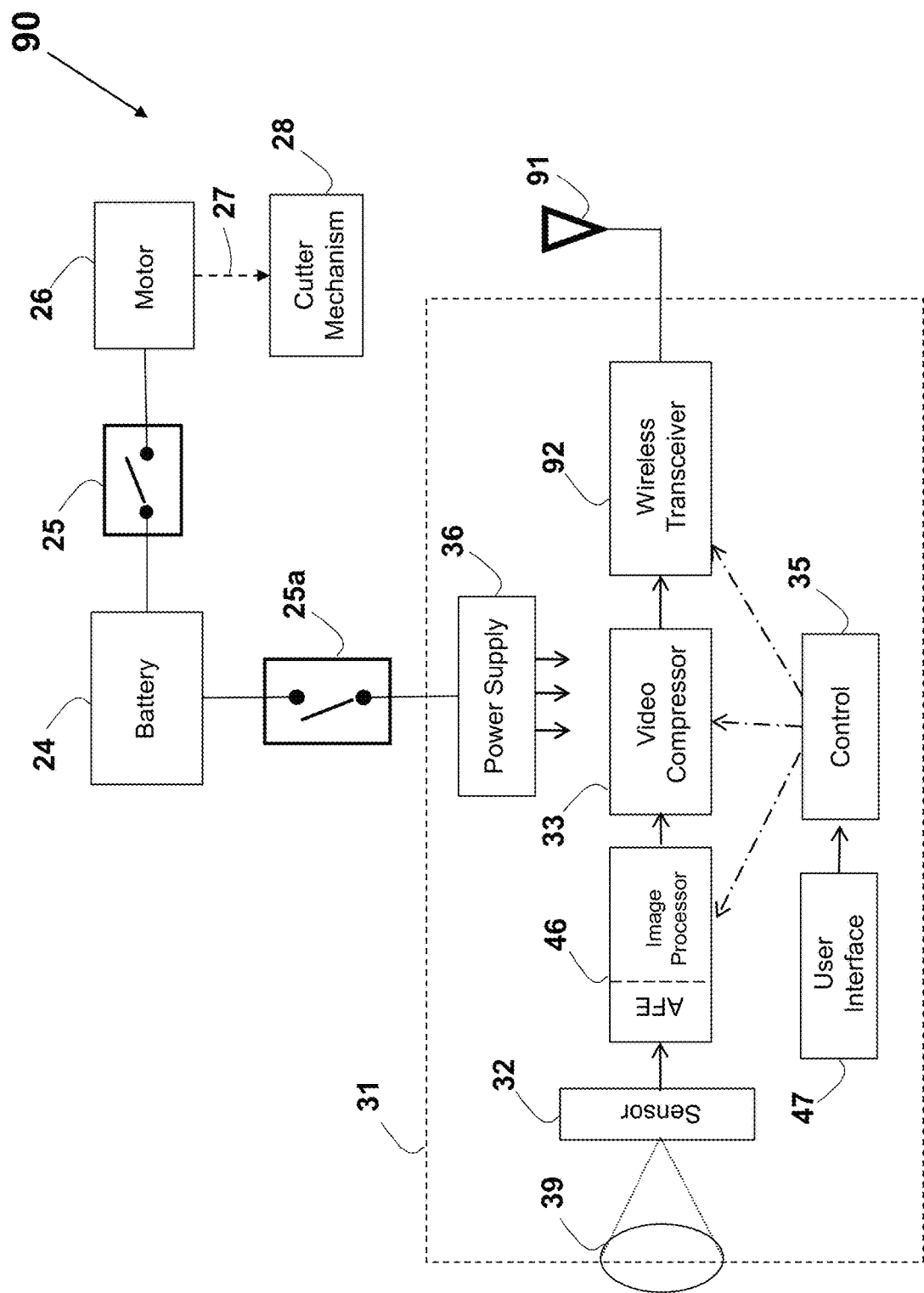
FIG. 9 illustrates schematically a simplified general functional block diagram of an electric shaver according to the invention.
Figure 10:
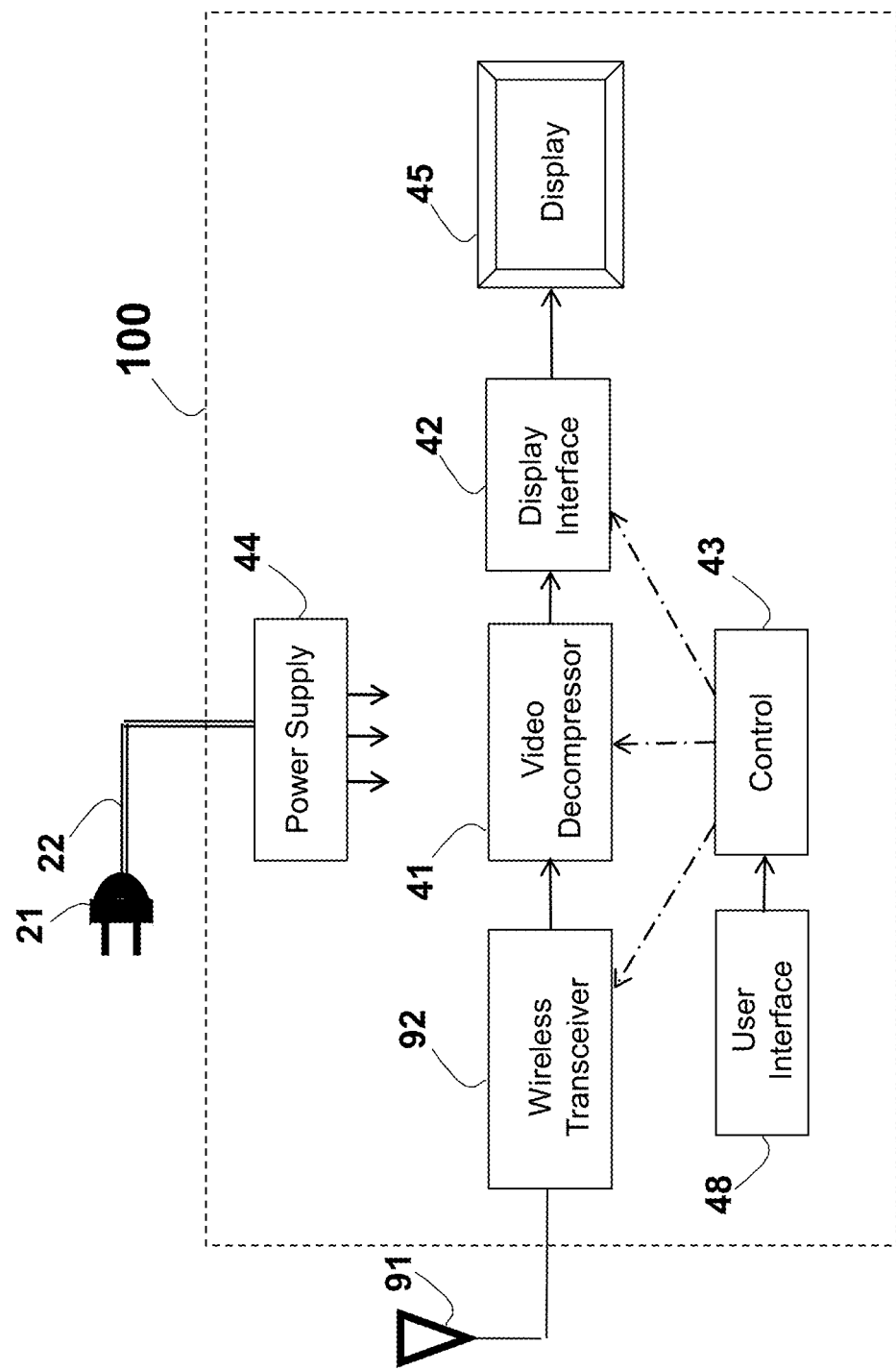
FIG. 10 illustrates schematically a simplified general functional block diagram of a display unit according to the invention.
Figure 11:
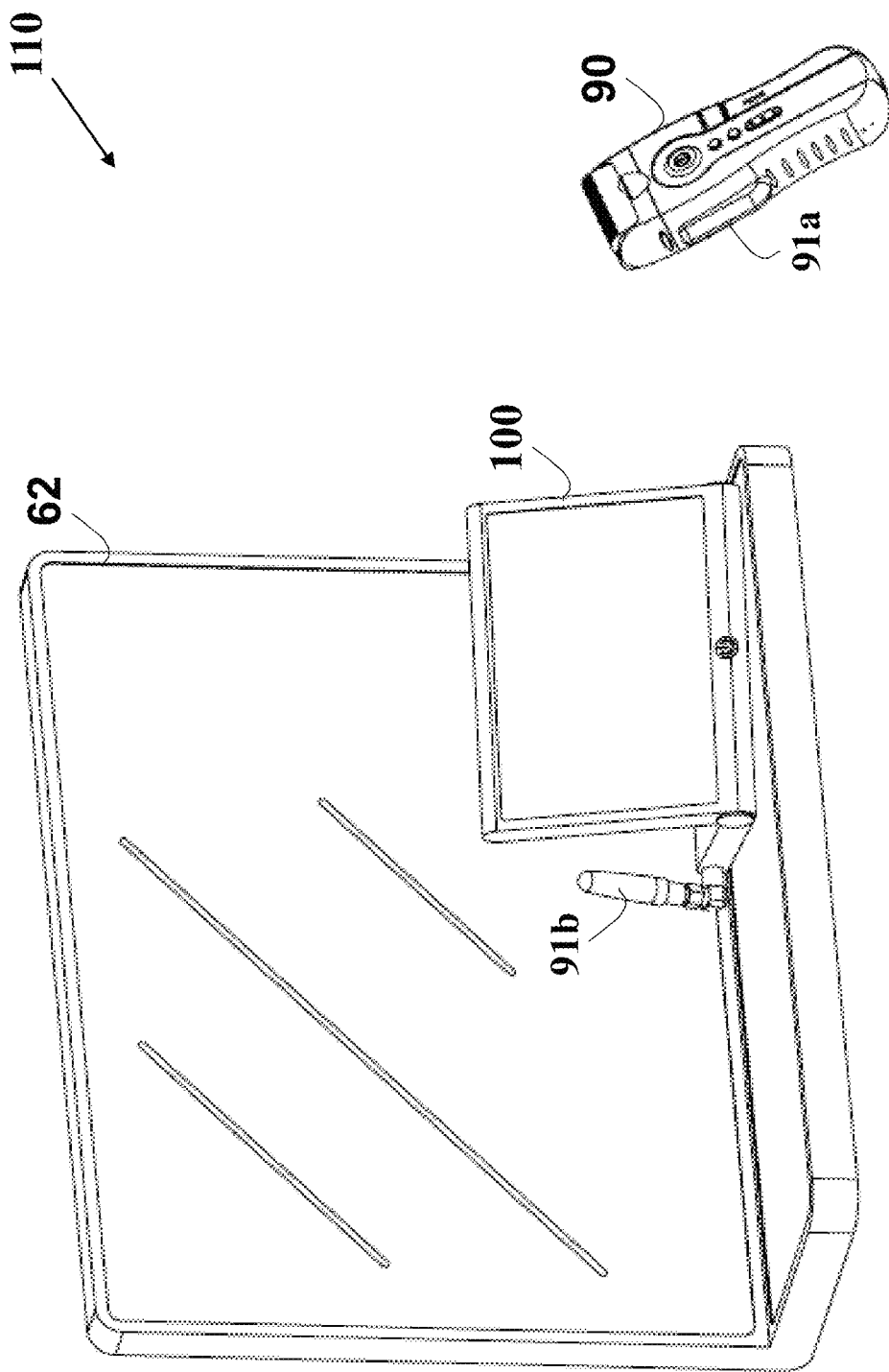
FIG. 11 illustrates schematically a system including an electric shaver and a display unit according to the invention.

A cordless electric shaver 90 is shown in FIG. 9, adapted from shaver 30 in FIG. 3. The shaver 90 is powered during shaving solely from battery 24, which may be a primary or secondary—rechargeable type. The rechargeable battery can be charged, while not powered, while still in the shaver. The communication medium 37 (shown in FIG. 4) is over-the-air communication, using antenna 91 (serving as port 38) connected to wireless transceiver 92 (serving as transceiver 34). Similarly, display unit 40 shown in FIG. 4 is adapted to support wireless communication. Wireless supporting display unit 100 in shown in FIG. 10, including an antenna 91 and wireless transceiver 92 representing port 38 and transceiver 34 (shown in FIG. 4) respectively. A wireless system 110 is shown in FIG. 11, adapted from system 61 in FIG. 6, and comprising a wireless shaver 90 with antenna 91a shown (representing antenna 91 in FIG. 9). The antenna 91a is in communication with antenna 91b (corresponding to antenna 91 in FIG. 10), which is part of display unit 100. As shown in system 110, there is no cable connecting between the shaver 90 and the display unit 100, thus avoiding the inconvenience associated with such cord. Various types of antennas 91 (or any other radio ports) can be used. Among these are PCB printed antennas, chip antennas, as well as panel and dome antennas. Furthermore, the antennas may be omni-directional or directional. Typically, the antennas are coupled using mating coaxial connectors, such as SMA, F-Type, N-Type and IPX, providing both the electrical connection as well as the mechanical attachment. In many cases, the antenna connection allows for easy disconnection and connection by means of snapping or screwing.

Any short-range wireless communication based on free-air propagation can be used for communication between the wireless shaver 90 and the display unit 100 in system 110. According to one embodiment of the invention, a WLAN communication link is used to interconnect two or more isolated (W)PAN (Wireless Personal Area Network) systems. The reach of a PAN is typically a few meters, hence such networks are confined to a limited space, such as in-room communication. IEEE 802.15 is the working group of the IEEE 802, which specializes in Wireless PAN (WPAN) standards. Non-limiting examples of WPAN systems include:

a. Bluetooth, which according to IEEE 802.15.1 standard, for example, operates over license-free ISM band at 2.45 GHz. An ad-hoc network of computing devices using Bluetooth technology protocols is known as piconet.

b. Ultra-Wide-band (UWB), which according to the IEEE 802.15.3 standard, for example, uses a wavelet (sometimes referred to as wireless USB). UWB or impulse radio transmitters emit short pulses approaching a Gaussian monocycle with tightly controlled pulse-to-pulse intervals.

c. ZigBee, which according to IEEE 802.15.4 standard, for example, offers low data rate and low power consumption.

d. IEEE 802.11a, commonly considered as WLAN (Wireless Local Area Network), but since it works in 5 GHz spectrum its reach is considerably limited, thus IEEE802.11a may also be considered as WPAN.

In addition to above technologies, proprietary networking schemes may also be used for interconnecting the units. Further, the system 110 can make use of WLAN technologies. Currently widespread WLAN technologies (e.g. WiFi) are based on IEEE 802.11 and include IEEE 802.11b, which describes a communication using the 2.4 GHz frequency band and supporting a communication rate of 11 Mb/s, IEEE 802.11a uses the 5 GHz frequency band to carry 54 MB/s and IEEE 802.11g uses the 2.4 GHz band to support 54 Mb/s. Other technologies based on WPAN. WLAN, WMAN, WAN, BWA, LMDS, MMDS, WiMAX, HIPER- MAN, IEEE802.16, Bluetooth, IEEE802.15, UWB, ZigBee, cellular, IEEE802.11 standards, GSM, GPRS, 2.5G, 3G, UMTS, DCS, PCS and CDMA may be equally used. Wireless and wired technologies used for home networking can equally be used.

The Institute of Electrical and Electronic Engineers (IEEE) 802.11 standard group, branded as WiFi by the Wi-Fi Alliance of Austin, Tex., USA. IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s. This is described in an Intel White Paper entitled "54 *Mbps IEEE 802.11 Wireless LAN at* 2.4 *GHz*", and a chip-set is described in an Agere Systems White Paper entitled "802.11 *Wireless Chip Set Technology White Paper*", both of these documents being incorporated herein by reference. Such a 802.11 supporting transceiver block 34 may be implemented using WaveLAN™ WL60040 Multimode Wireless LAN media Access Controller (MAC) from Agere Systems of Allentown, Pa. U.S.A., whose a product brief is incorporated herein by reference, which is part of a full chip-set as described in WaveLAN™ 802.11a/b/g Chip Set document from Agere Systems of Allentown, Pa. U.S.A., which is incorporated herein by reference. Reference is made to the manufacturer's data sheet Agere Systems, WaveLAN™ WL60040 Multimode Wireless LAN Media Access Controller (MAC), Product Brief August 2003 PB03-164WLAN, which is incorporated herein by reference.

Some wireless technologies, in particular microwave signals used in the WAN and MAN arenas, are using frequencies above 2-3 GHz where the radio path is not reflected or refracted to any great extent. Propagation in such frequencies requires a Line-of-Sight (LOS) relying on a line of sight between the transmitting antenna and the receiving antenna. Using this concept allows for NLOS (Non-LOS) wireless networks to interconnect over a LOS-based communication link. In addition, the wireless technology implemented may use either licensed frequency bands or unlicensed frequency bands, such as the frequency bands utilized in the Industrial, scientific and Medical (ISM) frequency spectrum. In the US, three of the bands within the ISM spectrum are the A band, 902-928 MHz; the B band, 2.4-2.484 GHz (referred to as 2.4 GHz); and the C band, 5.725-5.875 GHz (referred to as 5 GHz). Overlapping and/or similar bands are used in different regions such as Europe and Japan. Further, cellular technologies can also be used, commonly using licensed spectrum. Such digital technologies include GSM (Global System for Mobile Communications), GPRS (General Packet Radio Service), CDMA (Code Division Multiple Access), EDGE (Enhanced Data Rates for GSM Evolution), 3GSM, DECT (Digital Enhanced Cordless Telecommunications), Digital AMPS (per IS-136/TDMA, for example) and iDEN (Integrated Digital Enhanced Network). The service carried over the cellular network may be voice, video or digital data such as the recently introduced EVDO (Evolution Data Only). In one embodiment, a WirelessHD standard based wireless communication is employed, which is based on the 7 GHz of continuous bandwidth around the 60 GHz radio frequency and allows for uncompressed, digital transmission.

Digital cameras utilizing wireless communication are disclosed in U.S. Pat. No. 6,535,243 to Tullis entitled: "Wireless Hand-Held Digital Camera", U.S. Pat. No. 6,552,743 to Rissman entitled: "Digital Camera-Ready Printer", U.S. Pat. No. 6,788,332 to Cook entitled: "Wireless Imaging Device and System", and in U.S. Pat. No. 5,666,159 to Parulski et al. entitled: "Electronic camera system with programmable transmission capability", which are all incorporated in their entirety for all purposes as if fully set forth herein. A display system and method utilizing a cellular telephone having digital camera capability and a television linked directly over a UWB wireless signal is disclosed in U.S. Pat. No. 7,327,385 to Yamaguchi entitled: "Home Picture/Video Display System with Ultra Wide-Band Technology", which is incorporated in its entirety for all purposes as if fully set forth herein.

Figure 11A:
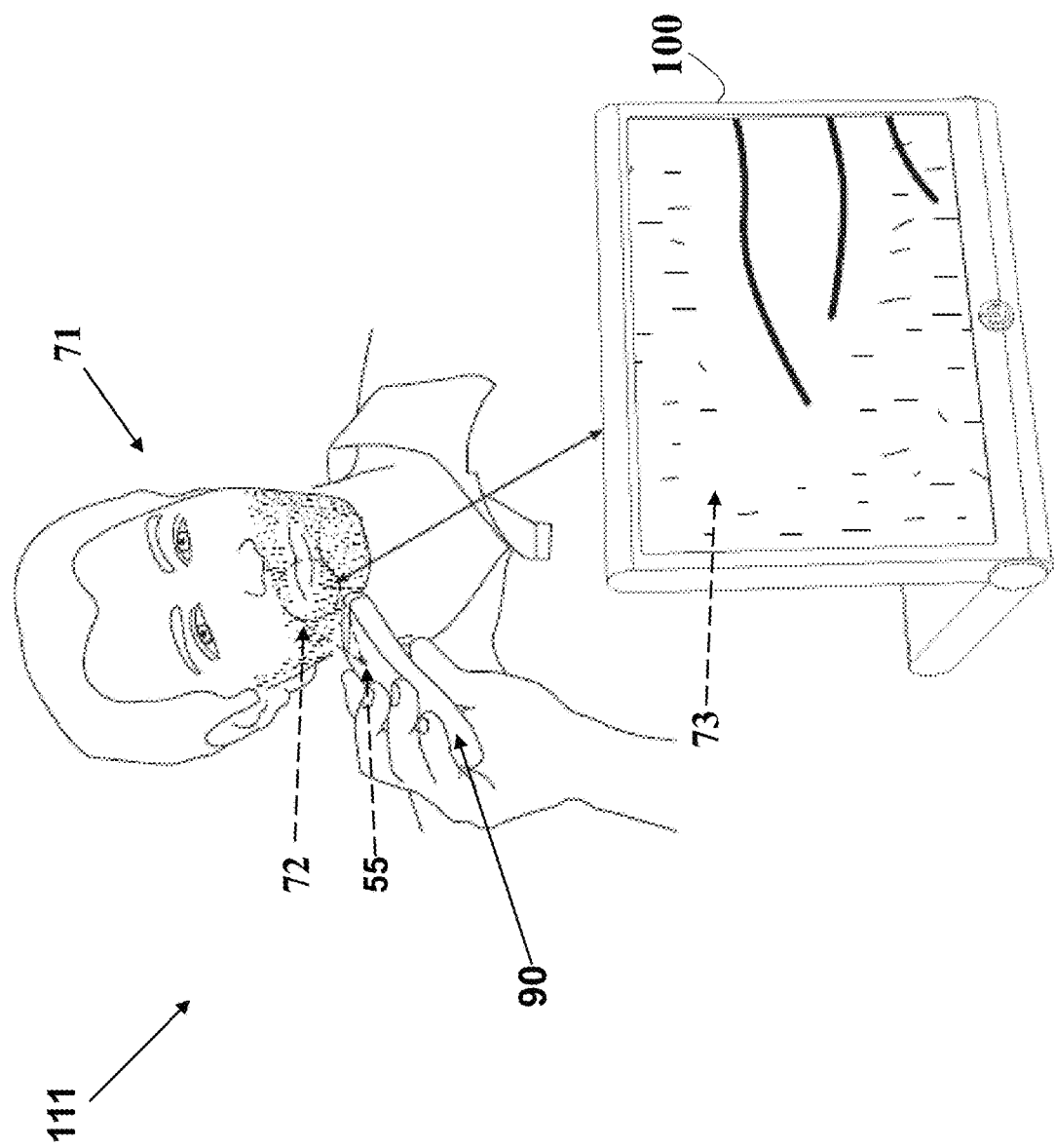
FIG. 11a illustrates schematically a human male facial shaving using an electric shaver and a display unit according to the invention.
Figure 11B:
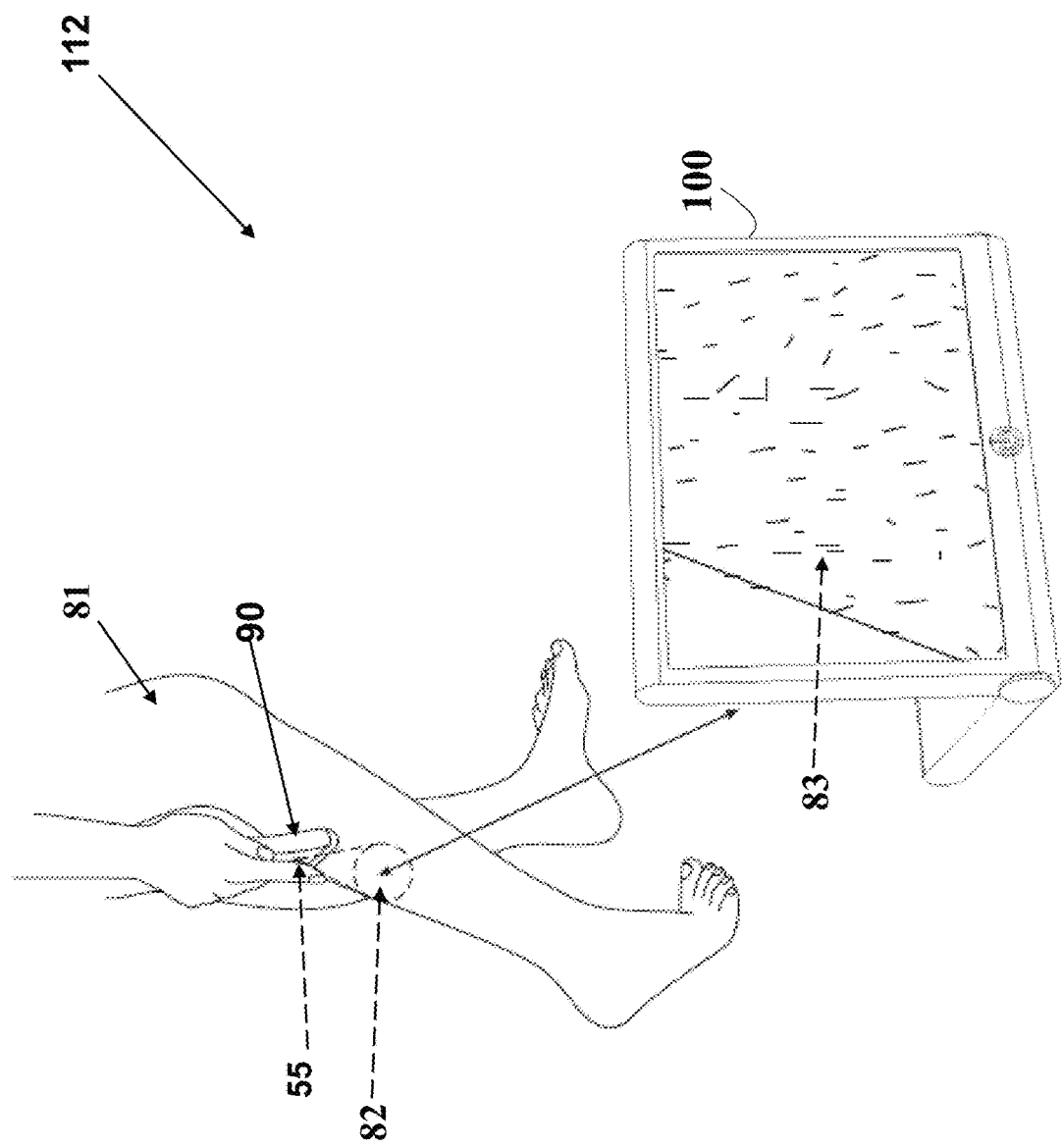
FIG. 11b illustrates schematically a human female leg shaving using an electric shaver and a display unit according to the invention.

The advantage of using wireless communication is exampled as system 111 in FIG. 11a, when compared to system 70 in FIG. 7. The shaver 90 is shown used for facial shaving by a human male 71, which is portable and not tethered. Similarly, display unit 100 is not connected using any cable to the shaver, thus the need to use a cable 64 is obviated. The lens 55 in the electric shaver 90 captures the skin area shown as 72, and transmits it wirelessly to be displayed as image 73 in the display unit 100. The user can look at the display 100 located in front of him, and easily and clearly track and see the skin area to be shaved 72 and the shaving results. Similarly, wireless operation is exampled for hair leg shaving of a female human as system 112 in FIG. 11b. The shaver 90 is shown used for leg shaving by a human female 81, and a display unit 100. The lens 55 in the electric shaver 90 captures the skin area shown as 82, and transmits it to be displayed as image 83 in the display unit 100. The user can conveniently look at the display 100 located in front of her, and easily and clearly track and see the skin area to be shaved 82 and the shaving results, without the need for the cable 64 shown for system 80 in FIG. 8.

As described above, communication based on electromagnetic waves in various parts of the electromagnetic spectrum can be used for communication. For example, low-frequency electromagnetic radiation can be used to transmit audio-frequency signals over short distances without a carrier. Radio-frequency transmission is a special case of this general electromagnetic transmission. As noted previously, light is also a special case of electromagnetic radiation, but is herein treated separately because of the characteristics of light are distinctly different from those of electromagnetic transmission in other usable parts of the electromagnetic spectrum.

Non-wired communication accomplished by light, either visible or non-visible light wavelength, can be used for the above transmission. The most popular is infrared (IR) based communication, but ultraviolet may also be used. Most such systems require substantially 'line-of-sight' access. In such a system, the antenna 91a in the shaver 90 is replaced with light emitter (e.g. LEDs), and the antenna 91b in the display unit 100 will be replaced with light detectors (e.g. photoelectric cell), and the communication over the air relies on the propagation of light.

Similarly, sound-based communication over space may be used, wherein the transceivers 92 use microphones and speakers, and the communication relies on the propagation of sound waves through the air in the space. Either audible sound (20-20,000 Hz band), or inaudible sound (ultrasonic, above 20,000 Hz; or infrasonic, below 20 Hz) can be used. In this case, the antenna 91 will be substituted with a microphone or a similar device converting the sound signal into an electrical signal, and a speaker or a similar device for generating the audio signal and transmitting it to the air. A transducer combining into a single device both the speaker and the microphone functionalities may also be used. Since these solutions do not require any physical connection, such as cable, they provide both ease-of-use and mobility. Such non-wired solutions are effective over short distances. Furthermore, most of the non-wired solutions cannot easily pass through walls and other such obstructions, owing to the attenuation to the signals. Hence, such techniques are suitable for communication within a single room, but are not suitable for communication between the rooms of a home or other building.

Figure 12:
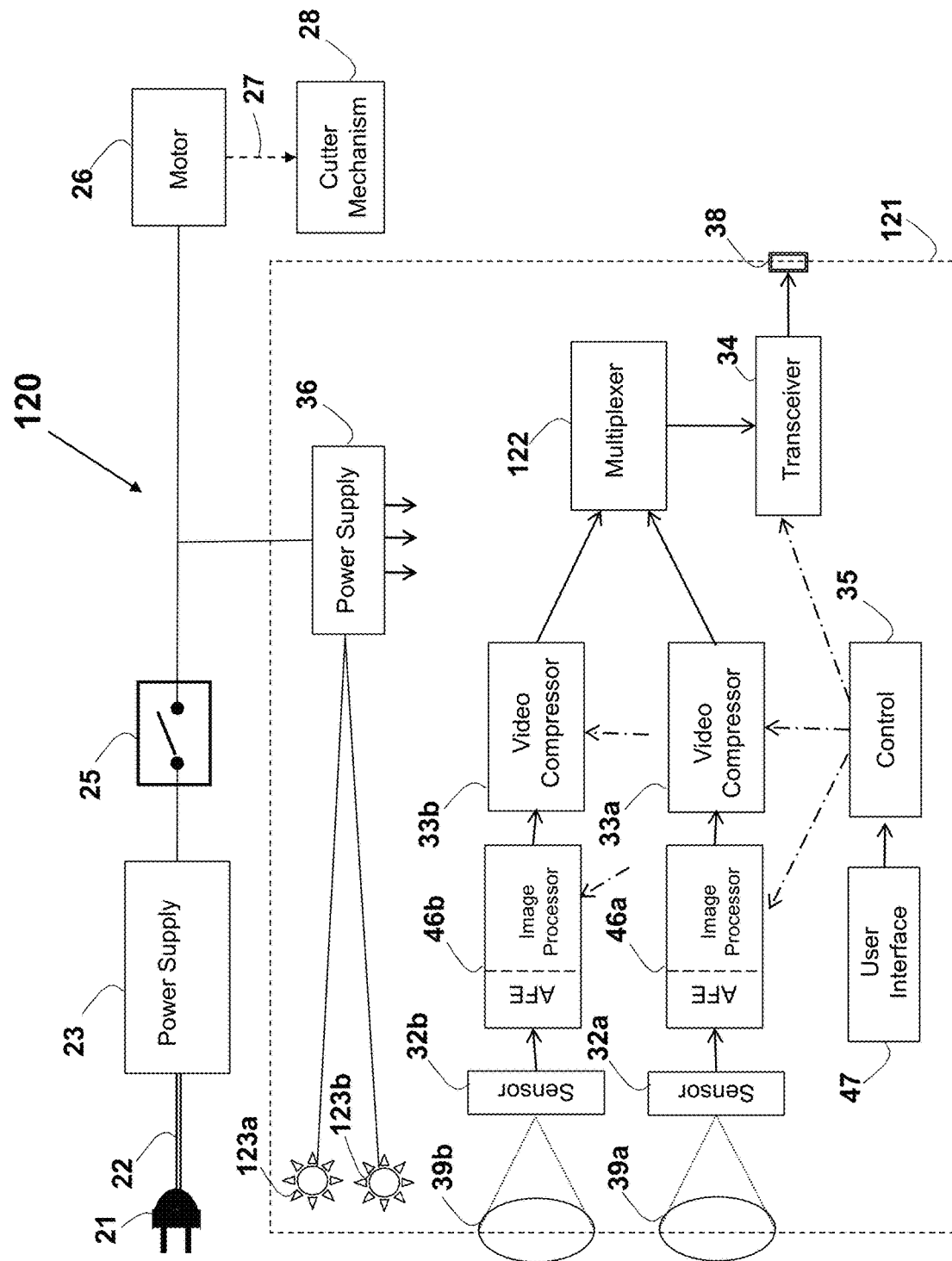
FIG. 12 illustrates schematically a simplified general functional block diagram of an electric shaver according to the invention.

FIG. 12 shows an electric shaver 120 according to one embodiment of the invention having a camera module 121. Light sources 123a and 123b are shown connected to be power fed from the power supply 36. The light sources 123a and 123b preferably are directed to illuminate the shaving area of the skin, and in particular the area captured and transmitted via the camera module 121 thus allowing better visualization for the user in general, and aiding to the brightness and quality of the image captured by lenses 39a and 39b and sensor 32, thus resulting in a better image displayed by the display unit 40. Further, such illumination may be useful in the case of lack of external light availability while shaving. In one embodiment, a semiconductor light source such as a Light-Emitting-Diode (LED) is used, having small form factor and high efficiency. However, any type of visible electric light emitter such as a flashlight, an incandescent lamp and compact fluorescent lamps can be used. While FIG. 12 shows two such light sources 123a and 123b, it is apparent that a single one can be used, as well as three or more such light sources. Further, an on/off switch can be used to control the light sources 123a and 123b, either together or individually, allowing the user to use the light only when required.

A razor including lighting means is disclosed in U.S. Patent Application 2008/0028616 to KWAK entitled: "Shaver with Lighting Means". Electric shavers containing illumination means are disclosed in U.S. Pat. No. 6,871,402 to Bader et al. entitled: "Electrically driven Hair Removal Device", and in U.S. Pat. No. 5,920,988 to Momose entitled: "Electric Shaver", which are both incorporated in their entirety for all purposes as if fully set forth herein.

Electric shaver 120 is shown in FIG. 12 to only use the AC power via the power supply 23, without the use of any battery. In this case, the AC plug 21 has to be plugged to an AC outlet to be powered therefrom during the shaver 120 operation. However, it is apparent that the battery operated device (either primary or rechargeable) can be equally used, as described above. Further, shaver 120 in FIG. 12 is shown to have a single on/off switch 25 for powering both the motor and associated cutting mechanism and the camera module 121. However, it is apparent that two such switches can be used, one dedicated to the shaver basic function only, while the other allows for the camera operation, thus providing more flexibility to the user.

While the invention has been exampled above with regard to capturing a single image using a single lens 39 and a single sensor 32, it is apparent that multiple images can be equally considered, using multiple image capturing mechanisms. An example of two capturing mechanisms is shown for shaver 120 in FIG. 12. Lens 39a and 39b are respectively associated with sensors 32a and 32b, which in turn respectively connects to image processors 46a and 46b. In the case of when compression function is used, the video compressors 33a and 33b, respectively, compress the data received from processors 46a and 46b. In one embodiment, two transceivers (each of the same as transceiver 34, for example) and two ports (each of the same type as port 38, for example) are used. Further, two communication mediums (each similar or the same as medium 37) can be employed, each carrying solely the image corresponding to the respective lens. Further, the same medium can be used using Frequency Division/Domain Multiplexing (FDM). In such an environment, each signal is carried in a dedicated frequency band, distinct from the other signals concurrently carried over the same medium. The signals are combined onto the medium and separated from the medium using various filtering schemes, employed in the multiplexer 122. In another embodiment, the multiple images are carried using Time Domain/Division Multiplexing (TDM), as exampled in FIG. 12. The digital data stream from the video compressors 33a and 33b is multiplexed into a single stream by the multiplexer 122, serving as a time multiplexer. The combined signal is then fed to the single transceiver 34 for transmitting onto the medium.

In both FDM and TDM schemes, a de-multiplexer is used in the display unit 40, separating the streams and converting into images or video streams to be displayed. Multiple displays (each same as display 45 shown in FIG. 4) can be used, each displaying the respective images captured. Alternatively, a single display 45 is used. In this case, the images can then be displayed one at a time, or together in various locations over the screen as side-by-side. Further, the display unit 40 may include an image processor for properly combining the separate images to build one image containing all information.

Using two or more image capturing components can further be used to provide stereoscopic video, allowing 3-D or any other stereoscopic view of the content, or other methods of improving the displayed image quality of functionality.

Figure 13:
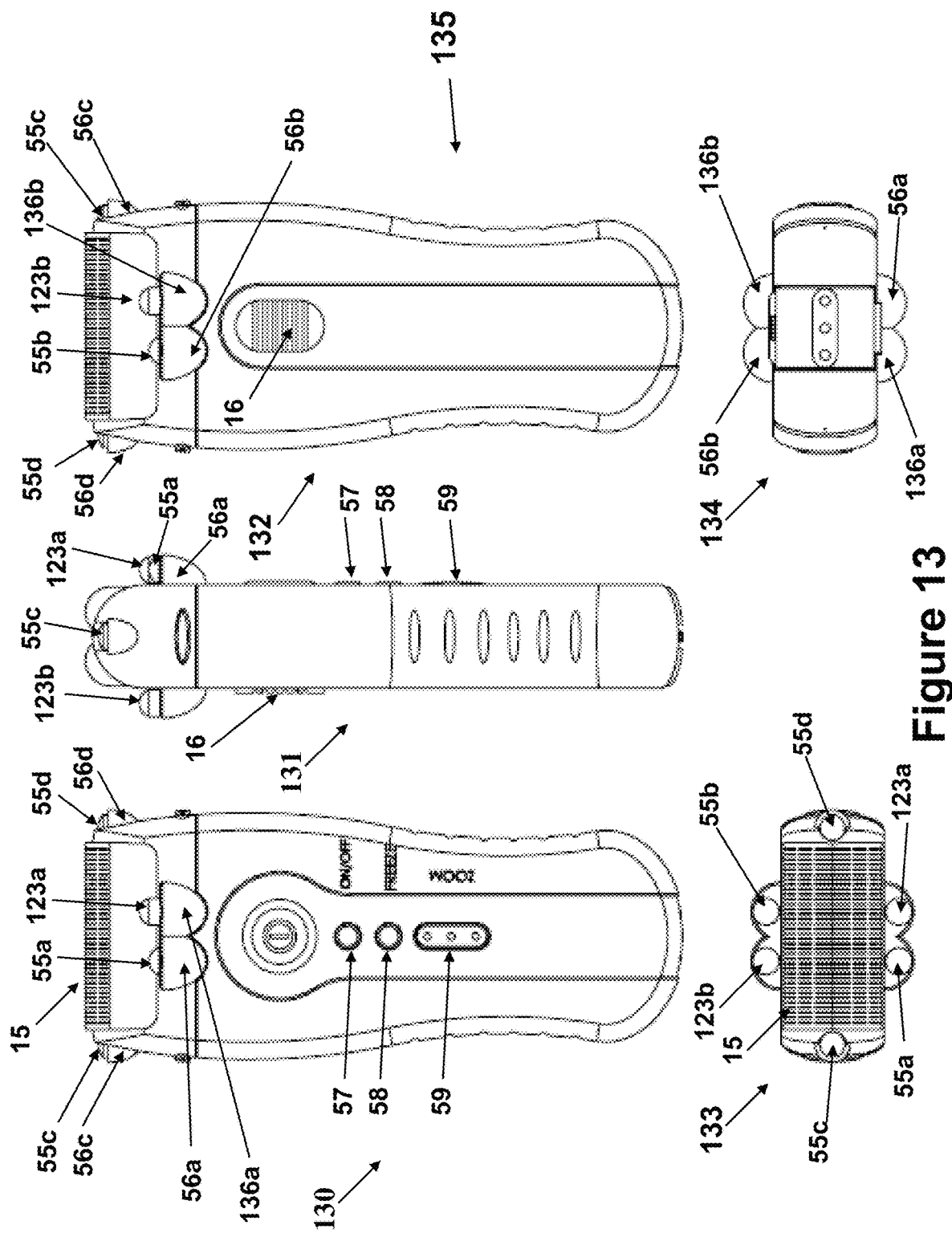
FIG. 13 illustrates schematically views of an electric shaver according to the invention.

FIG. 13 shows various views of an example of an electric shaver 135 (corresponding to shaver 120 in FIG. 12) according to one embodiment of the invention. View 132 is a front view of the shaver 135, view 131 is a side view and view 130 is a rear view of the shaver 135. View 133 is a top view of the foil 15, which is usually in contact with the skin and the hair, and view 134 is a bottom view. The electric shaver 135 is shown as having lenses 55a, 55b, 55c and 55d respectively based in lenses housings 56a, 56b, 56c and 56d, each in a separate wall of the casing. Light sources (e.g. LEDs) 123a and 123b, respectively seated in housings 136a and 136b, are also shown on the wide sides of the casing, respectively adjacent to Lens bases 56a and 56b.

While the invention has been exampled above with regard to capturing, transmitting and displaying a visible image, it is apparent that a non-visible spectrum can be equally used, such as infrared and ultraviolet. In such a configuration, the infrared image is captured, and is converted to a visible image on the display. For example, such technique can be used to easily distinguish the skin and the hair, as they are having different temperature and thus distinct infrared signature. In such a system, the sensor 32 is sensitive to the non-visible part of the light spectrum (e.g. infrared), and the light emitters 123a and 123b are illuminating using the corresponding light spectrum, such as infrared light sources.

Powerline communication is known in the art for using the AC power wires in a building for digital data communication. Traditional approaches to powerline communication (e.g., home or office) include applications such as control of lighting and appliances, as well as sending data or broadband data, video or audio. Powerline command communication systems include for example X-10, CEBus (Consumer Electronics Bus per EIA-600 standard), and Lonworks.

The HomePlug organization is an industry trade group for powerline communication including various entities to define powerline communication specifications. HomePlug 1.0 is a specification for a home networking technology that connects devices to each other through power lines in a home. HomePlug certified products connect PCs and other devices that use Ethernet, USB, and 802.11. Many devices made by alliance members have HomePlug built in and connect to a network upon plugging the device into a wall socket in a home with other HomePlug devices. Signal interference, from surge protectors, extension cords, outlet strips and/or other proximately located devices, including the high-frequency signals, is an on-going concern of the HomePlug alliance. Similarly, HomePlug AV (HPAV) is a new generation of technology from the HomePlug Powerline Alliance. HPAV can be for example embedded in consumer electronics or computing products, and provides high-quality, multi-stream, entertainment-oriented networking over existing AC wiring. Users can avoid having to install new wires in their premises by using devices having built-in HomePlug technology. HPAV uses advanced PHY and MAC technologies that provide a 200 Mbps (million bits per second) class powerline network for inter alia video, audio and data. The Physical (PHY) Layer utilizes this 200 Mbps channel rate to provide a 150 Mbps information rate to provide communications over noisy power line channels. As used herein, the terms "powerline" and "powerline communications" refer to any technology that is used to transfer data or signals over a power distribution system, including without limitation UPB, HomePlug, HomePlug a/v, and X-10 technologies. As used herein, the term "UPB" or Universal Powerline Bus refers to one exemplary instance of technologies which impose digital or analog signals or pulses onto AC waveforms or DC power delivery systems, such as for example the well known UPB approach set forth in "Universal Powerline Bus: The UPB System Description", Version 1.1 dated Sep. 19, 2003, incorporated herein by reference in its entirety. Lastly, the term "HomePlug" as used herein is meant specifically to include devices and systems compliant with the HomePlug™ Powerline Alliance Specification for powerline-based home networks (including the more recent HomePlug A/V), and generally to include all other comparable devices adapted for powerline networking.

Figure 14:
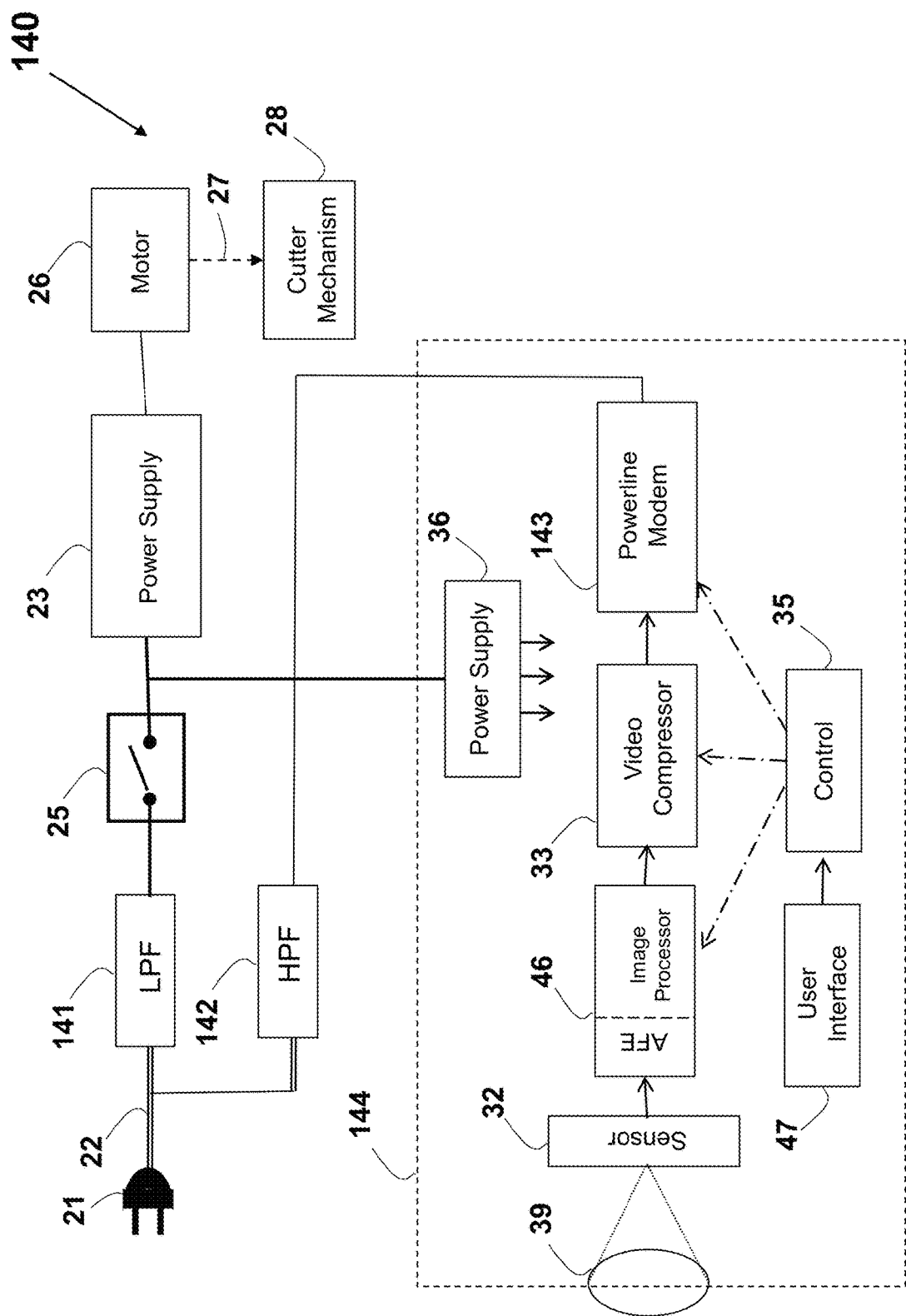
FIG. 14 illustrates schematically a simplified general functional block diagram of an electric shaver according to the invention.

In one embodiment according to the invention, powerline communication is used for the interconnection between the electric shaver and the display unit, such as HomePlug based communication. One advantage in such a configuration is that only a single power cable is used, carrying both the AC power and the communication signal. Such a shaver 140 is shown in FIG. 14. A low pass filter 141 is disposed between the AC power plug 21 and the power supply 23, for passing only the AC power signal, such as the 50 Hz or the 60 Hz. Such a low pass filter 141 also stops and exhibits high impedance in the digital data frequency band, thus reducing impedance loading at this frequency band. Transceiver 34 of FIG. 12 is replaced with a powerline modem, connected to the AC power wires via a high pass filter 142, which passes only the digital data frequency band, hence allowing only the digital data signal to pass, while stopping the AC power. If HomePlug technology is used, the modem is a HomePlug compliant modem, and the communication (physical layer and higher protocol layers) is implemented according to the HomePlug specification standard. As an example, such modem can be based on INT6000 'HomePlug AV High-Speed Powerline Solution' available from Intellon Corporation, headquartered in Orlando, Fla., U.S.A.

Figure 15:
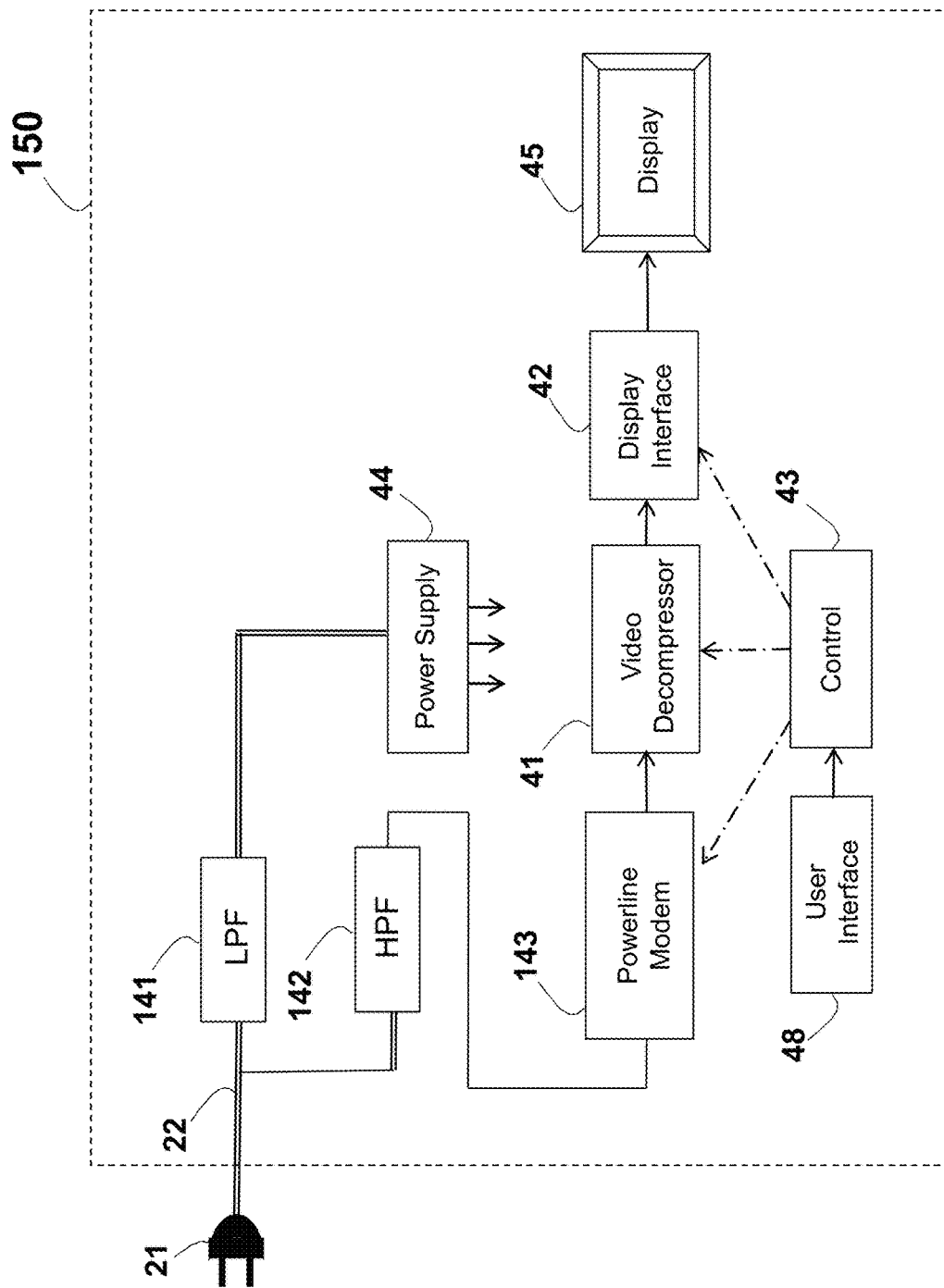
FIG. 15 illustrates schematically a simplified general functional block diagram of a display unit according to the invention.

Similarly, display unit 150, shown in FIG. 15, is also adapted to support powerline communication, in order to communicate with a mating electric shaver 140 of FIG. 14. Low pass filter 141 is added between the AC power plug 21 and the power supply 44. The transceiver 34 is replaced with a powerline modem, connected to the AC power wires via high pass filter 142, which passes only the digital data frequency band, hence allowing only the digital data signal to pass, while stopping the AC power. If HomePlug technology is used, the modem is a HomePlug compliant modem, and the communication (physical layer and higher protocol layers) is implemented according to the HomePlug specification standard.

Figure 16:
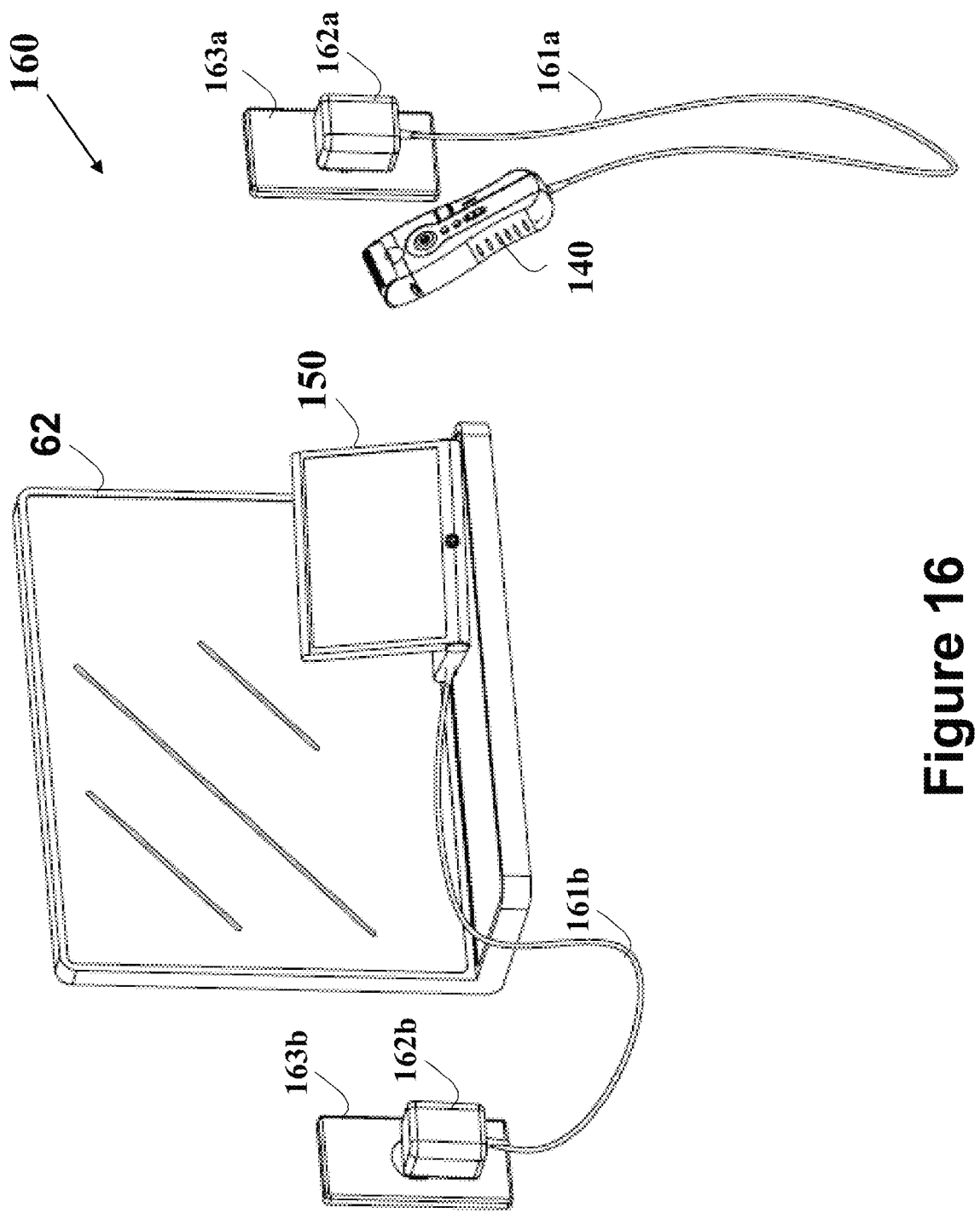
FIG. 16 illustrates schematically a system including an electric shaver and a display unit according to the invention.

An illustration of a powerline based system is shown as system 160 in FIG. 16. The shaver 140 is AC power fed from a mains outlet 163a, via plug-in unit 162a and cord 161a. The plug-in components 162a can be just an AC power plug 21 and the cord may be power cable 22 disclosed above. Alternatively, part or all of power supplies 23 and 36 can also be integrated into the plug in device 162a. Similarly, the display unit 150 is AC power fed from a mains outlet 163b, via plug-in unit 162b and cord 161b. The plug-in component 162b can be just an AC power plug 21 and the cord may be power cable 22 disclosed above. Alternatively, part or all of power supplies 23 and 36 can also be integrated into the plug in device 162b. While the shaver 140 and the display unit 150 are fed via the AC power system, the AC power wiring is also used as the communication medium as described above, obviating the need for additional cables to be connected between those devices.

In one embodiment of a non-conductive network medium, a fiber optic cable is used. In such a case, transceiver 34 is a fiber optic transceiver, and similarly port 38 is a fiber optic connector. As such, the term 'wiring' and 'cable' in this application should be interpreted to include networks based on non-conductive medium such as fiber-optics cabling.

In one embodiment, exampled in FIG. 6, a dedicated cable 64 is connected between the electric shaver 60 and the display unit 63. The cable 64 serves as the wired communication medium 37, connected to via a connector serving as the port 38. Such wired medium 37 may be a UTP, STP, coaxial cable, a telephone wire pair, a CATV coaxial cable, AC power wire pair and LAN cable, such as Category 5 or Category 6. A suitable connector 38 may be used for connecting to the specific type of the wired medium, such as a coaxial connector for connecting to a coaxial cable and a telephone connector for connecting to a telephone wire pair. The wired medium may be a single non-used twisted-pair in a LAN cable, or two such pairs connected in parallel. In another aspect of the present invention, the wired medium is using a phantom channel formed between two wire pairs, such as two twisted wire pairs in a LAN cable used in Ethernet 10BaseT, 100BaseTX or 1000BaseT. Similarly, any PAN, LAN, MAN or WAN wiring may be used as the wired medium.

Further, transceiver 34 is adapter to be a wired modem or a wired transceiver suitable for transmitting and receiving over the appropriate wiring used. The communication over such cable can be proprietary or preferably using an industry standard communication, wherein the connections of the shaver and of the display unit to the cable are based on standard connectors and interfaces. The communication may be based on a parallel scheme, wherein multiple wires are used to concurrently carry the digital data, thus allowing a higher transfer rate of the information. In an alternative embodiment, serial communication is used, allowing for few conductors to be used and smaller footprint connectors requiring the usage of less pins and contacts. Various standard PAN (Personal Area Network), WAN (Wide Area Network) and LAN (Local Area Network) protocols can be used. In one embodiment, standard LAN (Local Area Network) is used, such as Ethernet IEEE802.3 10BaseT, 100Base TX or 1000BaseT. In such a case the transceiver 34 is Ethernet PHY (i.e. Ethernet physical layer or Ethernet transceiver) that can be implemented based on "LAN83C180 10/100 Fast Ethernet PHY Transceiver" or "LAN91C111 10/100 Non-PCI Ethernet Single Chip MAC+PHY" available from SMSC—Standard Microsystems Corporation of Hauppauge, N.Y. U.S.A. While this function can be implemented by using a single dedicated component, in many embodiments this function is integrated into a single component including other functions, such as handling higher layers. The transceiver 34 may also contains isolation magnetic components (e.g. transformer-based), balancing components, surge protection hardware, and a port 38 is a LAN connector (commonly RJ-45) required for providing a proper and standard interface via connector 34. In one embodiment, standard cabling is used, such as standard LAN cabling. For example, Category 5 cabling ('structured wiring') or any other wiring according to EIT/TIA-568 and EIA/TIA-570 can be used. Such LAN cabling involves wire pairs that may be UTP or SIT. Similarly, category 3, 4, 5e, 6, 6e and 7 cables may be equally used. Such configuration is described, for example, in EIT/TIA-568 and EIA/TIA-570. It will be appreciated that any wired interface, other than Ethernet 10/100BaseT described above, being proprietary or standard, packet or synchronous, serial or parallel, may be equally used, such as IEEE1394, USB (Universal Serial Bus), EIA/TIA-232, PCI (Peripheral Component Interconnect), PCMCIA (Personal Computer Memory Card international Association), or IEEE1284, but not limited to the aforementioned. Furthermore, multiple such interfaces (being of the same type or mixed) may also be used.

A tethered portable electronic camera connectable to a computer is disclosed in U.S. Pat. No. 5,402,170 to Parulski et al. entitled: "Hand-Manipulated Electronic Camera Tethered to a Personal Computer". Electric shavers comprising illumination means are disclosed in U.S. Pat. No. 6,871,402 to Bader et al. entitled: "Electrically driven Hair Removal Device", and in U.S. Pat. No. 5,920,988 to Momose entitled: "Electric Shaver", which are both incorporated in their entirety for all purposes as if fully set forth herein. A digital electronic camera which can accept various types of input/output cards or memory cards is disclosed in U.S. Pat. No. 7,432,952 to Fukuoka entitled: "Digital Image Capturing Device having an Interface for Receiving a Control Program", and the use of a disk drive assembly for transferring images out of an electronic camera is disclosed in U.S. Pat. No. 5,138,459 to Roberts et al., entitled: "Electronic Still Video Camera with Direct Personal Computer (PC) Compatible Digital Format Output", which are both incorporated in their entirety for all purposes as if fully set forth herein.

While the invention has been described above with the goal of faithfully displaying the image captured by the lens in the display, the availability of the image as a digital data allows for processing to aid in the user shaving experience. In one embodiment, image processing is employed, such as digital image processing and other techniques applying various computer algorithms to the image captured and represented as a two-dimensional signal data. The results can be provided to the user in various ways, such as to be presented on the display of the display unit.

In one digital image processing feature, the individual hairs are detected and identified. Such 'hair recognition' can make use of the different colors or brightness of the hair versus the skin. For example, a black colored hair can be identified and recognized over a light-color (e.g. white) skin. Further, pattern recognition algorithms can be used based on the characteristic of the hair, such as being long and having straight or curled pattern. A camera with human face detection means is disclosed in U.S. Pat. No. 6,940,545 to Ray et al., entitled: "Face Detecting Camera and Method", which is incorporated in its entirety for all purposes as if fully set forth herein.

Figure 17:
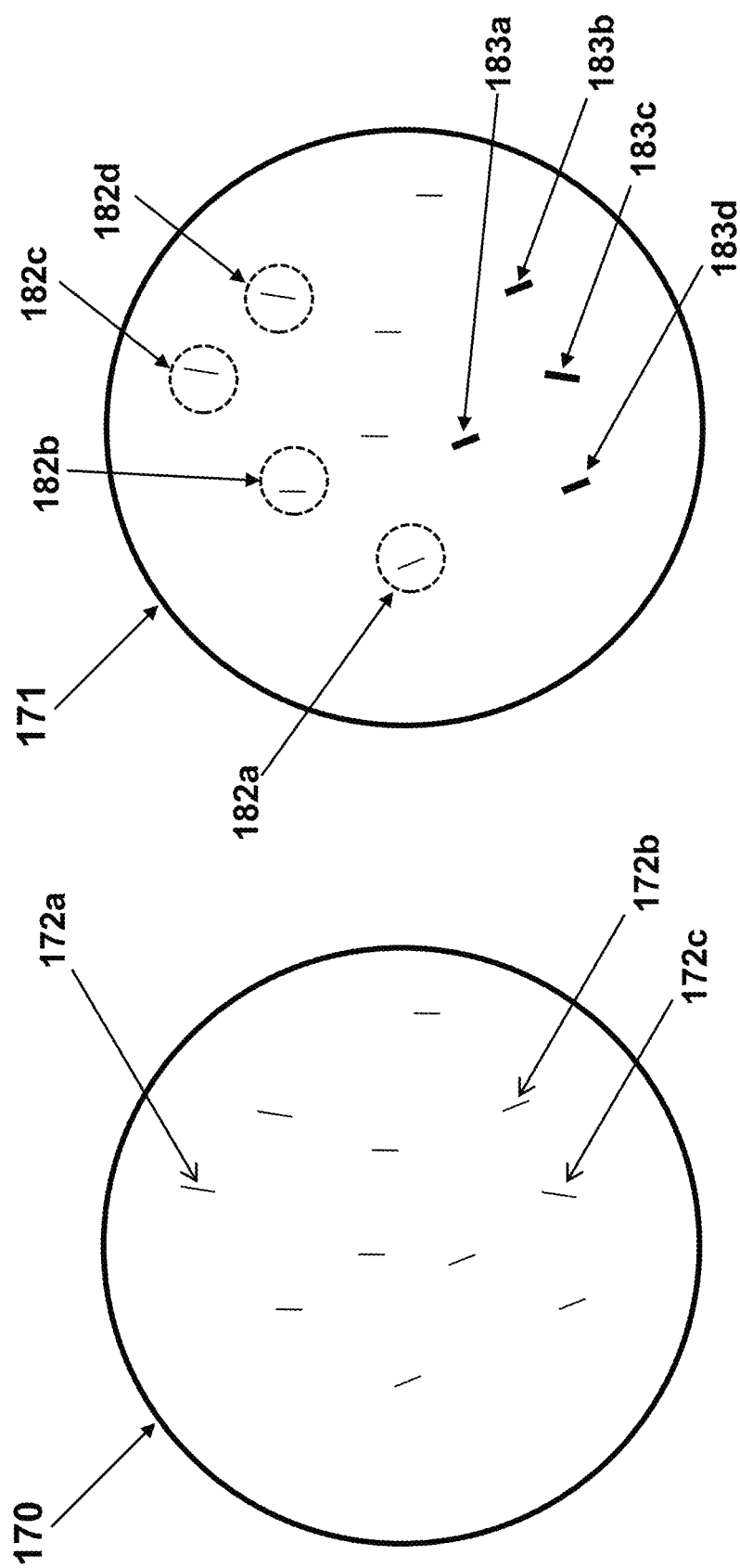
FIG. 17 illustrates schematically views displayed on the display unit according to the invention.

An example of image processing feature is shown in FIG. 17. View 170 shows the display before any processing, with the goal of faithfully reflecting the situation on the skin to be shaved or re-shaved. Several individual hairs are shows as 172*a*, 172*b* and 172*c*, which need to be shortened or cut as part of the shaving (for example, due to being too long). The 'hair recognition' image processing algorithms identify the individual hair that needs to be shaved, and marks them on the screen of the display unit, allowing the user easy identification of places and locations that need to be shaved. Such view 171 is shown, wherein the individual hairs are marked by a circle around them, such as circles 182*a*, 182*b*, 182*c* and 182*d*, or alternatively as bolded and thicker objects shown as 183*a*, 183*b*, 183*c* and 183*d*.

Figure 18:
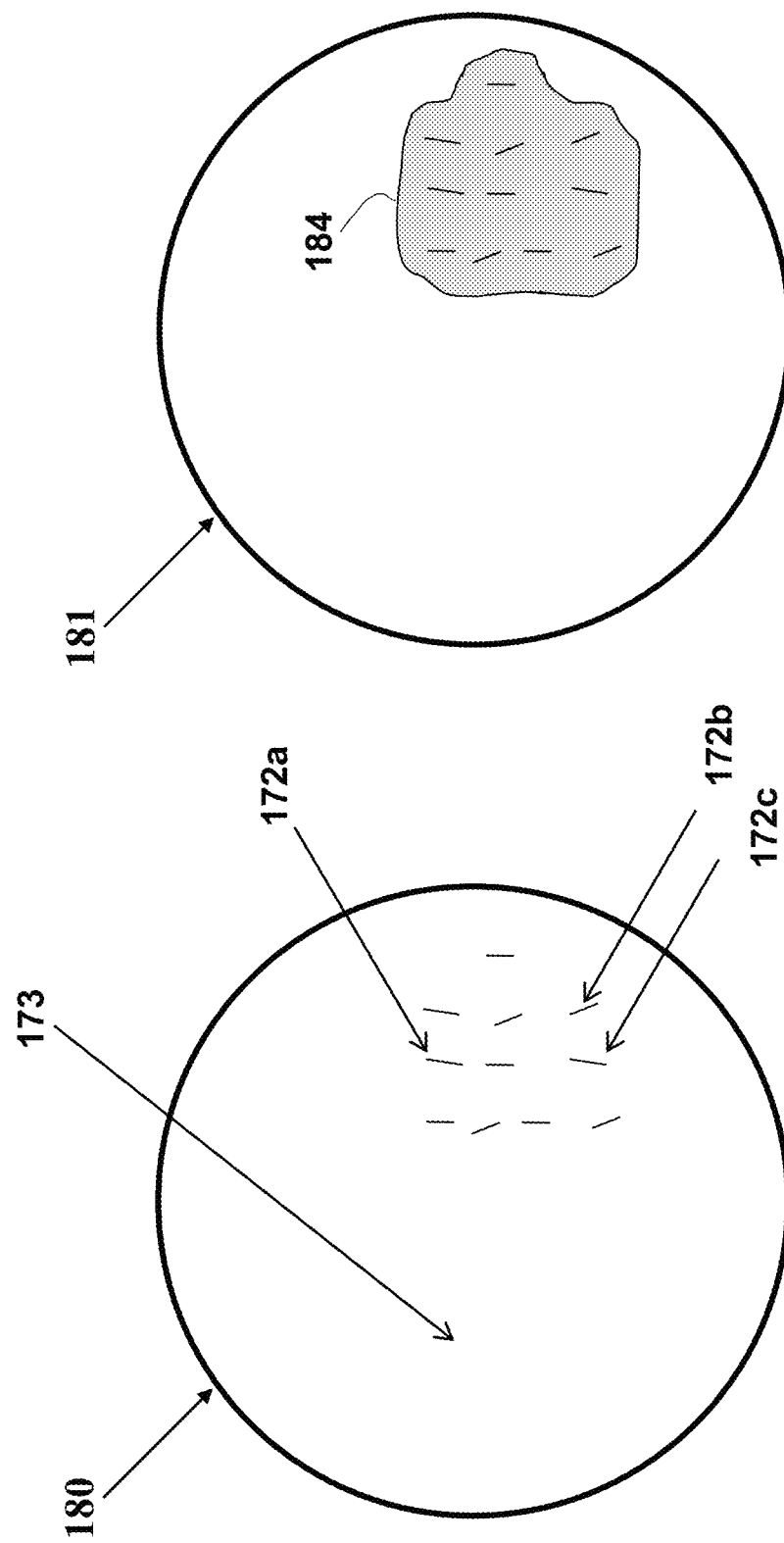
FIG. 18 illustrates schematically views displayed on the display unit according to the invention.

In one embodiment, the image processing is used to suggest areas that require shaving or re-shaving. FIG. 18 shows a view 180 captured and displayed, wherein the right side contains hair that need to be removed, while the left side 173 shows no hair to be cut. The algorithm will identify and mark the area to be shaved so it can be easily identified by the user, and this may be presented on the screen of the display unit as colored area 184 shown in view 181.

Another feature that may be used is the zooming functionality, which is known in the art for cameras. The zoom functions allow for decreasing or narrowing of the apparent angle of a view, thus allowing scaling up the image size and magnifying for better view of a smaller area. A mechanical or optical zoom is obtained by varying the focal length using a mechanical assembly for physically moving the lens or lenses as required. On one embodiment, a small motor is used for moving the lens. Such a motor is added to shaver 30, power fed from the power supply 36, and driving and adjusting the camera optics as required for gaining optical resolution.

In an alternative embodiment, digital zoom is used, wherein no mechanical moving or camera optics are required, but rather, image processing techniques and algorithms are used to resize the displayed smaller area over the display. Interpolation is commonly required as part of the image processing. An example of zoom functionality is shown in FIG. 19, showing an original (pre-zoom) view 190, with an area of interest shown as 191. After the zoom operation, the former area 192 is scaled to fit the whole display area.

Digital (or electronic) zoom as well as other image processing functionalities (such as hair recognition described above) can be implemented by a separate processor located in the electric shaver 30 or in the display unit 40, wherein the processor in disposed in the image data flow, or as a replacement to the video compressor 33 or video compressor 41. Further, the required functionalities may be used by two image processors, one in the shaver 30 and one in the display unit 40. Alternatively, the image processing can be integrating within the image processor 46, or as part of the display interface 42, or in both. In one example, the zoom control by the user is being part of the shaver 30, as shown by the sliding switch 59 as part of view 50 in FIG. 5. Alternatively, or in addition, the zoom control by the user can make use of buttons or other controls implemented as part of the display unit.

Video is known also as the technology of electronically capturing, recording, processing, storing, transmitting and reconstructing a sequence of still images representing scenes in motion. Most video cameras (camcorders) have the capability of capturing and storing a single (still) picture. Such functionality can also be beneficial in the system above, wherein a user operated button 'FREEZE' shown as 58 in FIG. 5, being part of the user interface 47, can be used to take a single shot to get a momentary image to be stored and displayed in the display unit. Such still image allows the user to carefully analyze the image that is frozen and unchanged.

In addition to the 'zoom' and 'freeze' features described above, many other features and user controls used in digital still cameras and in video cameras (camcorders) can be used in the system according to the invention. For example automatic mode-level, auto focus, exposure compensation, white balance level, manual focus and aperture control. Other exemplary controls involve specific display settings such as contrast, brightness and zoom.

User control regarding activating these features or controlling the features can be done using buttons and switches. Implementing these functions can be solely within the shaver, solely within the display unit or split between both devices. In one embodiment, the user control in the form of buttons and switches on the shaver itself, as part of user interface 47 and managed by the controller 35. In the case that the function is implemented in hardware or software, which are in full or in part executed in the display unit, the communication channel over the communication medium 37 is used to transmit the proper signals to the display unit. Further, these control data can be multiplexed and sent with the image digital data, using the same transceiver 34. Similarly, the user control in the form of buttons and switches and/or touch screen can be located on the display unit, as part of user interface 48 and managed by the controller 43. In the case that the function is implemented in hardware or software, which are in full or in part executed in the electric shaver unit, the communication channel over the communication medium 37 is used to transmit the proper signals to the display unit. Further, the control data can be multiplexed and sent with the image digital data, using the same transceiver 34. Further, some of the control can be in the shaver and some in the display unit.

The mechanical movement of the cutters 28 and the spinning of the motor 26, added to the general inherent stability caused by the human holding the shaver, may induce instability causing the display image to move and be instable, thus effecting the displaying quality and burdening the user looking at the image on the display. In one embodiment, the optical section of the shaver, which includes the lens 39 and sensor 32, are mounted to the frame or the shaver using vibration isolators or vibration suppressors, to reduce the vibration effect on the captured image. In another embodiment, various digital image techniques are used to stabilize the displayed image, such as by filtering and other known image processing techniques. Improving the vibration generated by the mechanical system may also aid to reduce the effect on the optical system thus improving the user experience.

Other image processing functions may include adjusting color balance, gamma and luminance, filtering pattern noise, filtering noise using Wiener filter, changing zoom factors, recropping, applying enhancement filters, applying smoothing filters, applying subject-dependent filters, and applying coordinate transformations. Other enhancements in the image data may include applying mathematical algorithms to generate greater pixel density or adjusting color balance, contrast and/or luminance.

Figure 20:
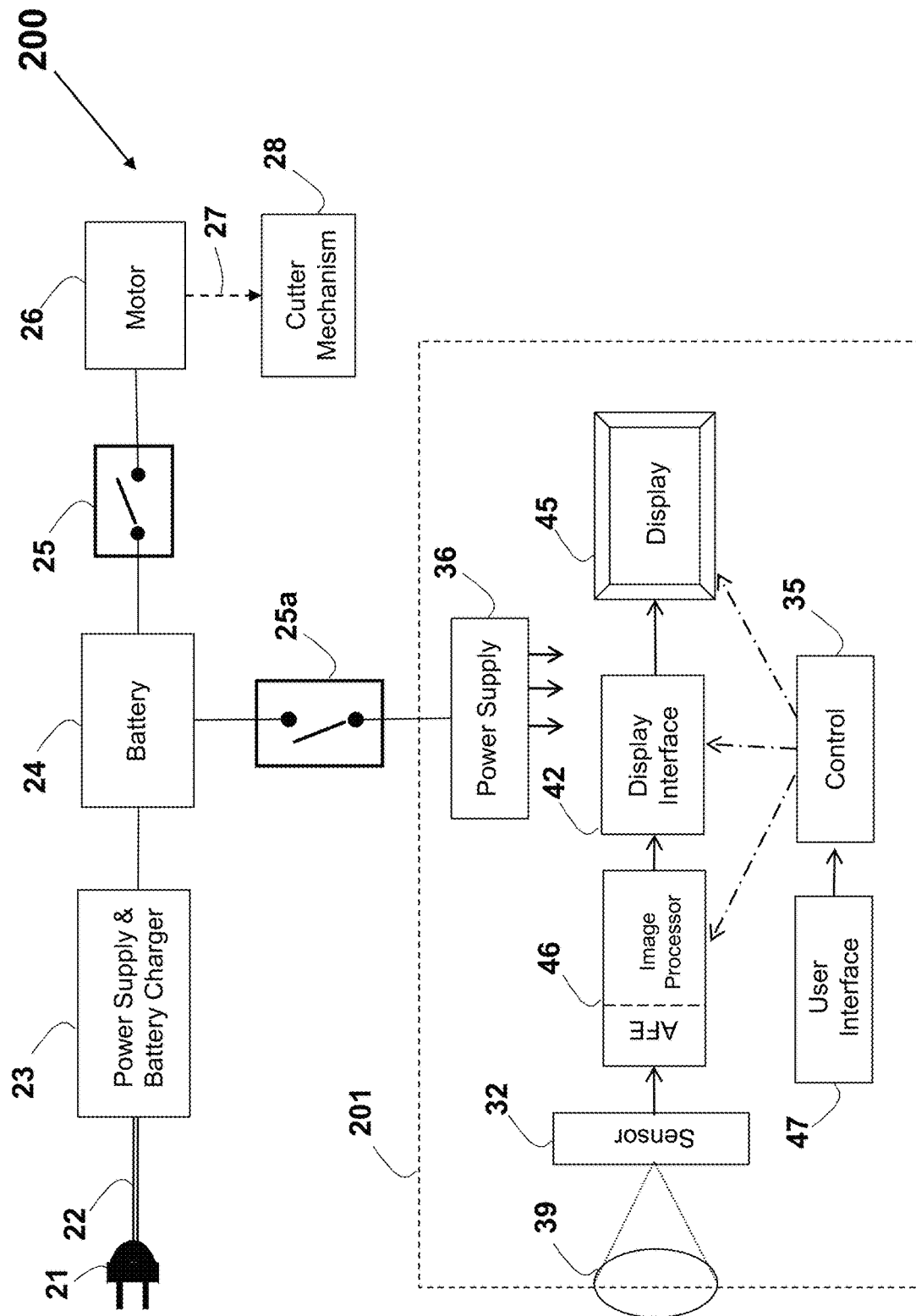
FIG. 20 illustrates schematically a simplified general functional block diagram of an electric shaver according to the invention.

While the invention has been exampled above with regard to a separated shaver and display unit, it will be appreciated that the invention equally applies to the case wherein the shaver further includes the display unit, either as a substitute or added to the separated display unit. FIG. 20 shows a block diagram of a shaver 200 integrally including a camera and a display module 201. The digital representation of the image captured from the image processor 46 is fed directly to the display interface 42 and then to the display 45, which provides image visualization. The control function 35, the user interface 47 and the power supply 36 need to be adapted to support the added functionality of the display unit.

Figure 21:
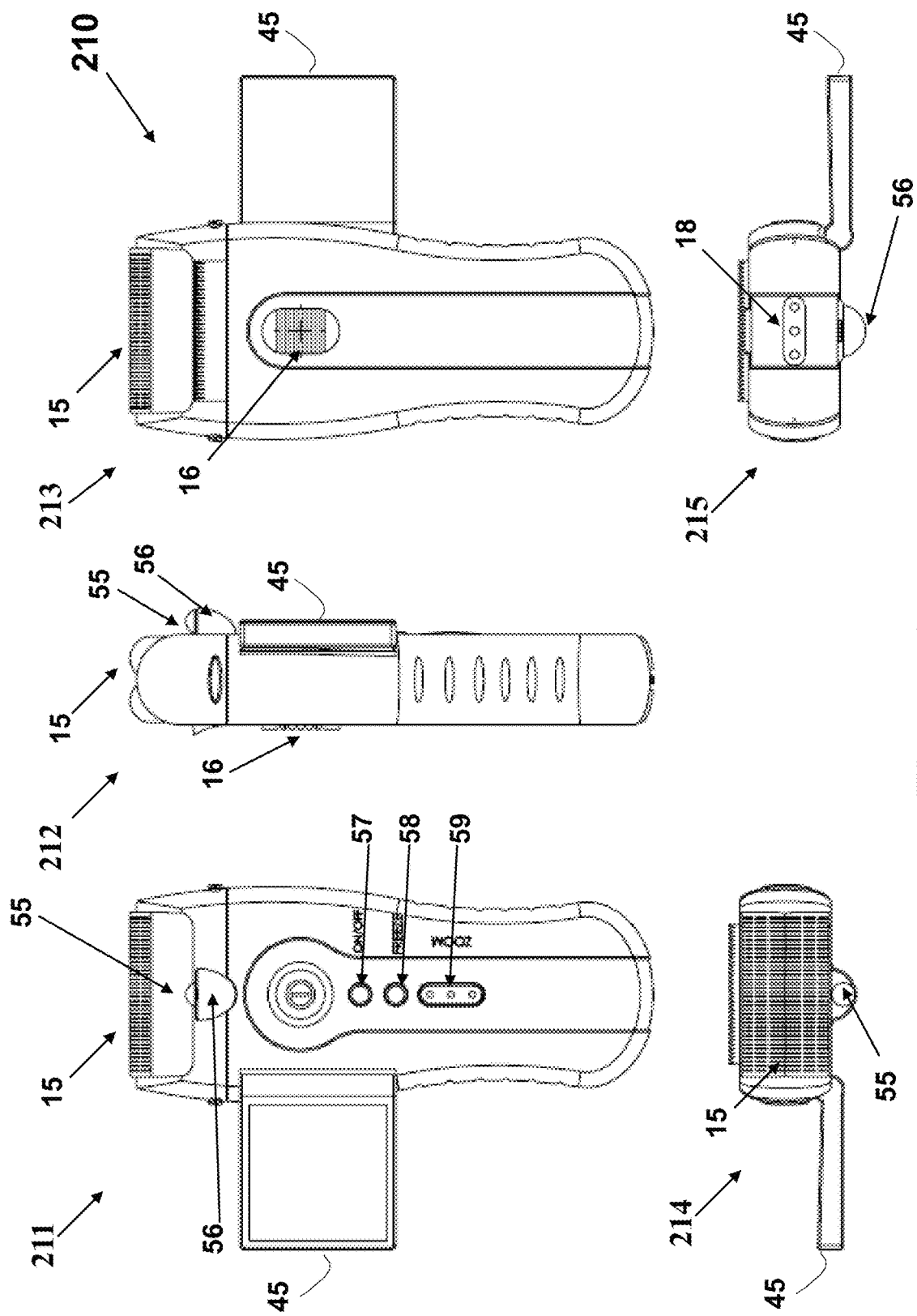
FIG. 21 illustrates schematically views of an electric shaver according to the invention.
Figure 22:
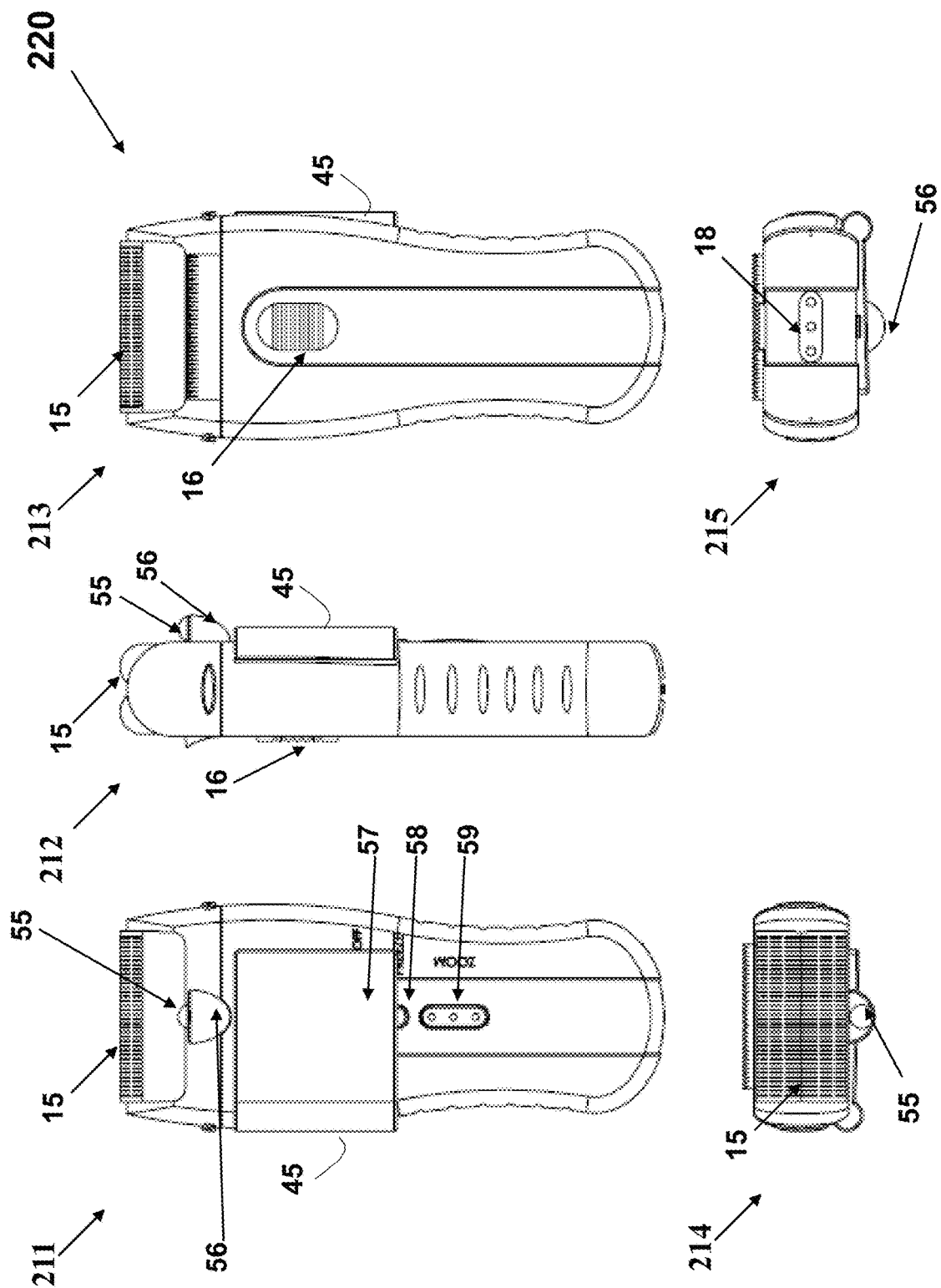
FIG. 22 illustrates schematically views of an electric shaver according to the invention.

An example of a physical view of the shaver 200 is shown as shaver 210 in FIG. 21, adapted from FIG. 5. FIG. 21 shows various views of an example of the electric shaver 210 according to one embodiment of the invention. View 213 is a front view of the shaver 210, view 212 is a side view, and view 211 is a rear view of the shaver 210. View 214 is a top view of the foil 15, which is usually in contact with the skin and the hair, and view 215 is a bottom view showing connector 18 for connecting to a power source. The display 45 is shown attached and as an integral part of the shaver enclosure. In one embodiment, the display can be folded, for example in order to allow small packaging and small space for storing. The display 45 is shown folded in views 220 in FIG. 22.

Figure 23:
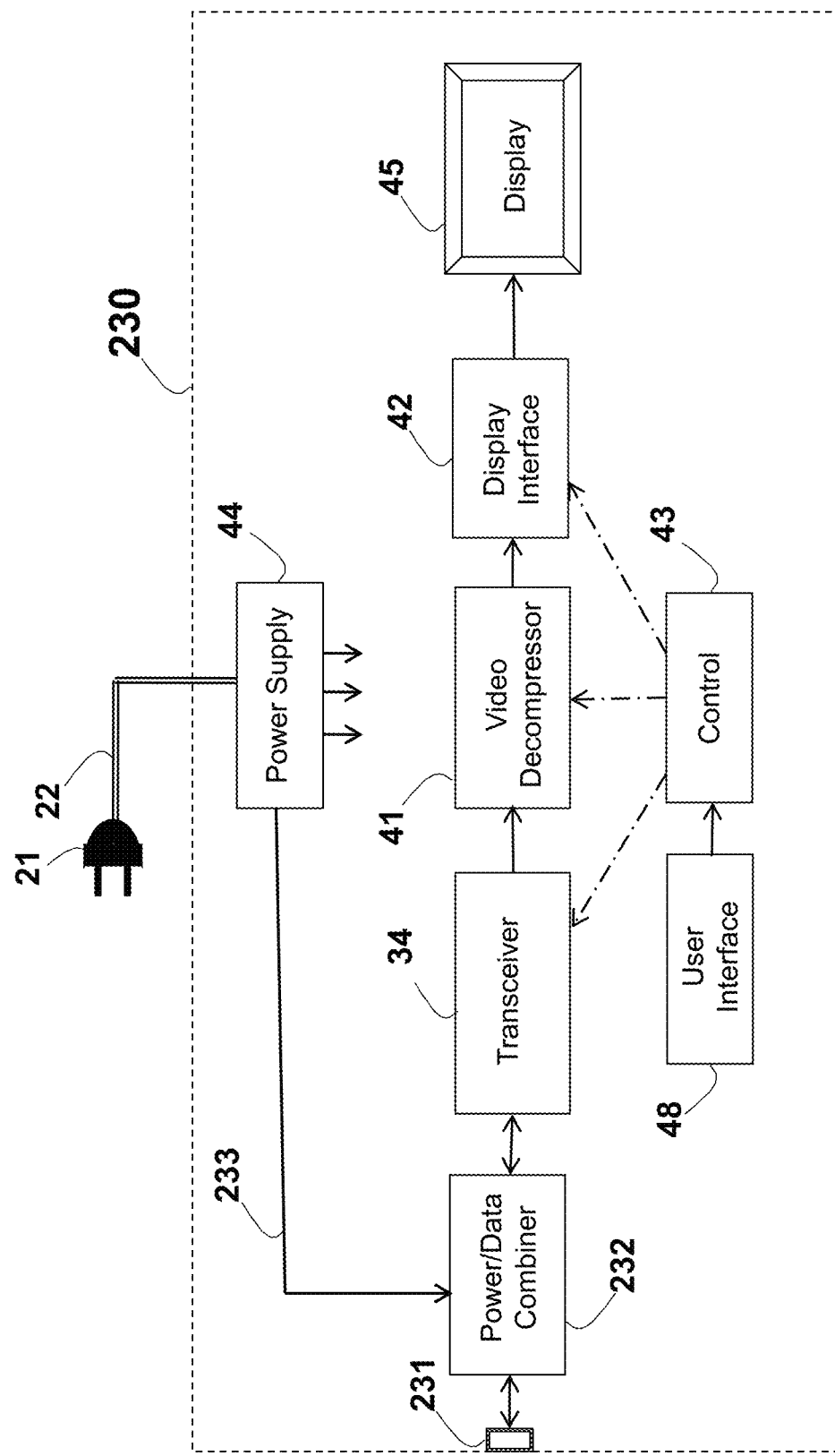
FIG. 23 illustrates schematically a simplified general functional block diagram of a display unit according to the invention.

In the cases wherein a conductive medium, such as a dedicated cable, is used as the communication medium 37, it may be preferred to use the same cable to concurrently carry power between the shaver and the display unit, thus obviating the need for two cables, one for providing power and one for communication purposes. In one embodiment, the display unit is adapted to drive power to the cable for powering the electric shaver. Such power can be used only for powering the camera module and related functionalities, or for fully powering the electric shaver, including its motor 26 driving the cutters 28. A display unit 230 adapted to supply power over the cable is shown in FIG. 23. A power/data combiner unit is disposed, connected between the transceiver 34 and the power supply 44. The power from the power supply 44 required to power the shaver is fed to the combiner 232 through the connection 233. The communication signal to or from the transceiver 34 is also connected to the combiner 232. The power signal and the digital data communication signal are combined by the combiner 232 and the combined signal is coupled to the cable via a connector 231.

Figure 24:
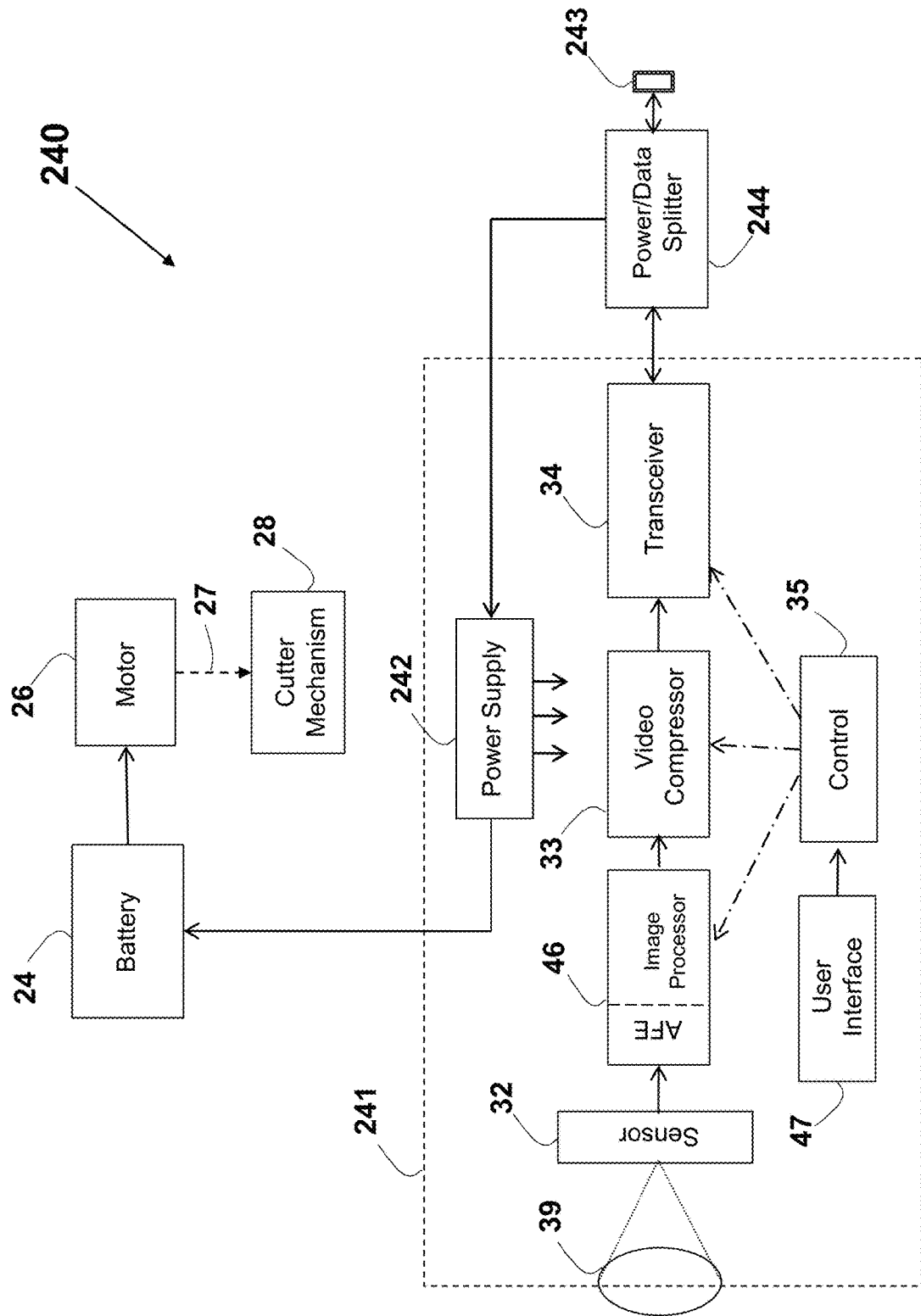
FIG. 24 illustrates schematically a simplified general functional block diagram of an electric shaver according to the invention.

A corresponding electric shaver 240 is shown as shaver 240 in FIG. 24. Connector 243 is used to connect to the cable carrying both power and communication signals. The incoming power is separated by the power/data splitter 244 and fed to the power supply 242 in the camera module 241. The power/data splitter 244 serves as the mating and complementary unit for the combiner 232. The power supply 242 is adapted to power both the motor 26 (via the battery 24, if required, or otherwise directly without any battery in between) and the camera module 241 from the power signal carried over the cable. The power/data splitter is further operating to transparently pass the communication signal between the cable (via connector 243) and the transceiver 34.

Figure 25:
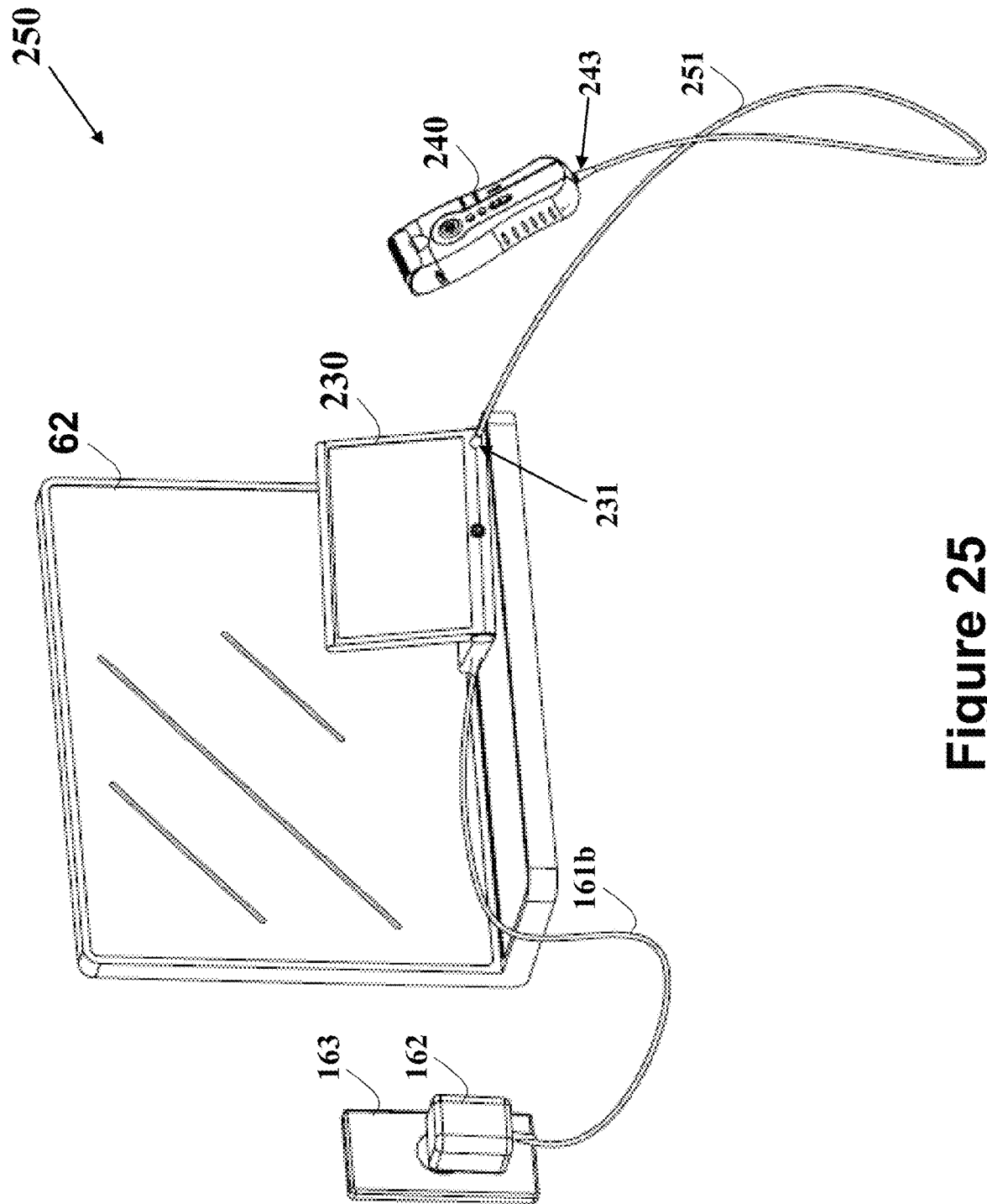
FIG. 25 illustrates schematically a system including an electric shaver and a display unit according to the invention.

An exemplary system 250 is shown in FIG. 25. A single cable 251 is shown to connect between the display unit 230 and the electric shaver 240 described above, carrying both power and digital data signals. The display unit 230 is AC power fed via cable 161b connected to AC power outlet 163 via a connector or plug-in power supply 162. Further, the AC power connection is also used to power the electric shaver 240 via cable 251, shown connecting the shaver 240 via connector 243 and to the connector 231 in the display unit 230. Hence, only a single cable 251 is conveniently connected to the shaver 240.

In one embodiment according to the invention, the power and communication signals are carried over the single cable 251 using separated and dedicated conductors. For example, cable 251 may include four distinct wires, out of which two (or more) are used for carrying the communication signal, while the other two wires are used to carry the power signal from the display unit 230 to the shaver 240. In such configuration, specific hardware for implementing the combiner 232 and the splitter 244 may not be required, since power connection will make use of separate pins and contacts in the connectors 231 and 243, while the communication signal will use distinct and different pins.

In an alternative embodiment, the power and communication signals are carried over the wires in the cable using Frequency Division Multiplexing (FDM, a.k.a. Frequency Domain Multiplexing). In such implementation, the power and the communications signals are carried each in its frequency band (or a single frequency) distinct from each other. For example, the power signal can be a DC (Direct Current) power (effectively 0 Hz), while the communication signal is carried over the 100 Hz-10 MHz (or 4-30 MHz) frequency band, which is distinct and above the DC power frequency. In one example, a relatively high voltage such as a 120 VDC can be used in order to compensate for the wiring resistance caused voltage drops. In some installations, safety standards such as UL/IEC 60950 and EN60950 may limit the voltage level in many applications to 60 VDC. A telephony common 48 VDC voltage level may also be used.

Similarly, AC power signal may be used, such as 50 Hz or 60 Hz. Commonly the combiner 232 and splitter 244 in such environment are implemented using set of filters. For example, a low pass filter (LPF) similar to filter 141 described above can be used in the power path, connecting the cable to the power supply 44 or 242, passing only the DC power or low-frequency AC signals. An high pass filter (HPF) similar to filter 142 described above can be used in the communication path, connecting the cable to the transceiver 34 in both the shaver 240 and the display unit 230.

Another technique for carrying power and data signals over the same conductors is known as Power over Ethernet (PoE) (i.e., Power over LAN-PoL) and standardized under IEEE802.3af and IEEE802.3at, also explained in U.S. Pat. No. 6,473,608 to Lehr et al. titled: "*Structure Cabling System*", which describes a method to carry power over LAN wiring, using the spare pairs and the phantom mechanism. The latter makes use of center-tap transformers. The powering scheme described above may use this standard as well as using non-standard proprietary powering schemes. In one example, USB (Universal Serial Bus) connection is used for both power and digital data.

While the invention has been exampled above with regard to the case wherein the electric shaver is powered from the display unit via the interconnecting cable carrying the communication signal, it is apparent that equally the power can be fed from the electric shaver to the display unit. In this case the splitter 244 and the combiner 232 will be switched with each other, so that combiner 244 will be disposed within the display unit 230 (as a substitute to combiner 232), and the combiner 232 will be disposed within the electric shaver 240 (as a substitute to splitter 244). The power supplied will be adapted accordingly.

While the invention has been exampled above with regard to processing, compressing and decompressing, transmitting, receiving and displaying the image in a represented as a digital data, it will be appreciated that the invention equally applies to the case wherein the image is in full or in part of the system is carried, processed, compressed and decompressed, transmitted, received and displayed as analog video signal. In the case of an analog transmission, the transceiver 34 will be an analog transceiver and the image will be carried in an analog form over the communication medium 37. Similar to the above disclosure, in such a case the communication can be wireless through the air such as using radio-frequency, or over metallic medium such as wires.

The camera module 31 or the display unit 40 may include visual indicators for allowing the user to easily observe the module status. Such indicators may be LEDs (Light Emitting Diode) known in the art, and are coupled to be controlled by the control 35 in the shaver 30 or by the control 43 in the display unit 40, and can further be part of user interface functionality 47 or 48. The visual indicators may be used to indicate the following module status:

a. Power. The visual indicator may be used to indicate the existence of power in the module to power its internal active circuits. Various techniques have been described above for powering a module. Regardless of the power source to the module (as described above), such indication will ensure that indeed power reaches the module. Such indication is commonly marked as 'POWER' or 'ON'. The indicator can be coupled directly to the power signal feeding the module or alternatively coupled to the power supply output. In the latter case, the indicator is used to indicate both the power signal availability and the proper operation of the internal power supply 36 or 44.

b. Proper operation. A visual indicator may also be used to indicate the proper operation of part or all of the electronic circuits integrated within the module. The electronic circuits within the module may support self-test or any other built-in diagnostics means, wherein the test results will be signaled by a visual indicator.

c. Communication status. In the case wherein the module uses communication functionality, the module may indicate the availability and the status of the communication. In general, two communication links may be involved. One communication link refers to the availability of a data communication signal over the communication medium 37 so as to indicate that transceiver 34 receives a valid communication signal. The other communication link involves the communication between the shaver and the display unit. Such status indication can be based on a 'Link Pulse' mechanism commonly used in Ethernet IEEE802.3 10/100BaseT based networks.

The above various states may be each represented by a single dedicated single-state indicator. However, in order to reduce complexity, known techniques are commonly used in order to combine signals. Such techniques may use different colors (of the same indicator), different intensity levels, variable duty-cycle and so forth. While visual indicators have been described, other indicating methods may be used such as audible tones (as stand alone or combined with visual).

Figure 26:
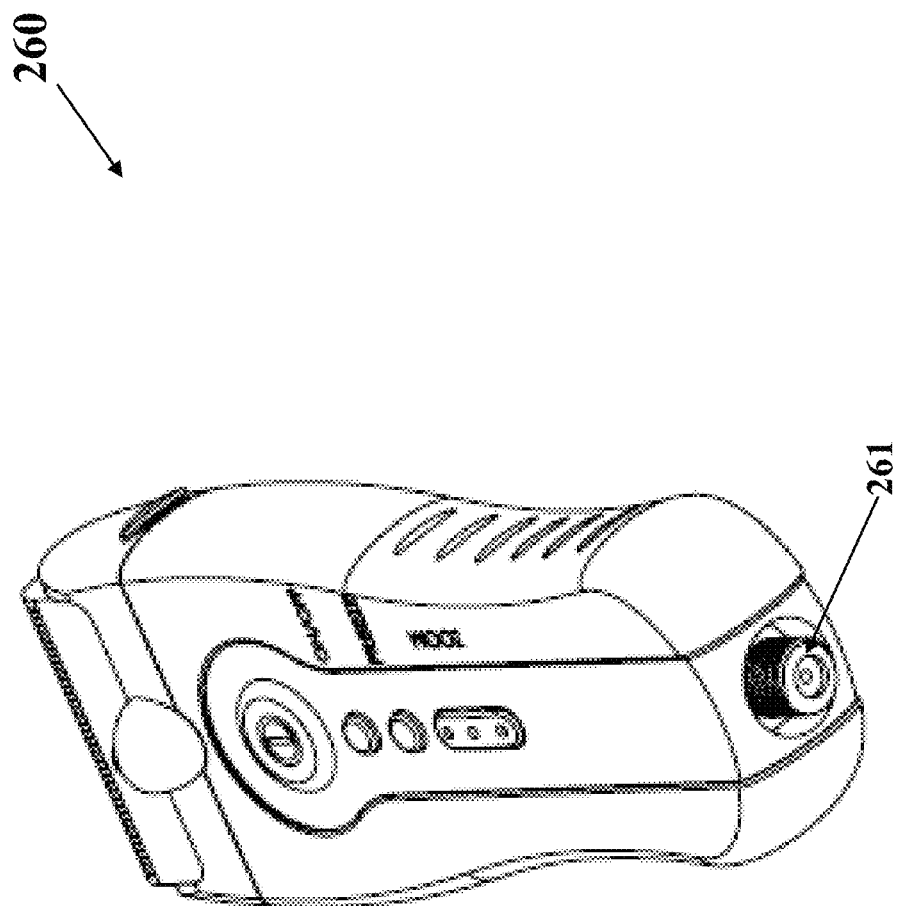
FIG. 26 illustrates a perspective view of an electric shaver according to the invention.
Figure 27:
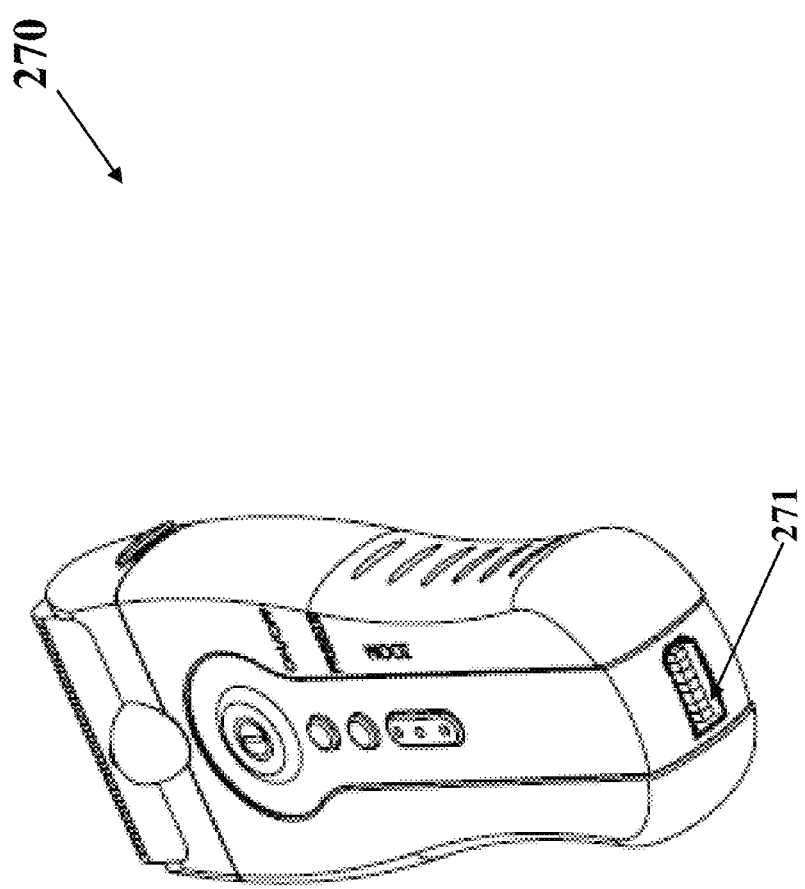
FIG. 27 illustrates a perspective view of an electric shaver according to the invention.

While the invention has been exampled above with regard to displaying the captured image on a dedicated display, it will be appreciated that the invention equally applies to the case wherein the standard displays are used. In one embodiment, the electric shaver outputs a standard video signal, which can be displayed using any displaying device that supports this video interface. For example, a standard television set can be as a display apparatus. In this case, the transceiver 234 and connector 38 are adapted to output this standard video signal. Such analog interfaces can be composite video such as NTSC, PAL or SECAM formats. Similarly, analog RGB, VGA (Video Graphics Array), SVGA (Super Video Graphics Array), SCART, S-video and other standard analog interfaces can be used. Further, personal computer monitors, plasma or flat panel displays, CRT, DLP display or a video projector may be equally used. Connector 38 will be implemented as suitable standard analog video connector. For example, F-Type, BNC (Bayonet Neill-Concelman), RCA, and similar RF/coax connectors can be used. An electric shaver 260 is shown in FIG. 26, including F-Type connector 261 for connecting to a standard analog video displaying device. In one embodiment, a standard digital video interface is used. In this case, the transceiver 34 and connector 38 are adapted to support the digital video interface. In one example, a IEEE1394 interface, also known as FireWire™, is used, as shown for electric shaver 270 is shown in FIG. 27, including an IEEE1394 connector 271 for connecting to a standard digital video displaying device. Other digital interfaces that can be used are USB, SDI (Serial Digital Interface), FireWire, HDMI (High-Definition Multimedia Interface), DVI (Digital Visual Interface), UDI (Unified Display Interface), DisplayPort, Digital Component Video and DVB (Digital Video Broadcast).

While the invention has been exampled above with regard to electric shaver, it will be appreciated that the invention equally applies to non-electric shavers such as razors.

While the invention has been exampled above with regard to shavers and other hair removal devices, it will be appreciated that the invention equally applies to oral hygiene devices such as toothbrush. In the case of electrical toothbrush, the cutter mechanism 28 is replaced with a brushing mechanism. Such a device helps in better visualization of the mouth cavity, and in particular of the brushed teeth and gums.

All publications, patents, and patent applications cited in this specifications are herein incorporated by reference as if each individual publication, patent, or patent application were specifically and individually indicated to be incorporated by reference and set forth in its entirety herein.

Those of skill in the art will understand that the various illustrative logical blocks, modules and circuits described in connection with the embodiments disclosed herein may be implemented in any number of ways including electronic hardware, computer software, or combinations of both. The various illustrative components, blocks, modules and circuits have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application.

Although exemplary embodiments of the present invention have been described, this should not be construed to limit the scope of the appended claims. Those skilled in the art will understand that modifications may be made to the described embodiments. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

It will be appreciated that the aforementioned features and advantages are presented solely by way of example. Accordingly, the foregoing should not be construed or interpreted to constitute, in any way, an exhaustive enumeration of features and advantages of embodiments of the present invention.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes that come within the meaning and range of equivalency of the claims are to be embraced within their scope.

Public Notice Regarding the Scope of the Invention and Claims

While the invention has been described in terms of preferred embodiments and generally associated methods, the inventor contemplates that alterations and permutations of the preferred embodiments and methods will become apparent to those skilled in the art upon a reading of the specification and a study of the drawings.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim. In addition, aspects of the invention are particularly pointed out in the claims using terminology that the inventor regards as having its broadest reasonable interpretation; the more specific interpretations of 35 U.S.C. section. 112 (6) are only intended in those instances where the term "means" is actually recited. The words "comprising," "including," and "having" are intended as open-ended terminology, with the same meaning as if the phrase "at least" were appended after each instance thereof.

The invention claimed is:

1. A device for capturing and transmitting images and for identifying an element in at least one of the images, the device comprising:
  a first video camera configured to capture a first video data by a first optical lens that focuses received light, and a first output configured for outputting a first video stream carrying the captured first video data;
  a second video camera configured to capture a second video data, that is at least in part distinct from the first video data, by a second optical lens that focuses received light, and a second output configured for outputting a second video stream carrying the captured second video data;
  a WLAN (Wireless Local Area Network) antenna for coupling to a WLAN;
  a WLAN transmitter coupled to the WLAN antenna for transmitting a third video stream that includes the first and second video streams to the WLAN;
  an image processor coupled to the first video camera for receiving the first video stream therefrom and configured to process the captured first video data;
  a rechargeable battery coupled to power the video cameras, the image processor, and the WLAN transmitter; and a single portable and handheld casing configured to house the video cameras, the image processor, and the WLAN transmitter, wherein the casing comprises two opposed first and second exterior surfaces, the first optical lens is mounted on, or is attached to, the first surface and the second optical lens is mounted on, or is attached to, the second surface, and wherein the image processor is operative to identify the element in at least one of the captured first and second video data.

2. The device according to claim 1, wherein the WLAN is using an unlicensed frequency band.

3. The device according to claim 2, wherein the WLAN is using an Industrial, Scientific and Medical (ISM) frequency spectrum band.

4. The device according to claim 3, wherein the WLAN substantially conforms to, or based on, IEEE 802.11 standard.

5. The device according to claim 1, wherein the image processor is operative to identify the element in at least one of the captured first and second video data using pattern recognition.

6. The device according to claim 1, further comprising, in the casing, a multiplexer coupled between the first and second outputs and the WLAN transmitter for multiplexing the first and second video streams, and wherein the third video stream comprises the multiplexed first and second video streams.

7. The device according to claim 6, wherein the multiplexer is an FDM (Frequency Domain/Division Multiplexer) multiplexer, whereby the first and second video streams are respectively carried over distinct first and second frequency bands.

8. The device according to claim 7, wherein the FDM multiplexer comprises a first filter for substantially passing only the first frequency band, and a second filter for substantially passing only the second frequency band.

9. The device according to claim 6 wherein the multiplexer is a TDM (Time Domain/Division Multiplexer) multiplexer, and wherein the third video stream comprises time-multiplexed the first and second video streams.

10. The device according to claim 1, further comprising, in the casing, a video compressor coupled between one of the video cameras and the WLAN transmitter for compressing the respective video stream.

11. The device according to claim 10, wherein the compression is based on intraframe compression, or wherein the compression is lossy.

12. The device according to claim 10, wherein the compression is based on interframe compression, or wherein the compression is non-lossy.

13. The device according to claim 10, wherein the compression is according to, or based on, a standard compression algorithm which is one out of JPEG (Joint Photographic Experts Group) and MPEG (Moving Picture Experts Group), ITU-T H.261, ITU-T H.263, ITU-T H.264, and ITU-T CCIR 601.

14. The device according to claim 1, wherein the at least one of the video cameras is configured for capturing the respective video data in a non-visible spectrum.

15. The device according to claim 14, wherein each of the first and second video camera is configured for capturing the respective video data in a non-visible spectrum.

16. The device according to claim 14, wherein the non-visible spectrum is in an infrared or ultraviolet spectrum.

17. The device according to claim 1, further configured for body care of a human body part.

18. The device according to claim 17, wherein the body part is a human skin, and wherein the body care comprises hair removal.

19. The device according to claim 18, further comprising, in the casing, a shaver for removing hair from the human skin.

20. The device according to claim 19, wherein the shaver is an electrically operated shaver that comprises an electric motor and a cutter driven by the electric motor.

21. The device according to claim 17, wherein the body part is a human mouth, and wherein the body care comprises oral hygiene.

22. The device according to claim 21, further comprising, in the casing, a toothbrush for brushing teeth or gums.

23. The device according to claim 22, wherein the toothbrush comprises an electrically operated toothbrush that comprises an electric motor.

24. The device according to claim 1, wherein the image processor is operative to identify a plurality of elements in at least one of the captured first and second video data.

25. The device according to claim 24, wherein at least one of the plurality of elements comprises a part of a human body.

26. The device according to claim 25, wherein part of the human body comprises part of a human skin.

27. The device according to claim 25, wherein part of the human body comprises individual hairs or a hairy area.

28. The device according to claim 1, wherein the image processor is operative to identify one or more elements in at least one of the captured first and second video data, and wherein the device is further operative to produce a third video data of at least one of the first and second video data in which the one or more identified elements are marked.

29. The device according to claim 1, further comprising, in the casing or attached thereto, a display that comprises a flat screen for visually displaying at least part of one of the captured images.

30. The device according to claim 29, wherein the display is foldable.

* * * * *